United States Patent
Hirano et al.

(10) Patent No.: US 8,462,502 B2
(45) Date of Patent: Jun. 11, 2013

(54) STRUCTURAL FABRIC OF A STORAGE APPARATUS FOR MOUNTING STORAGE DEVICES

(75) Inventors: Kazuya Hirano, Odawara (JP); Takashi Chikusa, Odawara (JP); Hiroyuki Kumasawa, Odawara (JP); Kenichi Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 12/994,656

(22) PCT Filed: Nov. 9, 2010

(86) PCT No.: PCT/JP2010/006568
§ 371 (c)(1),
(2), (4) Date: Nov. 24, 2010

(87) PCT Pub. No.: WO2012/063280
PCT Pub. Date: May 18, 2012

(65) Prior Publication Data
US 2012/0113582 A1 May 10, 2012

(51) Int. Cl.
*H05K 5/00* (2006.01)
*H05K 7/16* (2006.01)
*A47B 81/00* (2006.01)

(52) U.S. Cl.
USPC ...... 361/695; 361/727; 361/679.39; 454/184; 312/223.2

(58) Field of Classification Search
USPC ............. 361/724–727, 679.01–679.04, 679.33–679.39; 248/298.1, 274.1, 122.1; 312/223.1, 223.2, 223.3
See application file for complete search history.

(56) References Cited

U.S. PATENT DOCUMENTS

| | | | |
|---|---|---|---|
| 6,473,298 B1 | 10/2002 | Ruckman et al. | |
| 2003/0042824 A1* | 3/2003 | Coffin et al. | 312/223.2 |
| 2003/0103334 A1* | 6/2003 | Yun | 361/724 |
| 2005/0257232 A1 | 11/2005 | Hidaka | |
| 2006/0010456 A1* | 1/2006 | Ishimine et al. | 720/600 |
| 2006/0290245 A1 | 12/2006 | Hidaka | |
| 2007/0025076 A1 | 2/2007 | Matsushima et al. | |

(Continued)

FOREIGN PATENT DOCUMENTS

EP 1 760 722 B1 3/2007
JP 2006-024283 1/2006

(Continued)

OTHER PUBLICATIONS

PCT International Search Report and Written Opinion on application No. PCT/JP2010/006568 mailed Jul. 29, 2011; 12 pages.

Primary Examiner — Zachary M Pape
Assistant Examiner — Jerry Wu
(74) Attorney, Agent, or Firm — Foley & Lardner LLP

(57) ABSTRACT

A storage device mounting structure with excellent handleability for storage devices is provided.

A storage device mounting structure according to this invention includes a unit for housing a plurality of storage devices, a chassis for housing the unit, and a guide mechanism for supporting the unit and guiding it into or out of the chassis, wherein the unit has an open area for inserting the plurality of storage devices from a front face of the unit into the unit and is supported by the guide mechanism so that the unit can freely move rotationally to make a surface of the unit, where the open area exists, positioned at the front of the chassis.

15 Claims, 56 Drawing Sheets

U.S. PATENT DOCUMENTS

| | | | |
|---|---|---|---|
| 2008/0137232 A1* | 6/2008 | Wadsworth et al. | 360/234.6 |
| 2008/0140921 A1 | 6/2008 | Sutardja et al. | |
| 2008/0165478 A1* | 7/2008 | McCoy | 361/681 |
| 2008/0239654 A1* | 10/2008 | Bisson et al. | 361/685 |
| 2009/0237877 A1 | 9/2009 | Honda et al. | |
| 2010/0061051 A1* | 3/2010 | Cochrane | 361/679.35 |

FOREIGN PATENT DOCUMENTS

| | | |
|---|---|---|
| JP | 2006-073045 | 3/2006 |
| JP | 2007-035173 | 2/2007 |
| JP | 2009-536767 | 10/2009 |
| WO | WO 2007/133646 A2 | 11/2007 |

* cited by examiner

FIG.6
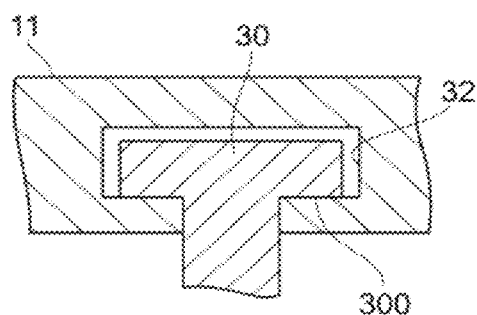
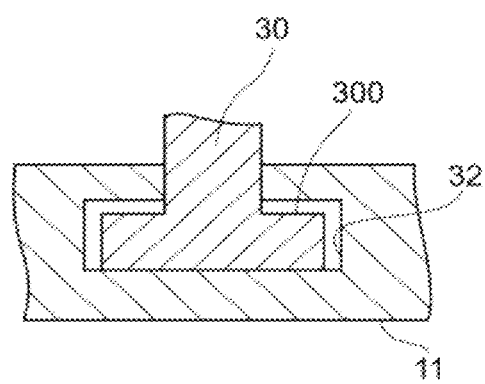
FIG.7A
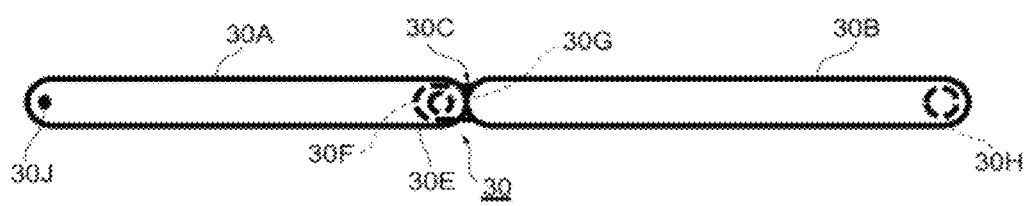

FIG. 38

| MEMORY UNIT_1 | MEMORY UNIT_2 | MEMORY UNIT_3 | MEMORY UNIT_4 |
|---|---|---|---|
| DATA (1) | (UNWRITTEN) | (UNWRITTEN) | (UNWRITTEN) |
| DATA (1) | DATA (2) | (UNWRITTEN) | (UNWRITTEN) |
| DATA (1) | DATA (2) | DATA (3) | (UNWRITTEN) |
| DATA (1) | DATA (2) | DATA (3) | DATA (4) |

3412

| ACCELERATOR MEMORY | MEMORY UNIT_5 |
|---|---|
| PARITY FIRST TIME | (UNWRITTEN) |
| PARITY SECOND TIME | (UNWRITTEN) |
| PARITY THIRD TIME | (UNWRITTEN) |
| (OPEN AREA) | PARITY FIRST TIME |

| RECEIVE WRITE DATA (1) FROM HOST | RECEIVE WRITE DATA (2) FROM HOST | RECEIVE WRITE DATA (3) FROM HOST | RECEIVE WRITE DATA (4) FROM HOST |
|---|---|---|---|

FIG. 39

| MEMORY UNIT_1 NONVOLATILE MEMORY DATA (1) | MEMORY UNIT_2 NONVOLATILE MEMORY DATA (2) | MEMORY UNIT_3 NONVOLATILE MEMORY DATA (3) | MEMORY UNIT_4 NONVOLATILE MEMORY DATA (4) | MEMORY UNIT_5 NONVOLATILE MEMORY OLD PARITY |
|---|---|---|---|---|
| NONVOLATILE MEMORY DATA (5) | NONVOLATILE MEMORY DATA (6) | NONVOLATILE MEMORY DATA (7) | NONVOLATILE MEMORY DATA (8) | NONVOLATILE MEMORY PARITY |
| NONVOLATILE MEMORY DATA (9) | NONVOLATILE MEMORY DATA (10) | NONVOLATILE MEMORY DATA (11) | NONVOLATILE MEMORY DATA (12) | (UNWRITTEN) |

ACCELERATOR MEMORY 3412:
- VOLATILE MEMORY NEW PARITY
- VOLATILE MEMORY PARITY

FIG. 44

| No. | VIRTUAL VOL | LBA (16bytes) | DATA LENGTH (bytes) | POOL ID | PAGE ID | ENTRY | NUMBER OF ALLOCATED ENTRIES | NEW ALLOCATION TIME | LAST UPDATE TIME |
|---|---|---|---|---|---|---|---|---|---|
| 1 | vLun0 | 00000000h | 200000h | Mem0 | 80000000h (DS0:HB0) | 00000000h-00200000h | 200000h | yyyymmdd-aa:aa:aa.aa | yyyymmdd-aa:aa:aa.aa |
| 2 | vLun1 | 00000000h | 1234h | Mem0 | 80000000h (DS0:HB0) | 00000000h-00200000h | 200h | yyyymmdd-bb:bb:bb.bb | yyyymmdd-xx:xx:xx.xx |
| 3 | vLunx | 00000000h | 8000h | Ssd0 | 10000000h (Table:SD0) | P001 (TABLE ENTRY) | 1h (FOR 1 PAGE) | yyyymmdd-cc:cc:cc.cc | yyyymmdd-yy:yy:yy.yy |
| 4 | vLun0 | 00001000h | 100h | Mem0 | 80000000h (DS0:HB0) | 00000000h-00200000h | 1000h | yyyymmdd-dd:dd:dd.dd | yyyymmdd-dd:dd:dd.dd |

FIG. 46

| ADDRESS | RAID Gr.# | Drive # | PHYSICAL LBA | OFFSET | BLOCK LENGTH | UNUSED AREA |
|---|---|---|---|---|---|---|
| P0001 | 13(P2-3) | R13-1 | 000000h | 0 | 040h | 0C0h |
| P0002 | 13(P2-3) | R13-2 | 000000h | 0 | 100h | 0 |
| | 13(P2-3) | R13-3 | 000000h | 0 | 100h | 0 |
| | 13(P2-3) | R13-4 | 000000h | 0 | 100h | 0 |
| P0003 | 13(P2-3) | R13-1 | 000010h | 0 | 100h | 0 |

FIG.49

| STORAGE UNIT NO. | TYPE OF MOUNTED UNITS | FAN POSITION | BELONGING RAID GROUP NUMBER | FAN ROTATIONAL SPEED | ACCESS FREQUENCY (ACCESSES/10 MIN) | |
|---|---|---|---|---|---|---|
| | | | | | THRESHOLD | ACTUAL MEASURED VALUE |
| 1 | SSD | UP | RG1, RG2 | LOW SPEED | 10M | 8M |
| | | DOWN | RG3, RG4 | LOW SPEED | 10M | 5M |
| 2 | MEMORY | NONE | — | — | | |
| | | NONE | — | — | | |
| 3 | HDD / SSD | UP | RG5 | MEDIUM SPEED →HIGH SPEED | 3M | 5M |
| | | DOWN | RG6, RG7 | LOW SPEED →MEDIUM SPEED | 10M | 8M |
| 4 | HDD | UP | RG8, RG9 | MEDIUM SPEED | 6M | 5M |
| | | DOWN | RG9 | | | |

STRUCTURAL FABRIC OF A STORAGE APPARATUS FOR MOUNTING STORAGE DEVICES

TECHNICAL FIELD

The present invention relates to a storage device mounting structure in a storage apparatus. Particularly, this invention relates to a storage device mounting structure to facilitate maintenance of storage devices.

BACKGROUND ART

Recently, the size of storage devices such as hard disk drives (HDDs) and solid state drives (SSDs), which are mounted in a storage apparatus, has been changing from 3.5 inches to 2.5 inches. Along with the change of the storage device size, a structure for mounting storage devices in high density in a storage apparatus has been realized.

For example, Japanese Patent Application Laid-Open (Kokai) Publication No. 2006-24283 and Japanese Patent Application Laid-Open (Kokai) Publication No. 2006-73045 disclose rack-mount-type disk array apparatuses that enable high-density mounting by retaining a plurality of disk drives in upright positions in a housing unit (chassis) and also enable maintenance and replacement of disk drives by pulling out the housing unit from the front side of the rack in a horizontal direction.

Furthermore, Japanese Patent Application Laid-Open (Kokai) Publication No. 2007-35173 discloses a disk array apparatus that includes rows of disk drives mounted in an air flow travelling direction and a chassis that houses the disk drives; and the air flow passes through a passage between a top face of the disk drives and an top face inner wall of the chassis; and insufficient cooling of the disk drives due to high-density mounting of the disk drives is compensated for by providing a dam for narrowing down the air flow at a position downstream of the passage above the disk drives.

Furthermore, a data storage system utilizing SSDs, which emulate HDDs, as storage drives is disclosed in Japanese Unexamined Patent Application Publication (Translation of PCT Application) No. 2009-536767.

CITATION LIST

Patent Literature

[PTL 1] Japanese Patent Application Laid-Open (Kokai) Publication No. 2006-24283
[PTL 2] Japanese Patent Application Laid-Open (Kokai) Publication No. 2006-73045
[PTL 3] Japanese Patent Application Laid-Open (Kokai) Publication No. 2007-35173
[PTL 4] Japanese Unexamined Patent Application Publication (Translation of PCT Application) No. 2009-536767

SUMMARY OF INVENTION

Technical Problem

With a conventional disk array system, a disk drive(s) has to be pulled out or inserted in a vertical direction relative to a housing unit at the time of maintenance or replacement of the disk drive(s). Particularly, when a maintenance operator tries to do the above-described work with a housing unit positioned on an upper shelf of a rack, it is very hard to do so.

Furthermore, when a housing unit is taken out of the rack and a door on the top face is opened at the time of maintenance or replacement of a disk drive, a drive housing part no longer retains an air conduit structure. As a result, the effect of forced air cooling will be lost and the cooling-effect will be limited to that obtained only by natural convection. So, if the operator tries to perform maintenance on, or replace, a faulty disk drive while letting normal disk drives operate, they cannot secure enough time to work on the maintenance of the faulty disk drive in order to prevent overheating of the normal disk drives. Thus, it is difficult to handle the storage devices in the conventional storage apparatus in terms of the maintenance and cooling.

It is an object of the present invention to provide a structure for mounting storage devices with excellent handleability for storage devices. Another object of this invention is to provide a mounting structure in which a plurality of storage devices are mounted in high density and which makes it easier to perform maintenance on the storage devices. A still another object of the invention is to provide a mounting structure in which a plurality of storage devices are mounted in high density and which can maintain cooling performance for the plurality of storage devices even at the time of maintenance of the storage devices.

Solution to Problem

In order to achieve the above-described object, a storage device mounting structure according to the present invention includes a storage housing unit for mounting a plurality of storage devices, a chassis that houses the storage housing unit, and a guiding mechanism for supporting the storage housing unit and guiding it into or out of the chassis, wherein the unit has an opened area for inserting the plurality of storage devices, the storage housing unit is supported by the guiding mechanism so that the storage housing unit can freely move rotationally to make a front face of the unit, where the side of opened area exists, positioned in parallel with the front of the chassis.

Advantageous Effects of Invention

According to the present invention, a storage device mounting structure with excellent handleability for storage devices can be provided.

BRIEF DESCRIPTION OF DRAWINGS

FIG. 6 is a sectional view of a structure in which a guide rail of the guiding mechanism engages with a guide groove, as taken along the widthwise direction of the guide rail.
FIG. 7A is a plan view of the guide rail as viewed from above the chassis.

FIG. 38 is a block diagram explaining a delayed-parity-write operation when writing data to the memory units.

FIG. 39 is a block diagram explaining a state in which data and parity are stored in the memory units and an accelerator memory.

FIG. 44 is a mapping table between data in virtual volumes accessed by a host computer and assigned storage areas in thin provisioning storage pools.

FIG. 46 is an example of a mapping table for each storage pool area.

FIG. 49 is a table showing a form of forced cooling control by fans for the storage housing unit according to each type of interfaces for the storage devices.

DESCRIPTION OF EMBODIMENTS

Figure 1:
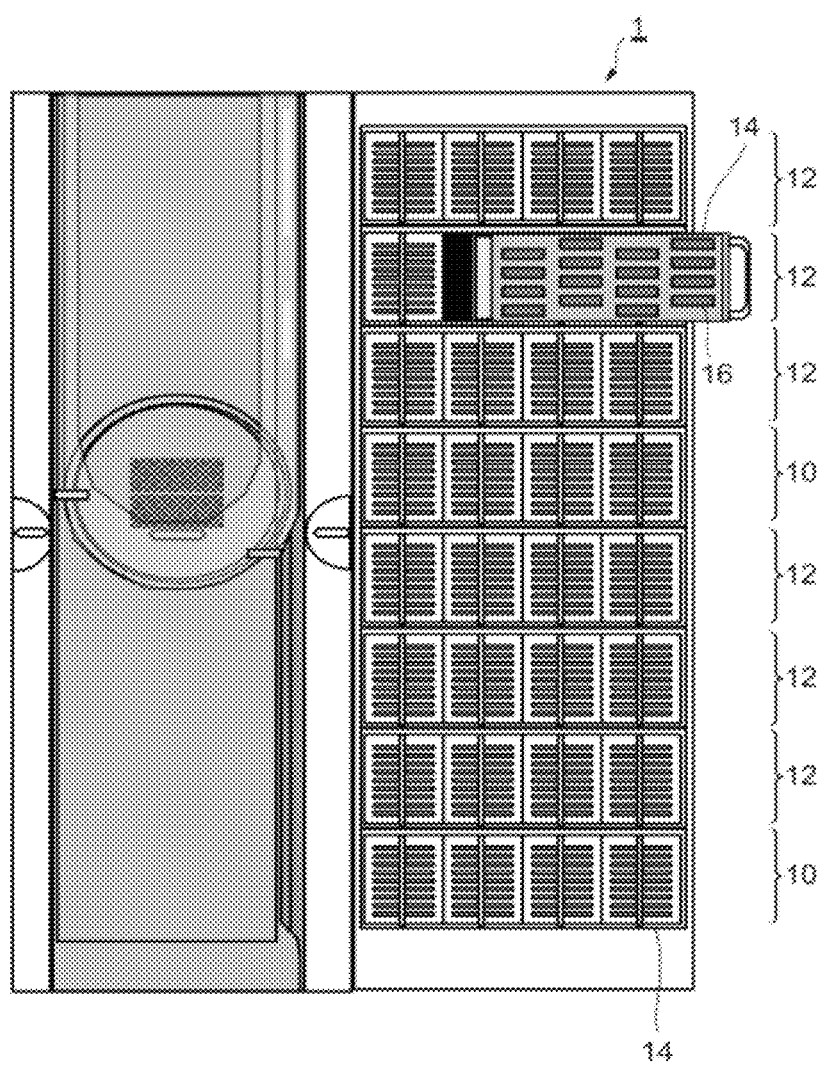
FIG. 1 is a front view of a storage apparatus.

Embodiments of the present invention will be explained below. FIG. 1 is a front view showing a state where a storage apparatus is mounted in a system rack 1 (hereinafter simply referred to as the "rack"). The observers' right side of FIG. 1 shows a housing area of the storage apparatus in a state in which a door for the rack 1 is removed for an explanation. The observers' left side of FIG. 1 shows a state in which the door for the rack 1 is closed, and the area is not shown. A plurality of chassis can be mounted in a vertical direction. This example describes, sets of chassis, each set composed of one basic chassis 10 and a plurality of additional chassis 12 (three additional chassis) are provided.

The basic chassis 10 has a controller 20 for executing processing for reading data from, and writing data to, storage devices 16. On the other hand, the additional chassis 12 does not have the controller 20, but it is connected to the basic chassis 10 and is controlled by the controller 20 in the basic chassis 10.

Figure 2:
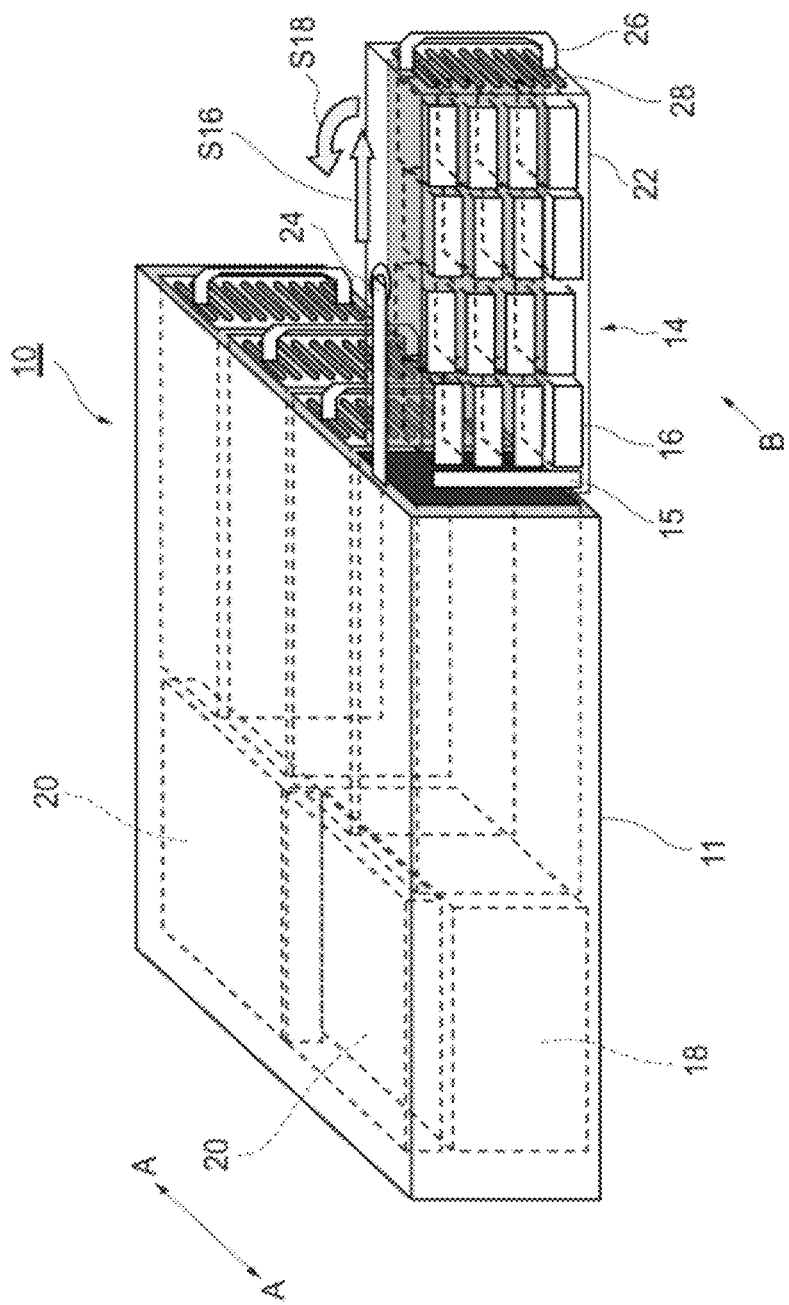
FIG. 2 is a side perspective view of a basic chassis for the storage apparatus.

As shown in FIG. 1, each chassis 10 (12) houses a plurality of (four) units 14 and each unit 14 houses a plurality of storage devices 16. FIG. 2 shows a side perspective view of the basic chassis 10 in a state where one unit 14 is pulled out of the chassis 10. Incidentally, this unit 14 will be hereinafter referred to as the Storage Housing Unit in order to differentiate it from other units.

A pair of power supply units 18 exist in the widthwise direction (arrow A) of the chassis on a base end (back face) side of the basic chassis 10. A pair of controller modules 20 for controlling the storage devices 16 exist on the power supply units 18. The symbol 11 represents a chassis cover. A pair of controller modules 20 exist for the purpose of redundancy. A fan unit 15 for performing forced cooling of the inside of the storage housing unit 14 exists at the base end section of the storage housing unit 14.

Figure 3:
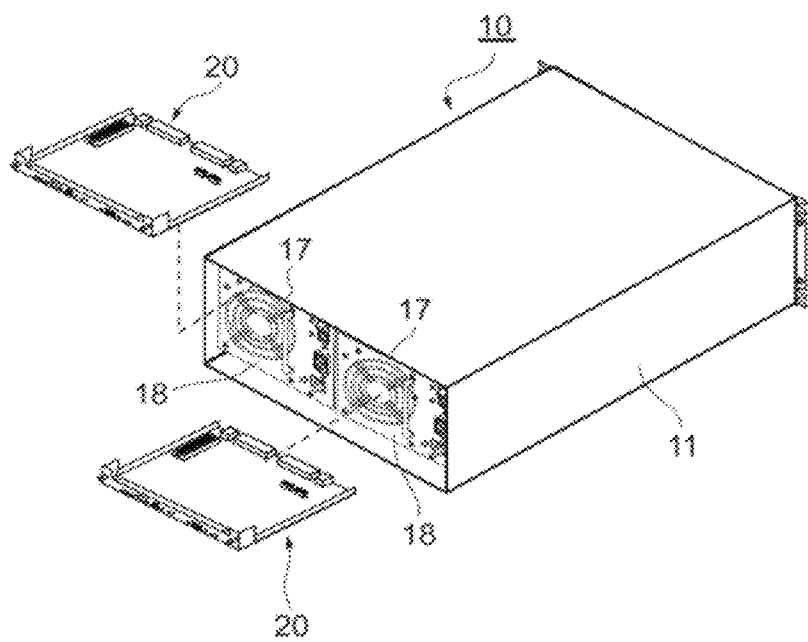
FIG. 3 is a top perspective view of the basic chassis as viewed from its base end side (back face).

FIG. 3 is a top perspective view of the basic chassis 10 as viewed from its back face and shows cooling fans 17 for the power supply unit 18 on the base end side of the chassis. Furthermore, the controller module 20 is inserted into an area above the power supply unit 18. The basic chassis 10 controls data transfer to the storage devices 16 for the basis chassis 10 and the additional chassis 12 via the controller module 20. On the other hand, the additional chassis 12 includes, instead of the controller module 20, an I/O module 2800 (FIG. 28) to be controlled by the controller module as described later.

As shown in FIG. 2, each storage housing unit 14 houses a plurality of storage devices 16 in the unit cover 22. The storage housing unit 14 is supported in the chassis 10 by a guide 24 and the guide 24 enables the storage housing unit 14 to move back and forth so that the storage housing unit 14 can be inserted into, or pulled out of, the chassis. The storage devices 16 are inserted into the unit cover 22 from the front side of the storage housing unit 14 in a direction indicated with arrow B. On the right side face of the unit case 22, there is a handle 26 used by a maintenance operator to pull the storage housing unit 14 out of the chassis 10 or push the storage housing unit 14 into the chassis 10.

A storage form of a plurality of storage devices 16 in the storage housing unit 14 is described below. A storage device 16 is inserted horizontally into the storage housing unit 14 so that it will be placed the front-back direction of the storage housing unit 14. For example, an HDD is inserted into the storage housing unit 14 in the direction indicated with arrow B so that a radial direction of the disk (plates) will be in parallel with the front-back direction of the storage housing unit 14. The plurality of storage devices 16 are placed in the storage housing unit 14 so that they are arranged in rows. FIG. 2 shows that the plurality of storage devices 16 are placed and arranged in a plurality of rows (four rows) in the storage housing unit 14.

The storage devices 16 to be placed in the storage housing unit 14 may be SSDs other than HDDs. Since the SSDs operate in accordance with specifications emulating functions of the HDDs, they are compatible with interfaces for HDDs such as SAS or SATA. A combination of HDDs and SSDs may be mounted in one storage housing unit 14.

Since SSDs emulate HDDs, their protocol overhead is larger than normal memory accesses which do not involve such emulation. Particularly, if accesses are focused on data of a small size equal to or smaller than a stripe size (or equal to or smaller than a page size for thin provisioning) from which the effect of parallel processing according to RAID) cannot be obtained, processing performance on the SSDs will decrease. So, protocols with small overhead such as PCI express (trade name) or InfiniBand (trade mark) may be used for an interface for the SSDs. However, if they are simply used, compatibility with HDDs will be lost.

Therefore, the storage housing unit 14 is designed so that memory units 2722 whose interface is PCI express (hereinafter referred to as PCIe) can be used instead of HDDs and/or SSDs. These memory units 2722 do not require a forced cooling mechanism.

From the above-described point of view, the storage housing unit 14 is designed to have a mechanism capable of exchanging an interface module for the HDDs/SSDs and a forced cooling mechanism with an interface module for the memory units 2722. For example, an SAS connector capable of high-speed serial communication (a SAS/PCIe connector 2720 that can be used for both SAS and PCIe in FIG. 35) is diverted, without any modification, to a mechanism capable of switching from an SAS expander unit 2710 and the fan unit 15 to a PCIe switch unit 2711 and an accelerator unit 2530, and such a mechanism is applied to the storage housing unit 14. This will be explained later.

The memory unit 2722 is configured so that a plurality of semiconductor memory devices such as flash memories are arranged in a matrix. There are two types of the memory unit 2722: a volatile memory unit from which data volatilize when the power is turned off; and a nonvolatile memory unit from which data do not volatilize even if the power is turned off. When the memory unit is hereinafter described simply as the memory unit, it means the nonvolatile memory unit.

As shown in FIG. 2, the fan unit 15 into which fans for cooling the inside of the storage housing unit 14 exists on the base end side of the storage housing unit 14. There are vent holes 28 on the right side face of the unit cover 22. When the fans 15 rotate, the outside air is introduced into the storage housing unit 14 through the vent holes 28 and passes through the inside of the unit cover 22, thereby performing forced cooling of the plurality of storage devices 16.

If the storage devices 16 placed in the storage housing unit 14 are only HDDs or a combination of HDDs and SSDs, forced cooling is required. If the storage devices 16 placed in the storage housing unit 14 are only SSDs, the forced cooling is not always necessary; however, the controller 20 controls the SSDs based on the interface for HDDs, so that it continues cooling by the fan unit 15. (Reduction of the number of fan rotations is favorable for the sake of power saving.) However, omission of the fan unit 15 is not precluded.

Figure 4:
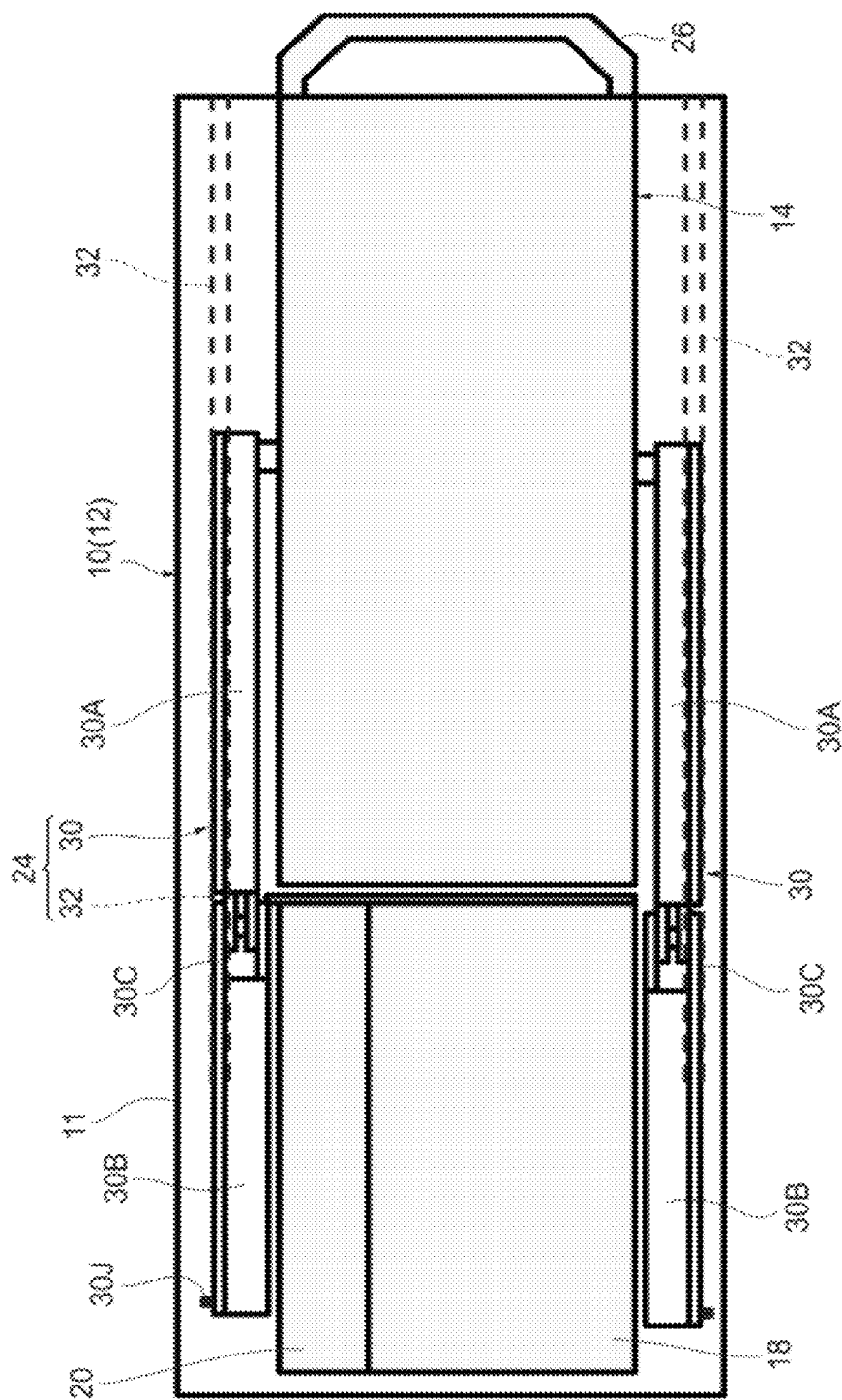
FIG. 4 is a side view of a storage housing unit having a guiding mechanism.
Figure 5:
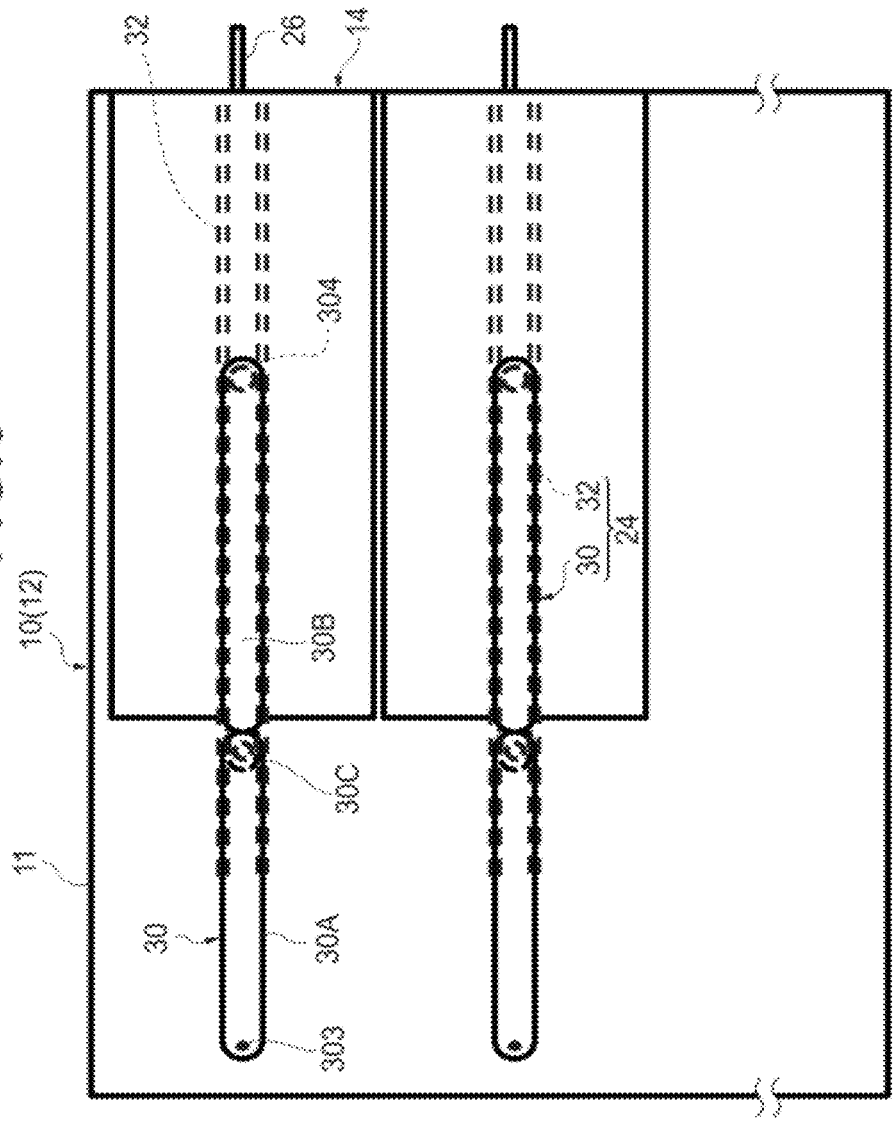
FIG. 5 is a plan view showing the storage housing units in the chassis.

Next, the details of the guiding mechanism (24 in FIG. 2) for moving the storage housing unit 14 to make it enter, or pull it out of, the chassis 10(1) will be explained below. As shown in FIG. 4, the guiding mechanism 24 includes: a linear guide rail 30 for supporting the top and bottom faces of the storage housing unit 14; and a guide groove 32 which is formed in an inside wall of each of the top and bottom faces of the cover 11 for the chassis 10(12) and is located opposite the guide rail 30. FIG. 5 is a plan view of the storage housing units 14 in the chassis 10(12). The guide groove 32 guides the slide of the guide rail 30.

When the storage housing unit 14 is in the chassis 10(12), the guide rail 30 engages with the guide groove 32, so that the top and bottom faces of the storage housing unit 14 are supported in the chassis 10(12) by the guiding mechanism 24.

As shown in sectional views of a structure in FIG. 6, in which the guide rail 30 engages with the guide groove 32, as taken along the widthwise direction of the guide rail 30, the guide rail 30 is formed in a T shape and its flange 300 protruding in the widthwise direction engages with the groove 32 so that the guide rail 30 will not drop out of the groove 32. A function such as a linear guide that makes the guide rail 30 slides on the guide groove 32 is applied to an engagement area between the guide rail 30 and the guide groove 32. The upper part in FIG. 6 shows a combination of the guide rail 30 and the guide groove 32 located above the storage housing unit 14 and the lower part in FIG. 6 shows a combination of the guide rail 30 and the guide groove 32 located below the storage housing unit 14.

As the maintenance operator holds the handle 26 of the storage housing unit 14 and pulls the storage housing unit 14 out of the chassis 10(12) towards the maintenance operator, the guide rail 30 slides on the guide groove 32 and the storage housing unit 14 is exposed from the chassis 10(12).

Figure 7B:
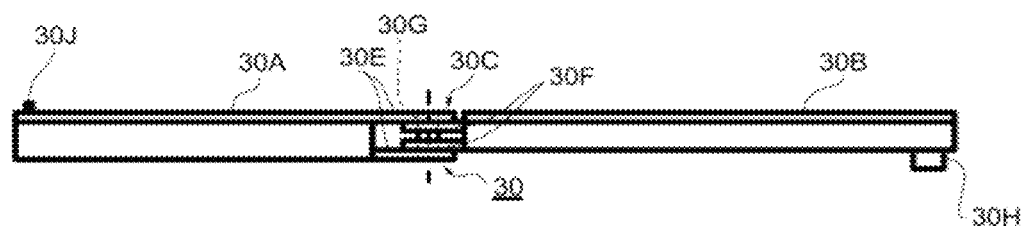
FIG. 7B is a side view of the guide rail.

The guide rail 30 includes a first rail 30B on the handle 26 side of the storage housing unit 14 and a second rail 30A on the chassis 10(12) side of the storage housing unit 14 as shown in FIG. 7A. FIG. 7A is a plan view of the guide rail as viewed from above the chassis 10(12) and FIG. 7B is a side view of the guide rail.

The coupling part connecting the first rail 30B and the second rail 30A is formed as a hinge 30C. This hinge 30C is comprised so that parts 30F at an end of the first rail 30B adjacent to the second rail 30A are fitted into a pair of parts 30F at an end of the second rail 30A adjacent to the first rail 30B, and a pin is then fitted in common holes 30G formed in both the parts.

Figure 7C:
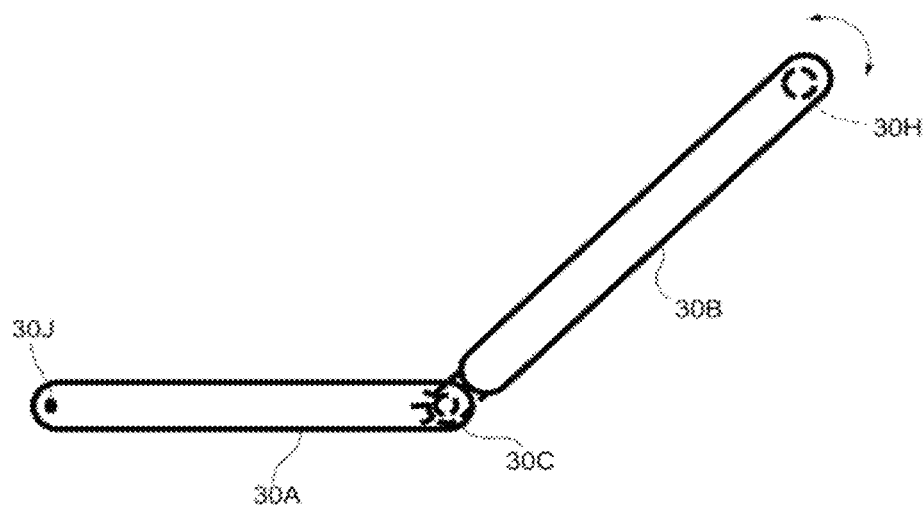
FIG. 7C is a plan view of the guide rail as viewed from above the chassis in order to show an explanatory illustration of a movable structure of the guide rail.

Therefore, when the storage housing unit 14 is pulled from the chassis 10(12) and the hinge 30C comes out of the chassis, the first rail 30B can rotate around the hinge 30C as shown in FIG. 7C. Furthermore, a small cylindrical shaft 30H protrudes towards the storage housing unit 14 from a top end of the first rail 30B closer to the handle 26 of the storage housing unit 14 as shown in FIG. 7B and this shaft 30H engages with the storage housing unit 14, thereby supporting the storage housing unit 14 so that the storage housing unit 14 can freely move rotationally. The top and bottom faces of the storage housing unit 14 are supported by a pair of the first upper and lower rails 30B and the storage housing unit 14 can rotate around the shaft 30H. Also, the guide rail 30 has a hollow structure inside so as to pass a cable for interfaces or power supplies.

A stopper 30J as a mechanism for position limit the slide of the guide rail protrudes vertically towards the rail groove 32 from a base end of the second rail 30A. When the maintenance operator pulls out the storage housing unit 14, the second rail 30A slides on the rail groove 32 towards the outside of the chassis and the stopper 30J comes into contact with a terminal end of the rail groove 32, thereby preventing the storage housing unit 14 from dropping out of the chassis 10(12).

Figure 8:
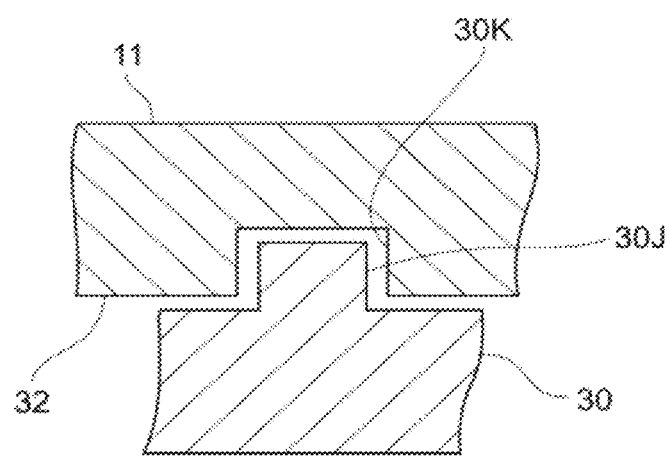
FIG. 8 is a sectional view of a stopper for regulating movements of the guide rail, and the rail groove, as taken along the widthwise direction of the guide rail.
Figure 9:
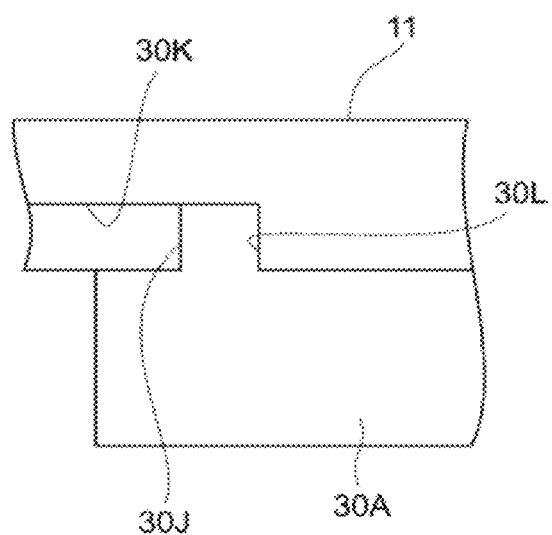
FIG. 9 is a side view of the stopper and the rail groove in FIG. 8.

FIG. 8 is a sectional view of the guide rail 30 in the widthwise direction, showing the relationship between the stopper 30J and the rail groove 32. FIG. 9 is a side view of the guide rail 30 shown in FIG. 8. As shown in FIG. 8, a second groove 30K for avoiding the pin 30J is formed in the cover 11 for the chassis 10(12), which constitutes the guide groove 32, along the lengthwise direction of the guide rail 30. Since the second groove 30K ends at a maximum protrusion position of the storage housing unit 14, the pin 30J comes into contact with the terminal end 30L of the second groove 30K at this position. As a result, the stopper mechanism including the pin 30J prevents a further protrusion of the storage housing unit 14 and also prevents the maintenance operator from excessively pulling out the storage housing unit 14 and letting it drop out of the chassis 10(12).

The rotation shaft 30H (FIG. 7B) on the top end side of the first rail 30B is connected to a substantially center of the top face of the storage housing unit 14; however, the rotation shaft 30H may be connected to the storage housing unit 14 at a position offset from the center of the top face of the storage housing unit 14 in the widthwise direction of the storage housing unit 14. For example, when reduction of the drawing length of the storage housing unit 14 is required, the entire drawing length may be reduced by an amount of offset by offsetting the rotation shaft 30H towards the handle 26 side. On the other hand, if the rotation shaft 30H is offset towards the chassis side, the first rail 30B can be no longer needed by attaching the rotation shaft 30H at the position of the hinge 30C. However, in this case, it is necessary to not limit a rotational direction of the storage housing unit 14 and an opening direction or an opening angle of the door 1002 for the rack 1 for housing the chassis 10(12) may be limited. (Specifically speaking, if the door 1002 cannot be opened any wider than 90 degrees relative to the chassis 10(12), the storage housing unit 14 may not be rotated to be positioned opposite the operator.)

Figure 10:
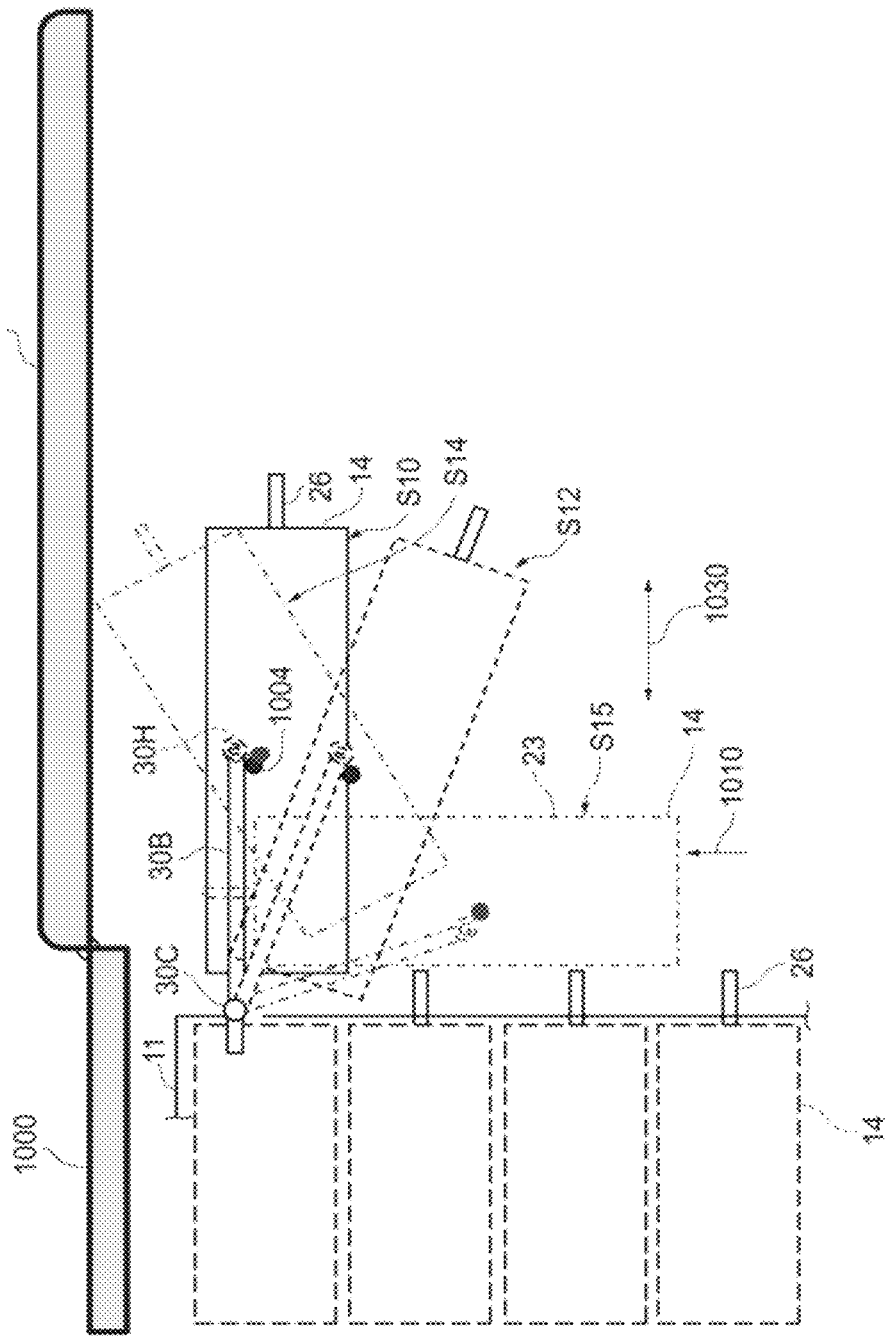
FIG. 10 is a plan view of the chassis and the storage housing units for explaining a first embodiment according to which the storage housing unit is pulled out of the chassis.

Next, a process of maintenance work performed by the maintenance operator by pulling the storage housing unit 14 out of the chassis 10(12) will be explained below. As shown in FIG. 10, the maintenance operator firstly pulls the handle 26 of the storage housing unit 14 toward him/her and pulls the storage housing unit 14 out of the chassis cover 11 to the maximum. This is the state shown in S10 in FIG. 10. Next, the maintenance operator rotates the first rail 30B for the storage housing unit 14 around the hinge 30C clockwise (S12). Incidentally, the symbol 1000 represents an outside wall 1000 of a side face of the rack 1 for mounting (housing) the storage apparatuses 10(12) and the symbol 1002 represents a door for opening the front side of the outside wall.

The storage housing unit 14 is rotated from S10 to S12 in the direction opposite to the side where the door 1002 exists after the door 1002 was opened. A pin 1004 for regulating the rotational direction of the storage housing unit 14 protrudes vertically from the top face of the storage housing unit 14 near the first rail 30B.

If an attempt is made to rotate the storage housing unit 14 clockwise from the state shown as S10 in FIG. 10, the pin 1004 comes into contact with the first rail 30B, thereby regulating the clockwise rotation of the storage housing unit 14. Therefore, in order for the maintenance operator to check or work on the back side of the storage housing unit 14, the storage housing unit 14 is temporarily turned around the hinge 30C to make it lean towards the chassis 10(12) (S12).

Figure 11:
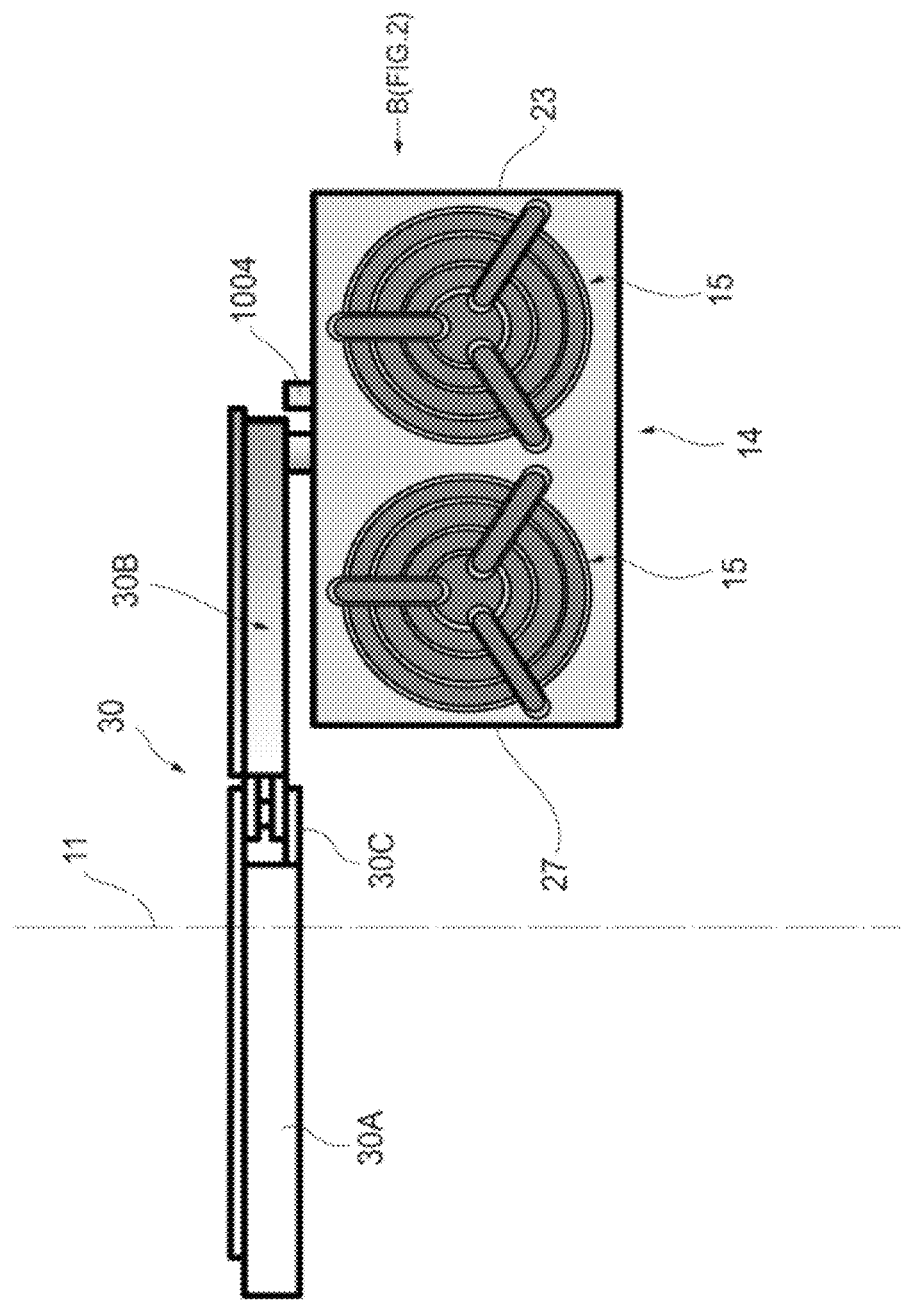
FIG. 11 is a rear view of the storage housing unit and a view of the guide rail as viewed in a direction indicated with arrow 1010 in FIG. 10.

Subsequently, the maintenance operator rotates the storage housing unit 14 around the rotation shaft 30H towards the door 1002 (S14) and then rotates the storage housing unit 14 clockwise around the hinge 30C (S15). FIG. 11 shows the storage housing unit 14 as viewed from the direction indicated with arrow 1010 in FIG. 10.

The symbol 23 in FIG. 10 represents a front face of the storage housing unit 14. The maintenance operator can insert the storage devices 16 into, or pulls the storage devices 16 out of, the storage housing unit 14 in directions indicated with arrows 1030. The maintenance operator can perform maintenance on, and replace, the storage devices 16 as he/she faces the front face of the chassis. As a result, it becomes easier for the maintenance operator to perform maintenance on, and replace, the storage devices 16. A storage device 16 to be replaced is specified by a indication means on the back board 27 of the storage housing unit. The maintenance operator can check the indication means on the back board 27 in the state of S14 when the storage housing unit 14 in FIG. 10 is located closer to the hinge side of the door 1002 or in the state of S10 when the storage housing unit 14 is located on the opening side of the door 1002.

Figure 12:
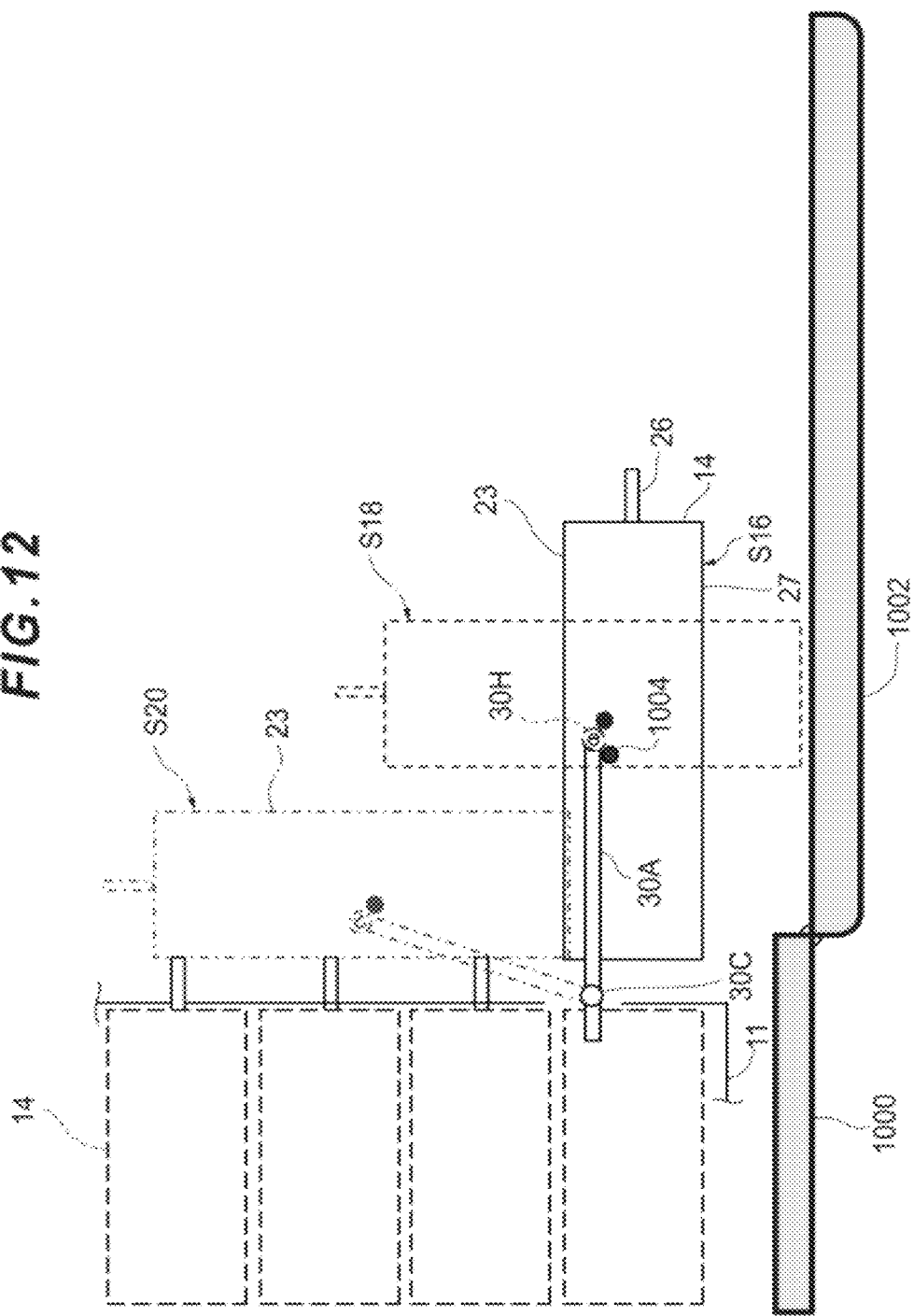
FIG. 12 is a plan view of the chassis and the storage housing units for explaining a second embodiment according to which the storage housing unit is pulled out of the chassis.

If the door 1002 opens in a direction opposite to the direction shown in FIG. 10, the maintenance operator pulls the storage housing unit 14 out of the chassis 10(12) (S16) and then rotates the storage housing unit 14 counterclockwise around the rotation shaft 30H so that it will not come into contact with the door 1002 (S18) as shown in FIG. 2 and FIG. 12. Furthermore, the maintenance operator rotates the storage housing unit 14 counterclockwise around the hinge 30C (S20). As a result, the maintenance operator moves the storage housing unit 14 so that the front face of the storage housing unit 14 will be placed opposite the maintenance operator. In this case, maintenance workability is improved as compared to the case shown in FIG. 10. However, even in the case of FIG. 10, the maintenance workability equivalent to that of the case shown in FIG. 12 can be realized by mounting the chassis 10(12) upside down.

During online maintenance work on the storage housing unit 14, the fans of the fan unit 15 keep rotating. Since the inside space of the storage housing unit 14 is closed by the cover 22 for the storage housing unit 14, the efficiency performing forced cooling of the storage devices 16 in the storage housing unit 14 will not be impaired. Therefore, the maintenance operator can continue the online maintenance work with no limitation on maintenance time, unlike the conventional cases.

When the maintenance operator takes up a faulty storage device 16 from the storage housing unit 14, they may insert a dummy canister, in place of the faulty device, into the storage housing unit 14; however, since an insertion slot of the storage device 16 is closed by a shutter mechanism as described later, insertion of a dummy canister into the storage housing unit 14 is not required. The maintenance operator can insert the storage device 16 into, or pull the storage device 16 out of, the storage housing unit 14 in a horizontal direction relative to the storage housing unit 14 from the front face of the storage housing unit 14. So, even if the rack 1 for the chassis 10(12) is located at a high position, it is easier to perform maintenance on, and replace, the storage devices 16.

Figure 13:
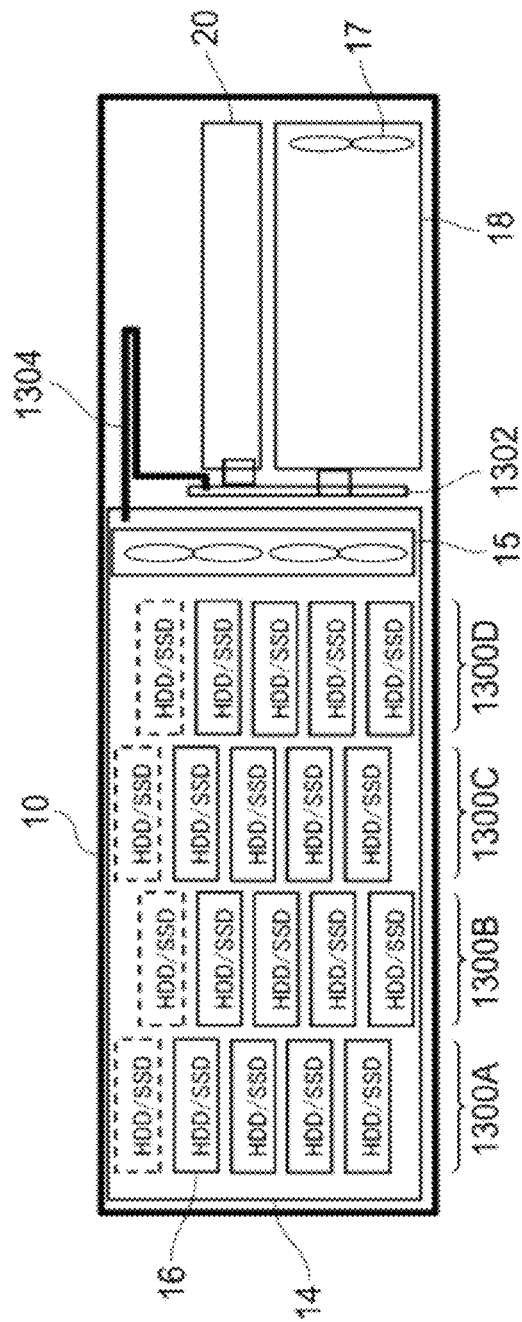
FIG. 13 is a side view of the chassis and the storage housing unit, showing a form in which a plurality of storage devices are placed in the chassis.

FIG. 13 shows an example of the storage devices 16 are placed in the storage housing unit 14 as viewed from the side face of the basic chassis 10, showing that the plurality of storage devices 16 are placed horizontally in the storage housing unit 14. If this form is used, a larger number of storage devices 16 than in conventional configurations can be placed in the storage housing unit 14 along the height of the storage housing unit 14.

The plurality of storage devices 16 are placed in a plurality of rows (four rows: 1300A through 1300D) from the view point of improving storage efficiency of the storage devices 16 in the storage housing unit 14. If this method is used, there is a degree of freedom in designing the height direction of the chassis and, therefore, this method has the advantage of capability to increase the size of, for example, the power supply unit 18 in the height direction.

Incidentally, the symbol 1302 represents a mid-plane board (main back-board) to which the power supply units 18, the controller modules 20, the storage devices 16, and a control cable 1304 for the fan unit 15 are connected. The control cable 1304 passes through the rail 30, is connected to the back board 27 in the storage housing unit 14, and then connected to the individual storage devices 16 via, for example, an SAS expander unit 2710. Incidentally, a plurality of storage devices 16 indicated with dotted lines in FIG. 13 represent that a storage section for the storage devices 16 can be easily extended in the height direction.

Figure 14:
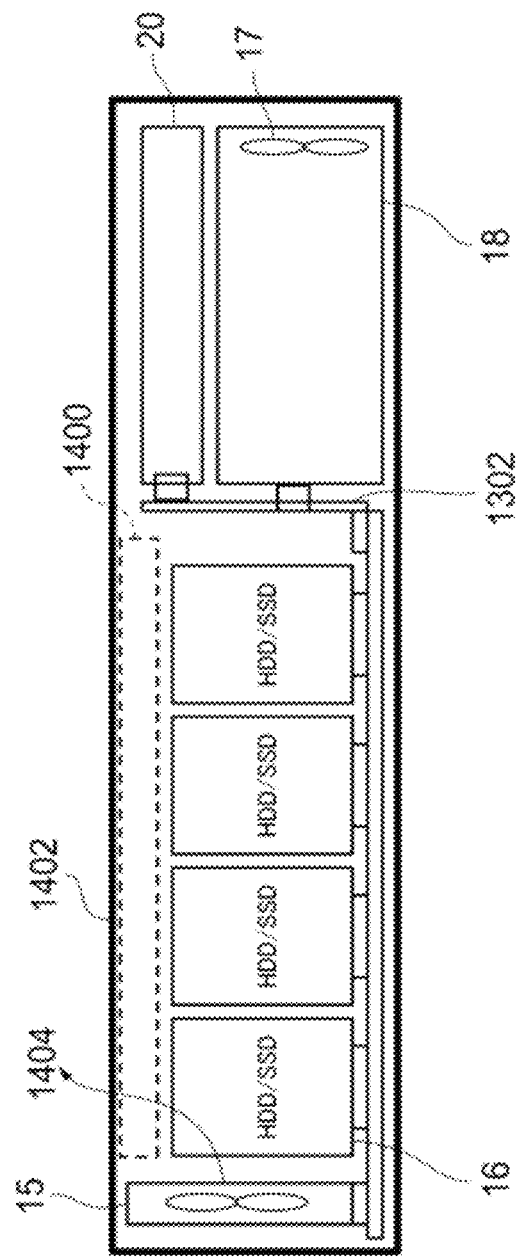
FIG. 14 is a side view of a chassis according to a conventional method, showing a form in which a plurality of storage devices are placed in the chassis.

On the other hand, FIG. 14 shows a conventional method of placing storage devices 16 by making them stand upright in the chassis 10. Since this method does not have a degree of freedom in designing in the height direction of the chassis 10, if the total height of the controller 20 and the power supply unit 18 is higher than the height of a storage device 16, a wasteful space 1400 that does not contribute to the storage capacity is produced and this space has a problem of the tendency to easily accumulate heat. The fan unit 15 exists on the front face of the chassis 10 and the outside air introduced by the fan unit 15 cools the inside of the chassis 10 and then exhausted from fans 17 at an end of the power supply unit 18. When maintenance of the storage devices 16 is performed by opening a door for a top face 1402 of the chassis 10. If the door for the top face 1402 is opened, the pressure of the outside air introduced via the fan unit 15 on the front face of the chassis is released out of the chassis from the opened top face (arrow 1404), the outside air introduced by the fan unit 15 at the front of the chassis cannot contribute to cooling of particularly the storage devices 16 at positions away from the fan unit 15 in the chassis 10.

Figure 15:
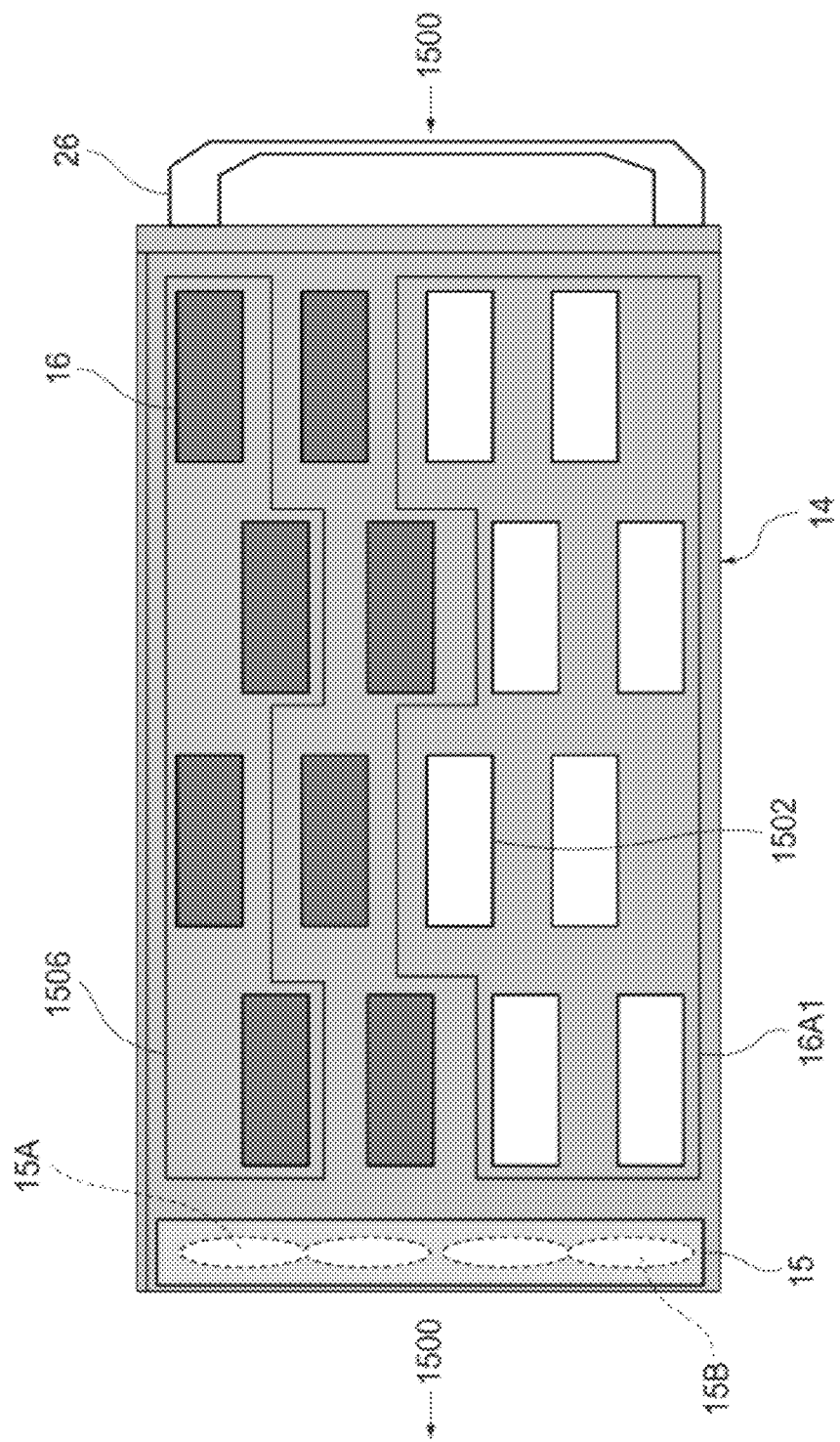
FIG. 15 is a side view of the storage housing unit showing a structure for housing a plurality of HDDs.

A plurality of storage devices 16 are placed in the storage housing unit 14 in a form as shown in FIG. 15, an enlarged view, so that the positions of the storage devices 16 in adjacent rows are staggered. Because of this staggered arrangement, a flow of the cooling air (direction indicated with arrow 1500) in the storage housing unit 14 hits directly the storage devices 16 in the next row, thereby enhancing the cooling effect. Furthermore, a shutter mechanism 2400 (described later) exists at an insertion slot 1502 of the storage device 16, thereby preventing insufficient forced cooling due to direct intake of the outside air from the insertion slot 1502, into which no storage device 16 is inserted, and keeping a uniform airstream of the cooling air in the storage housing unit 14.

The fan unit 15 is equipped with two fans 15A, 15B in the height direction of the storage housing unit 14. Assuming that there is no storage device 16 insertion area indicated with the symbol 16A1, the storage housing unit 14 stops the fan 15B, which covers the area 16A1 with no storage device, or reduces the rotational speed of the fan 15B, thereby enhancing the power-saving effect.

A RAID group composed of a plurality of storage devices 16 is defined in a direction across the rows. The symbol 1506 represents a plurality of storage devices 16 which form the same RAID group.

The controller 20 stops, or reduces the rotational speed of, the fan 15A of the fan unit which is covered a plurality of HDDs 1600 constituting the RAID group 1506 for which the power is saved by MAID (Massive Array of Idle [Inactive] Disks). On the other hand, the controller 20 increases the rotational speed of the fan 15A which is covered the plurality of HDDs 1600 constituting the RAID group which is highly loaded.

Next, a supporting structure for the plurality of storage devices 16 in the storage housing unit 14 will be explained below. The main characteristic is establishment of a supporting structure for mitigating or canceling generated vibrations in the storage housing unit 14. For that purpose, the storage housing unit 14 elastically supports the storage devices 16. The elastic supporting structure is ideal for realization of a vibration suppression control mechanism for the HDDs 1600 which are the sources of vibrations.

Figure 16:
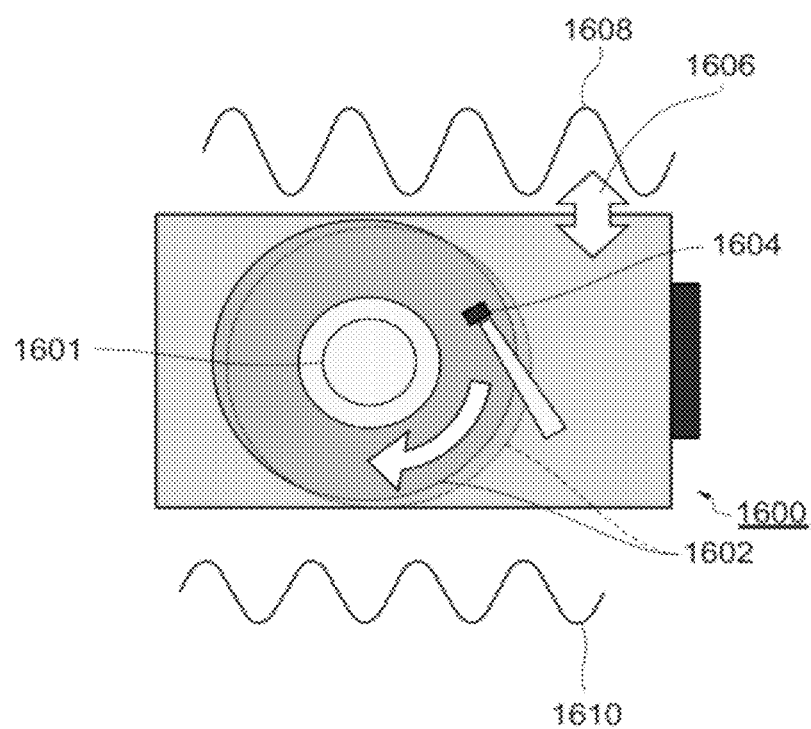
FIG. 16 is a simplified plan view of an HDD, for explaining the principle of vibration generation in the HDD.

A factor of vibrations generated in the storage housing unit 14 will be firstly explained. FIG. 16 is a plan view of an HDD 1600 and a plurality of disks (circular plates) 1602 are joined on top of each other in the HDD 1600. The plurality of disks 1602 are fixed to the same rotating shaft (spindle) 1601. If these disks 1602 center are biased (e.g. out of alignment) from the rotation center of the spindle 1601, vibrations 1608, 1610 are generated in a radial direction 1606 of the disks 1602.

Even if this bias is only slight, vibrations of the plurality of disks in a chassis having a conventional structure may be propagated to each other through a frame supporting the HDDs 1600, thereby amplifying the vibrations or causing sympathetic vibrations in the frame. If the thus amplified vibrations are applied through the chassis frame to the HDDs 1600, they become a disturbance to settling of a head 1604 of the HDDs 1600 and may cause deterioration of access performance or have serious negative-effects such as R/W disability.

In order to eliminate such negative-effects, the storage housing unit 14 firstly has a mechanism for elastically supporting a plurality of storage devices 16. The supporting unit explained below not only just elastically supports the plurality of storage devices 16, but also holds the plurality of storage devices 16 so that the adjacent storage devices 16 mutually negate vibrations.

Figure 17:
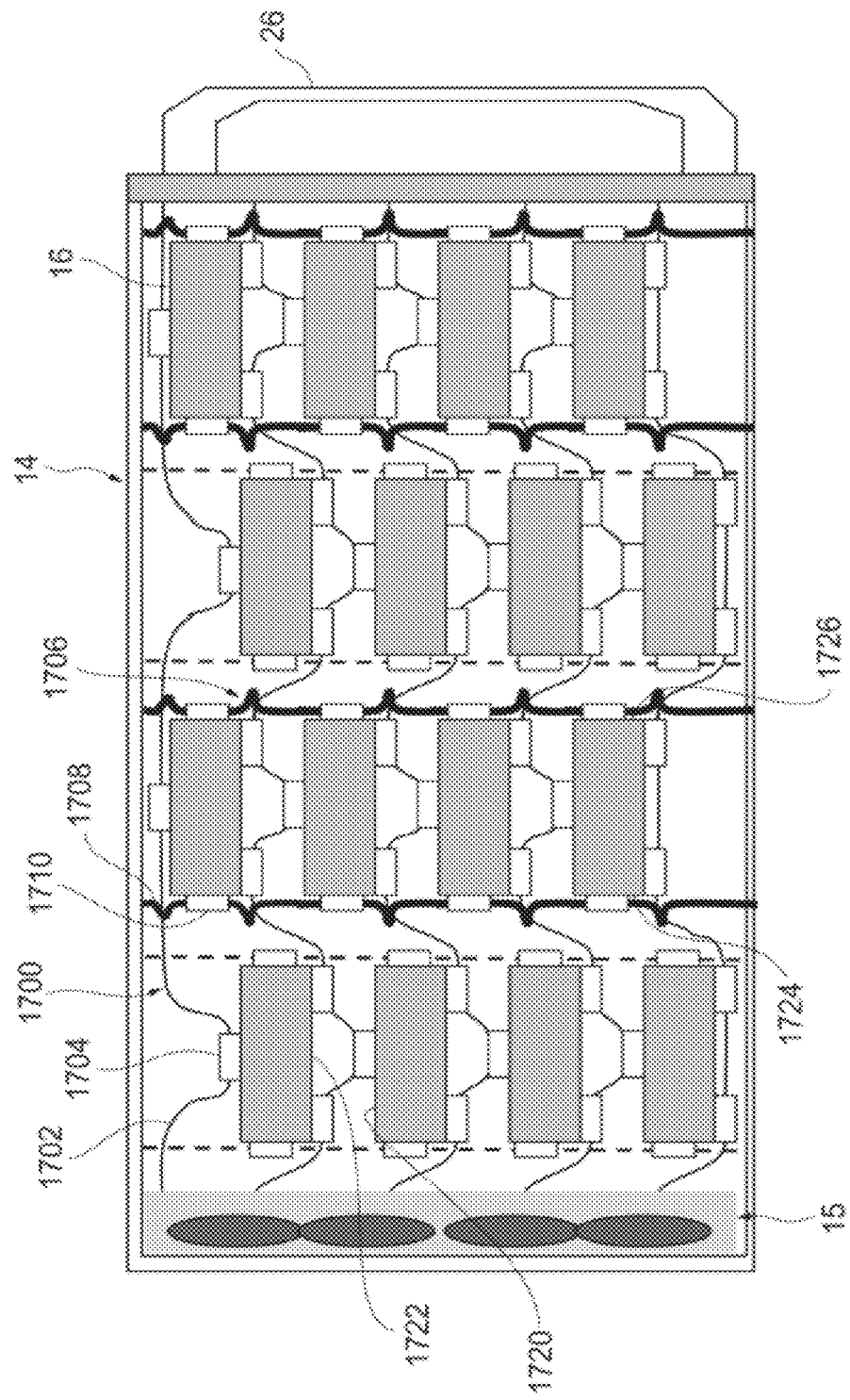
FIG. 17 is a front view of the storage housing unit, showing a supporting structure for the plurality of storage devices in the storage housing unit as viewed from the front face of the storage housing unit.

FIG. 17 shows the supporting structure for the plurality of storage devices 16 in the storage housing unit 14 as viewed from the front face of the storage housing unit 14. The supporting unit includes a first supporting unit 1700 for supporting the plurality of storage devices 16 in a horizontal direction and a second supporting unit 1706 for supporting the plurality of storage devices 16 in a vertical direction.

The first supporting unit includes horizontal elastic elements 1702 having elasticity and horizontal contact elements 1704 for supporting the storage devices 16 relative to the horizontal elastic elements 1702. The second supporting unit 1706 includes vertical elastic elements 1708 having elasticity and vertical contact elements 1710 for supporting the storage devices 16 relative to vertical elastic elements 1708. Dotted lines show simplified illustrations of some vertical elastic elements 1708.

The first supporting unit 1700 supports the top face 1720 of a storage device 16 and, at the same time, also supports the bottom face 1722 of another storage device 16 adjacent to and above the former storage device 16. The second supporting unit 1706 supports the right and left side faces of a plurality of storage devices 16 in the same row. Each storage device 16 is elastically supported in vertical and horizontal directions by the first supporting unit 1700 and the second supporting unit 1706.

Figure 18:
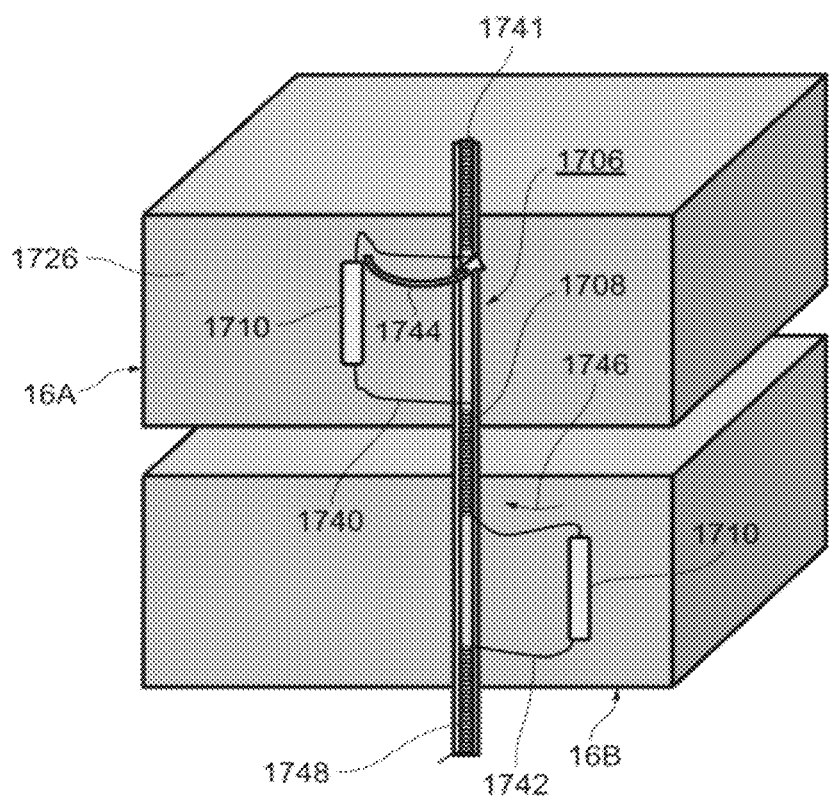
FIG. 18 is a perspective view for explaining the details of a mechanism for elastically supporting the plurality of storage devices vertically adjacent to each other in the storage housing unit.

FIG. 18 is a perspective view of two storage devices 16A, 16B which are arranged adjacent to each other, one on top of the other, in each row as viewed from the base end side of the storage devices 16. The vertical elastic element 1708 of the second supporting unit 1706 includes a steel wire 1741 (which may be a coil as shown in FIG. 18) that extends in the arranged direction of the plurality of storage devices 16, that is, extends linearly in the vertical direction, and has spring characteristics; and is constituted so that the steel wire 1741 is twisted in an opposite direction at each adjacent mounting position of the storage device 16 (the steel wire is twisted to extend towards the top end side or the base end side of the storage devices 16A, 16B alternately), the twisted parts of the steel wire constitute arms 1740, 1742, each extending in a substantially U-shape, and a contact element 1710 at the top end of the arm 1740 comes into contact with the storage device 16. Since the arms 1740, 1742 have spring characteristics, the arms fulfill a function as a branch member from the steel wire 1741 for delivering elasticity of the steel wire 1741 to the storage device 16. As the above-described constitution is used, the vibrations (stress) applied to each arm act on the storage device 16A in a direction indicated as 1744 in the drawing and act on the storage device 16B, which is placed below and adjacent to the storage device 16A, in a direction indicated as 1746 which is reversed to the direction 1744, so that the vibrations (stress) acting on the storage devices 16A, 16B are offset with each other, thereby preventing sympathetic vibrations of the plurality of the storage devices. Furthermore, a guide unit 1748 for reinforcing the steel wire 1741 in the vertical direction may be provided in order to preventing an intermediate part of the steel wire 1741 from buckling and being twisted due to the stress applied to each arm. This guide unit 1748 is of a small-diameter pipe shape whose diameter is so small as to allow the steel wire 1741 to be inserted through, and which have open sides from which the arms 1740, 1742 protrude. Therefore, since the area of the guide unit 1748 facing the flow of cooling air is small, the resistance of the guide unit 1748 to the flow of cooling air is low.

Since elasticity is delivered from the steel wire 1741 to the arms 1740, 1742, the arms 1740, 1742 press the storage device 16 and thereby elastically support both side faces 1726 of the storage devices 16A, 16B. If the steel wire 1741 is formed into a coil shape as shown in FIG. 18, a winding direction of the coil is reversed alternately at the storage devices 16A, 16B placed adjacent to each other, one on top of the other.

Figure 19:
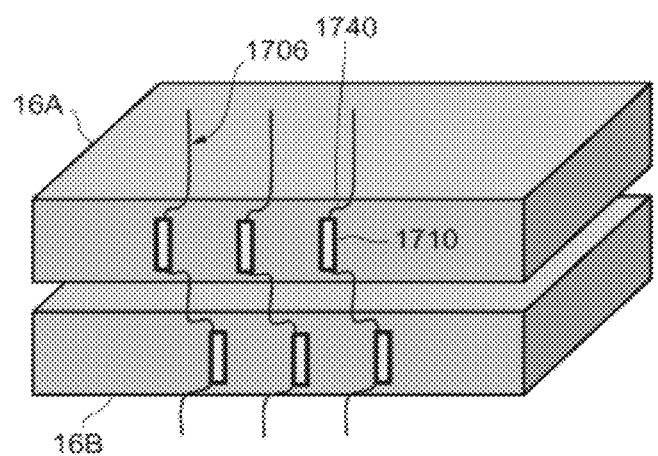
FIG. 19 is a perspective view of the storage devices for explaining the first embodiment relating to a state in which the (pillar) mechanism for elastically supporting the storage devices is placed.

The contact element 1710 is composed of, for example, a collar or a needle-bearing and can freely roll over the side face 1726 of the storage device 16A, 16B. Therefore, when the storage device 16A, 16B is inserted into the storage housing unit 14, the contact element 1710 rolls in contact with the side face 1726 of the storage device 16A, 16B. So, the maintenance operator can insert the storage device 16A, 16B through the insertion slot 1502 (FIG. 15) of the storage housing unit 14 without hindrance. The same can be said for the horizontal contact element 1704. A plurality of second supporting units 1706 exist in the horizontal direction of a storage device 16 as shown in FIG. 19.

If vibrations are generated at the storage device 16A and stress is generated at the arms 1740 in the direction indicated with the symbol 1744 in FIG. 18, torsion stress is generated at the steel wire 1741. As the winding direction of the steel wire (coil) 1741 relative to the storage device 16B is reversed, the direction (phase) of the torsion stress is reversed from the stress generated by the arms 1742 elastically supporting the storage device 16B.

In other words, the second supporting unit 1706 supports the plurality of storage devices 16 placed adjacent to each other, one on top of the other, in the storage housing unit 14 so as to mutually negate the vibrations between the adjacent storage devices 16. Another example of a means or mechanism for mutually suppressing or canceling the vibrations between the adjacent storage devices 16 is a torsion bar. The torsion bar may be used instead of, or in addition to, the coil.

Vibrations of the HDDs 1600 are not generated on the first supporting unit 1700 side in this embodiment, so that the spring characteristics of the second supporting units 1706 are not necessarily required for the first supporting unit 1700. However if the HDDs 1600 are mounted in the vertical direction, the same effect can be expected by providing the first supporting unit 1700 side with the aforementioned mechanism.

Figure 20:
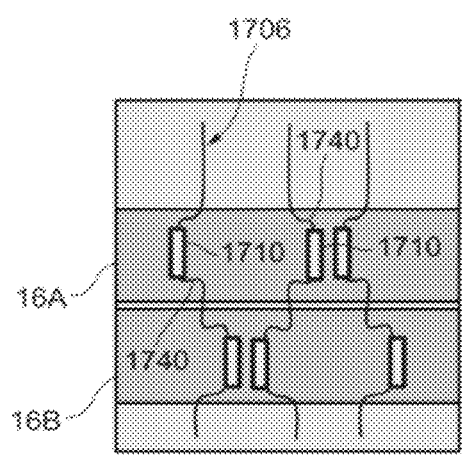
FIG. 20 is a side view of the storage devices for explaining the second embodiment relating to a state in which the (pillar) mechanism for elastically supporting the storage devices is placed.

As shown in FIG. 19, the direction of the arms 1740 for the plurality of second supporting units 1706 existing on the side faces of the storage devices 16A, 16B, that is, the winding direction of the steel wire (coil) 1741, may be the same with respect to the same device 16A (16B) or may be changed alternately to the opposite direction as shown in FIG. 20. Furthermore, resonance frequency can be dispersed by changing the arm length or the arm width (=length of an intermediate part) at each mounting position.

Figure 21:
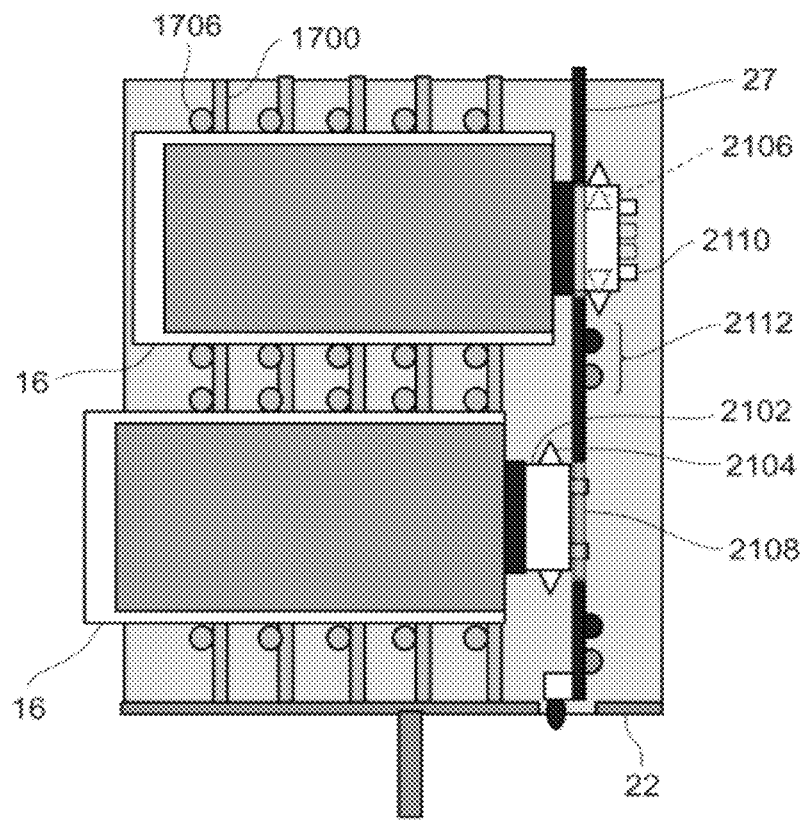
FIG. 21 is a plan view of the storage devices in the storage housing unit for explaining a latch mechanism on the base end side of the storage devices.

There is a latch mechanism 2102 on the base end side of the storage device 16 as shown in FIG. 21. As the storage device 16 is inserted into the storage housing unit 14 and the latch mechanism 2102 protrudes from an opening 2108 in the back board 27, latch hook 2104 of the latch mechanism comes into contact with the back board 27 as indicated with the symbol 2106 and then temporarily retract into the latch mechanism 2102; and after the latch mechanism 2102 passes the back board 27, the latch hook 2104 protrude from the latch mechanism 2102. As a result, the storage device 16 is latched on the back board 27 of the storage housing unit 14. The symbol 2106 represents a latch release lever 2110 which is used to make the latch hook 2104 retracted into the latch mechanism 2102; and as the latch mechanism 2102 with the latch hook 2106 retracted inside is pushed toward the back board 27, the storage device 16 to be replaced can be pulled out of the storage housing unit 14. The symbols 1700 and 1706 represent simplified illustrations of the first and second supporting units in FIG. 17 which serve as the guide mechanisms and the supporting units. LEDs 2112 (annunciation means) for indicating status of each storage devices 16 exist on the back board 27. As described above, the operation from the back board 27 (back face) side, it has the advantage of eliminating the need for, for example, providing the module of the storage devices 16 with a mechanism for guiding the LED light on the back board 27 towards the front face.

Figure 22A:
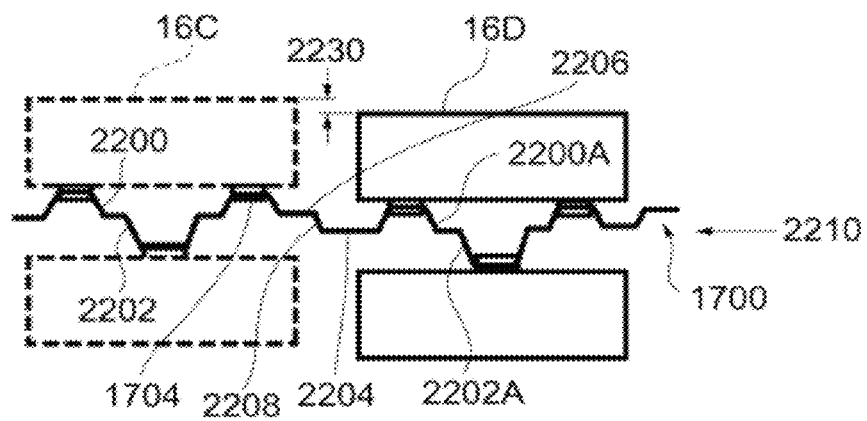
FIG. 22A is a front view illustrating an overview of the storage devices and the elastic support unit (beam), showing that the plurality of storage devices are supported by the elastic support unit (beam) in a horizontal direction in the storage housing unit.
Figure 23:
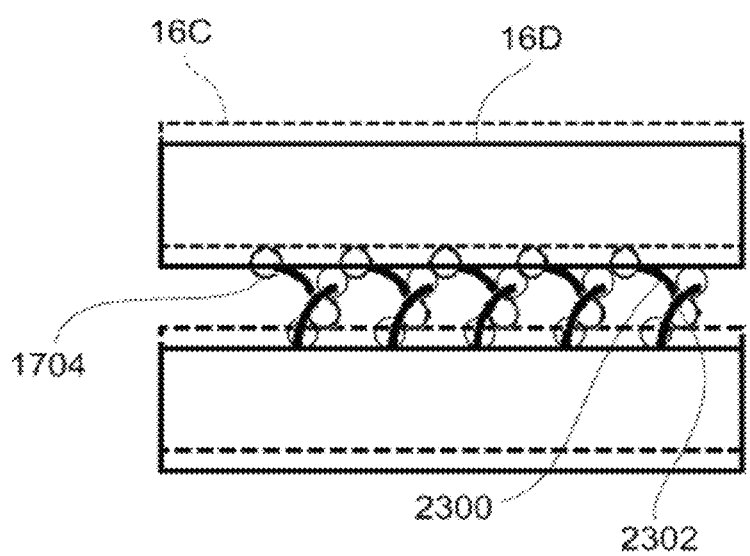
FIG. 23 is a side view illustrating an overview of the storage devices and the elastic supporting unit as viewed in a direction indicated with arrow 2210 in FIG. 22A.

Since the HDDs vibrate in a radial direction of the disks, the first supporting unit 1700 (FIG. 17) according to this embodiment is effective not in mitigating the vibrations, but in horizontally supporting the plurality of storage devices 16 in the staggered arrangement in the storage housing unit 14. FIG. 22A shows the details of the state in which the plurality of storage devices 16 are supported horizontally in the staggered arrangement by the first supporting unit 1700. FIG. 22A is a diagram viewed from the front faces of the storage devices 16. FIG. 23 is a diagram viewed in a direction indicated with arrow 2210 in FIG. 22A.

Referring to FIG. 22A, the symbols 2200 and 2202 represent the arms of the steel wire (coil) of the first supporting unit 1700 for horizontally supporting the two storage devices 16 placed adjacent to each other, one on top of the other, and the symbols 2200A and 2202A represent the same. A distance between the storage devices 16 is shown to be longer than the normal distance for the explanatory purpose in this example. There is a height difference as indicated with arrow 2230 between a steel wire (coil) 2206 and a steel wire (coil) 2204, that is an offset part 2208 corresponding to a height difference in the height direction between the two horizontally adjacent storage devices 16C, 16D due to the staggered arrangement of the steel wires (coils).

Figure 22B:
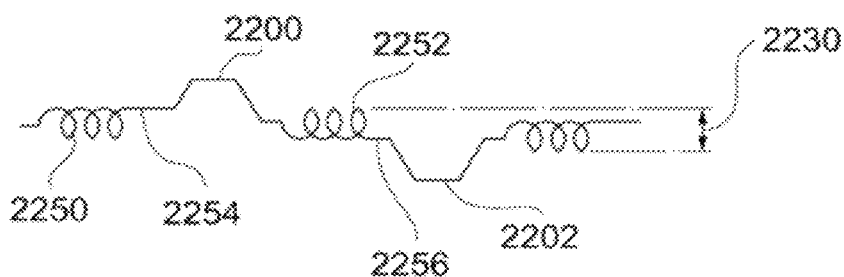
FIG. 22B is a schematic illustration showing a first embodiment of a supporting unit for placing the plurality of storage devices in a staggered arrangement.

FIG. 22B is a schematic illustration of a first embodiment for realizing the aforementioned offset area 2230. An upper arm 2200 is formed on the storage device 16C side from an upper dead center 2254 of a wound part of the steel wire (coil) 2250, 2252 and a lower arm 2202 is formed at a storage device below the storage device 16C from a lower dead center 2256 of a wound part of the steel wire (coil) 2252. As a result, an offset area 2230 having an offset amount corresponding to the diameter of the steel wire (coil) is formed.

Figure 22C:
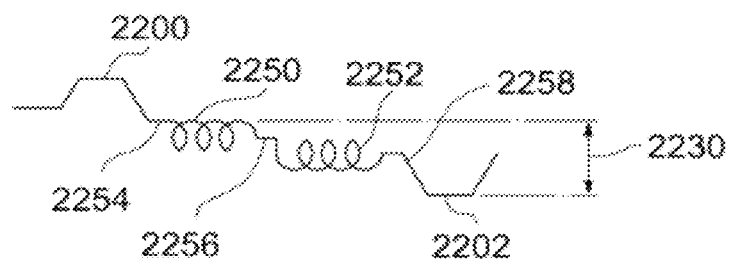
FIG. 22C is a schematic illustration showing a second embodiment of a supporting unit for placing the plurality of storage devices in a staggered arrangement.

FIG. 22C is a schematic illustration of a second embodiment for realizing the offset area 2230. A first arm 2200 is formed on the storage device side from the upper dead center 2254 of the first steel wire (coil) 2250. The upper dead center of the wound part of the second steel wire (coil) 2252 is connected to the lower dead center 2256 of the wound part of the first steel wire (coil) 2250 and a second arm 2202 is formed at a lower dead center 2258 of the wound part at the other end of the second steel wire (coil) 2252 toward the storage device. Therefore, according to this embodiment, an offset area 2230 having an offset amount corresponding to the size equal to the sum of the diameters of the two coils is formed.

Figure 22D:
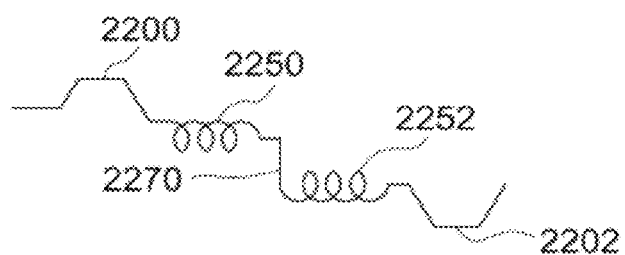
FIG. 22D is a schematic illustration showing a third embodiment of a supporting unit for placing the plurality of storage devices in a staggered arrangement.
Figure 22E:
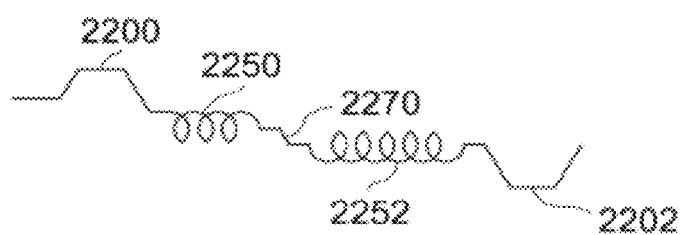
FIG. 22E is a schematic illustration showing a fourth embodiment of a supporting unit for placing the plurality of storage devices in a staggered arrangement.

FIG. 22D is a schematic illustration of a third embodiment for realizing the offset area 2230. The difference between this embodiment and the embodiment shown in FIG. 22B is that a linear wire portion ((level adjustable) intermediate portion 2270 is provided between the first steel wire (coil) 2250 and the second steel wire (coil) 2252 along a vertical direction. As a result, the offset amount of the offset area 2230 is obtained by adding the length of the intermediate portion and two of the winding diameter of the coil. FIG. 22E is a schematic illustration of a fourth embodiment and a variation of the third embodiment. The intermediate portion 2270 in FIG. 22D is inclined in a traverse direction so as to form the intermediate portion 2270 gradually. This form of the steel wire (coil) in FIG. 22D corresponds to that in FIG. 22A. As explained earlier, the height difference between the storage devices for the staggered arrangement can be realized in a well-balanced manner by the winding diameter of the steel wire (coil) and the height difference length. Under this circumstance, the number of winding turns of the steel wire (coil) may be about one and a half turns; however, the aforementioned guide unit 1748 cannot be used for the first supporting unit 1700 because the coils are located in a staggered arranged and, therefore, the steel wire (coil) requires adequate strength.

Referring to FIG. 23, the symbol 2300 shows a form in which the arm 2200 and the arm 2202 are combined, and the symbol 2302 shows a form in which the arm 2200A and the arms 2202A are combined. As can be seen from FIG. 23, the direction of the arm indicated with the symbol 2300 and the direction of the arm indicated with the symbol 2302 are opposite to each other and thereby constitute a pair like a right curve and a left curve. Furthermore, FIG. 23 shows that the storage devices 16 are held by a plurality of first supporting units 1700.

Figure 24:
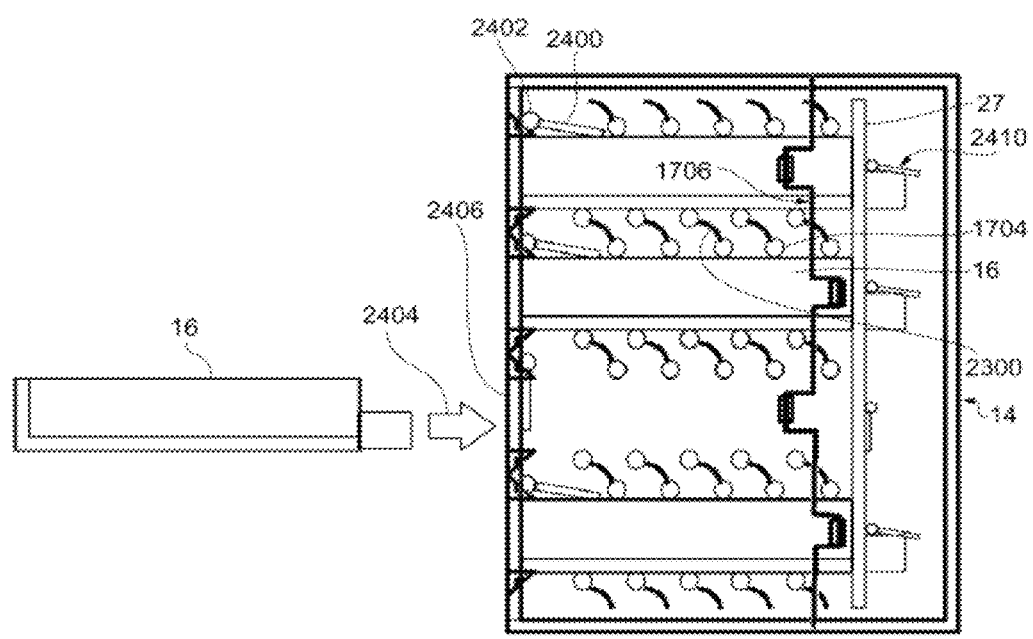
FIG. 24 shows an overview of the internal structure of the storage housing unit into which a storage device is inserted, as viewed from the side face of the storage housing unit.

FIG. 24 shows a state in which a storage device 16 is being inserted into the storage housing unit 14, as viewed from the side face of the storage housing unit 14. The shutter 2400 rotate around its center 2402 and force is applied to the shutter 2400 in the direction to close an opening 2406 of the insertion slot 1502 (FIG. 15) for the storage device 16. Another shutter 2410 having a similar configuration also exists on the back board 27. Incidentally, the aforementioned latch mechanism 2102 is exposed under the open shutter, so that the system administrator can operate the latch mechanism.

When the maintenance operator inserts the storage devices 16 through the opening 2406 into the storage housing unit 14 in the direction indicated with arrow 2404, the storage device 16 pushes up the shutter 2400 into the storage housing unit 14 and comes into contact with the contact elements 1704 for the first supporting units 1700 and the contact elements 1710 for the second supporting units 1706 as it moves into the storage housing unit 14. Incidentally, a storage housing unit 14 specialized for mounting SSDs and a storage housing unit 14 specialized for mounting memory units 2722 do not have the problem of vibrations unlike the HDDs 1600, so that the elastic support means may be omitted or simplified.

Figure 25:
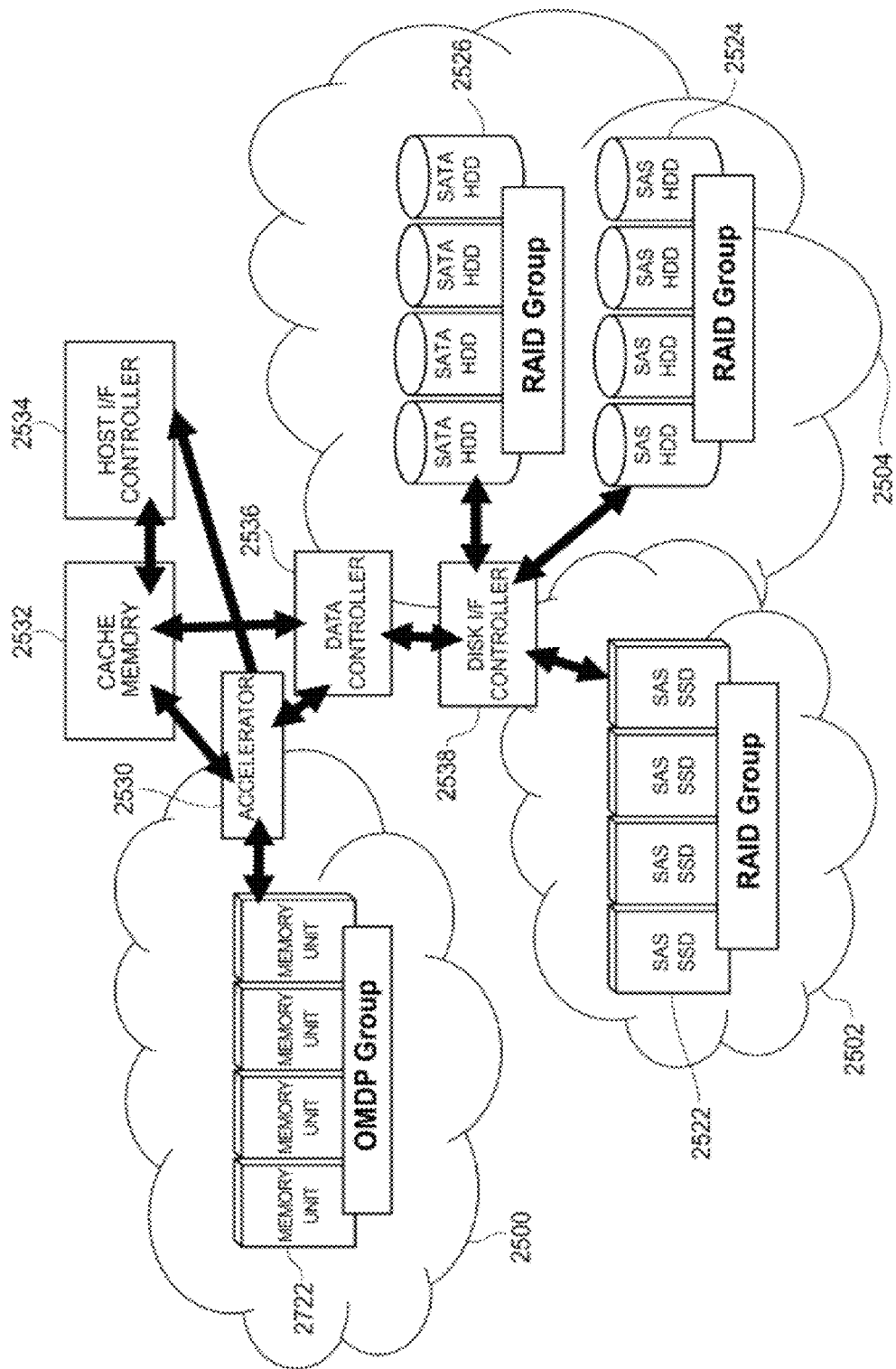
FIG. 25 is a block diagram showing an example of storage pools for thin provisioning.

As storage devices 16 placed in the storage housing unit 14, there are memory units 2722 besides HDDs 1600 and SSDs 2522 as mentioned above. If thin provisioning is realized in a system where the HDDs/SSDs and the memory units are mixed, storage pools for managing storage resources are, for example, as shown in FIG. 25.

Figure 55:
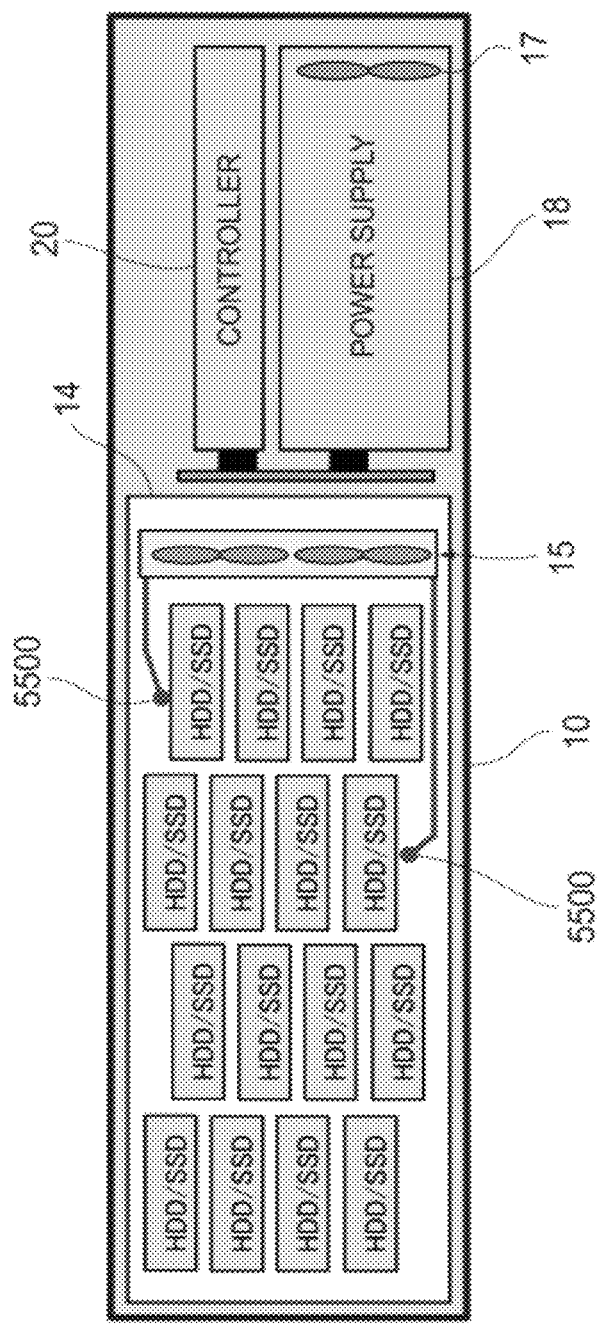
FIG. 55 is a side view of the storage apparatus (overview) for explaining a form in which temperature sensors are provided in the storage housing unit so that a fan unit for the storage housing unit is controlled based on a signal from the sensors (without a controller controls).

Incidentally, referring to, for example, FIGS. 13, 14, and 55, the word HDD/SSD means that the storage devices are HDDs and/or SSDs. Regarding the types of storage housing units 14 having HDD/SDD drives, there are storage housing units 14 including only HDDs drives 1600, those including only SSD drives 2522, or those including a combination of HDD drives 1600 and SSD drives 2522.

The storage pools are defined and managed on a tier basis. Tier 0 is composed of a memory mapped pool 2500 constituted from memory units 2722 whose data processing performance is the highest. Tier 1 is composed of a pool 2502 constituted from the SSDs 2522 whose interfaces are SAS. Tier 2 is composed of a pool 2504 constituted from HDDs 2524 whose interfaces are SAS, and HDDs 2526 whose interfaces are SATA. The storage pools are not limited to the example described above and Tier 3 composed of only HDDs 2526 whose interfaces are SATA may be configured separately.

A plurality of memory units 2722 in Tier 0 is formed an OMDP (On-Memory Data Protection) group. Pluralities of storage devices belonging to each of other tiers constitute groups according to the RAID method.

Tier 0 and Tier 1 pools (2500, 2502) are stored online data. Tier 2 or subsequent pools (2504) are stored low-access-frequency data such as archive data. The storage system can migrate data in the Tier 0 or Tier 1 pool (2500, 2502) to the Tier 2 or subsequent pools (2504) according to the data access frequency.

An accelerator 2530 is a hardware and software module for assisting host I/O processing on the memory units 2722. The accelerator 2530 is connected via an interface composed of PCIe to the memory units 2722. The memory mapped pool 2500 is an aggregate of memory spaces in a plurality of memory units 2722 which are mapped to the addresses of virtual volumes.

Data input to, and output from, the host computers 2702 are controlled by a host interface controller 2534. A cache memory 2532 temporarily stores the data. Data transfer between the cache memory 2532 and the HDDs/SSDs are controlled by a data controller 2536. Data transfer between the data controller 2536 and the HDDs/SSDs are controlled by a disk interface controller 2538. The accelerator 2530 performs DMA transfer of data to the cache memory 2532. Meanwhile, when the host computer 2702 reads data, data for which no cache hit took place is directly transferred by means of DMA from the accelerator 2530 to the host interface controller 2534.

Between the accelerator 2530 and the data controller 2536, the accelerator 2530 migrates data from the memory units 2722 to the HDDs/SSDs. Data migration in the direction opposite to the above-mentioned direction can also be performed.

The storage housing unit 14 is configured so that it can respond to both the interface (SAS) for the HDDs/SSDs and the interface (PCIe) for the memory units 2722 as described above. Specifically speaking, the storage housing units 14 are designed so that they share a connector for the interface for the HDDs/SSDs and a connector for the interface for the semiconductor memory units 2722 and can exchange control modules necessary for their respective operations to each other. For example, the SAS expander unit 2710 and the fan unit 15 in the storage housing unit 14 in which the HDDs/SSDs are placed can be exchanged with the PCIe switch unit 2711 or the PCIe switch unit 2711 and the accelerator unit 2530.

Figure 26A:
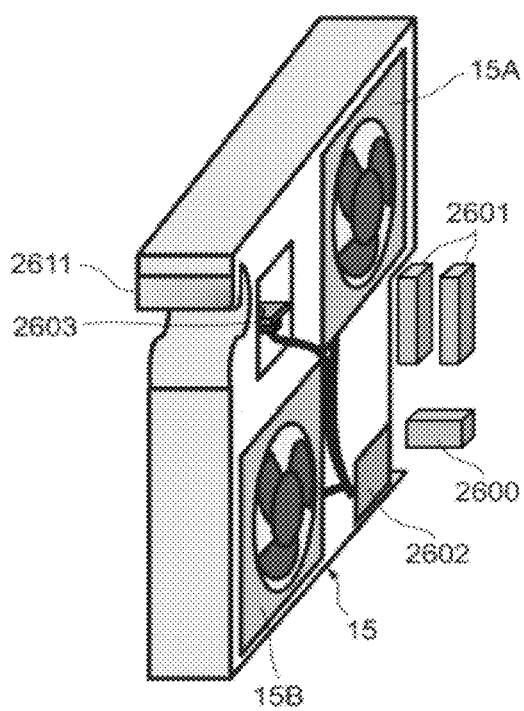
FIG. 26A is a perspective view illustrating an overview of a fan unit at a base end section of the storage housing unit.

FIG. 26A is a perspective view of the fan unit 15 at the base end section of the storage housing unit 14. The fan unit 15 includes a pair of fans 15A, 15B, one on top of the other, and a power distribution and fan control circuit 2602 for driving the fans. The circuit 2602 is connected to a power supply and control interface connector 2600. The symbol 2601 represents PCIe connectors, but the fan unit 15 is not connected to the PCIe connectors.

The fan unit 15 also has a circuit for a status indicating LED 2603 and the light of the LED 2603 is projected onto a part 2611 at the lower part of the handle which is made of translucent plastic.

Figure 26B:
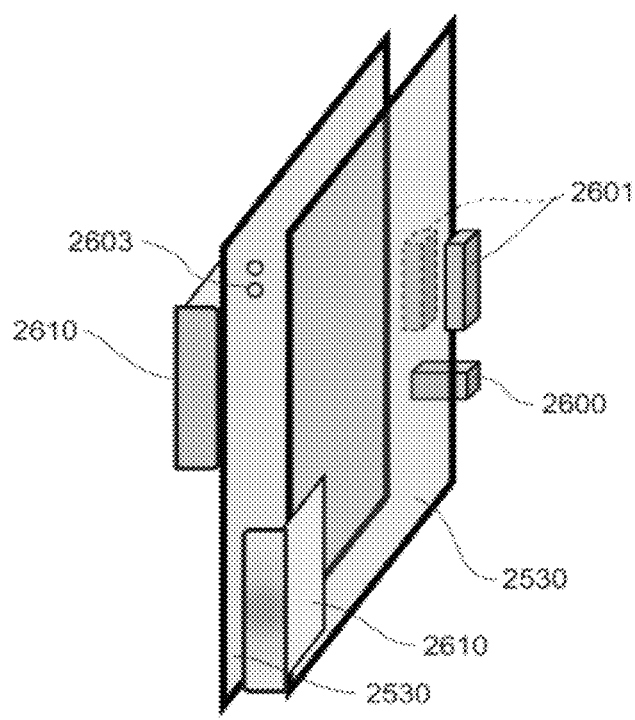
FIG. 26B is a perspective view of an overview illustrating a state in which the fan unit is removed from the base end section of the storage housing unit and an accelerator unit is mounted.

FIG. 26B is a perspective view showing a state in which the fan unit 15 is removed from the base end section of the storage housing unit 14 and the accelerator units 2530 are mounted. Two accelerator units 2530 are mounted from the viewpoint of achieving redundancy. The accelerator units 2530 are connected to the PCIe connectors 2601. The symbol 2610 represents a handle to attach the two accelerator units 2530 to, or remove them from, the inside of the storage housing unit 14. This handle is made of translucent plastic so that the light of the LED 2603 for indicating the status of the accelerator units 2530 located behind the handle is projected onto the handle and the maintenance operator can visually recognize the light of the LED 2603.

Although not shown in the drawing, vent holes are formed in a circuit board of the accelerator unit 2530. The memory units 2722 do not have to be cooled, but the outside air introduced through the vent holes 28 in the front face of the storage housing unit 14 to cool the power supply unit 18 on the base end section of the storage housing unit 14 passes through the storage housing unit 14 and reaches the power supply unit 18 through the vent holes in the accelerator unit 2530.

Figure 27:
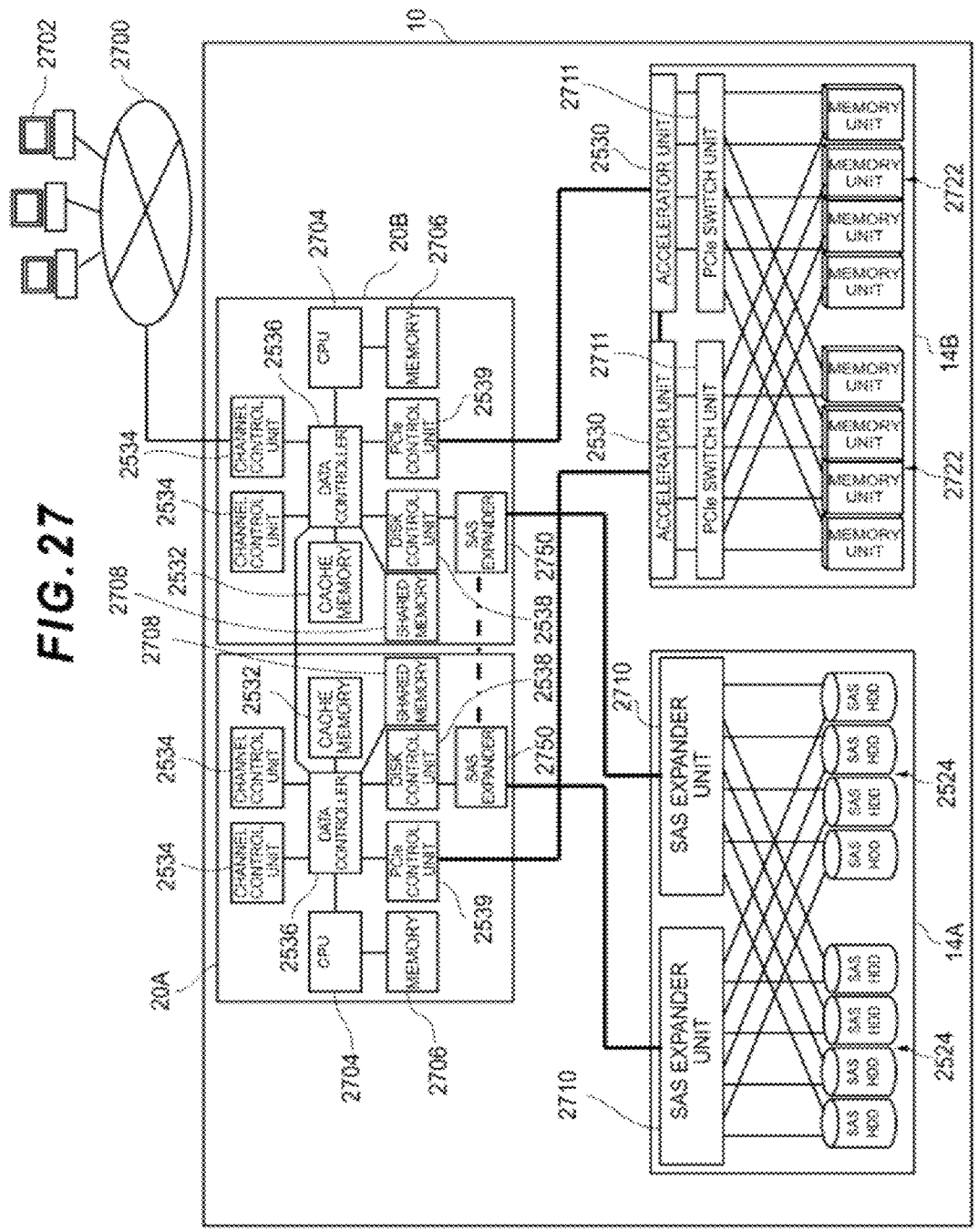
FIG. 27 is a control block diagram of a basic chassis for the storage apparatus.

FIG. 27 is a control block diagram of the basic chassis 10. The basic chassis 10 includes a plurality of controllers 20A, 20B and a plurality of storage housing units 14A, 14B. The storage housing unit 14A includes SAS HDDs 2524 as the storage devices 16 and the storage housing unit 14B includes memory units 2722 as the storage devices 16.

There are four storage housing units 14 in each chassis as shown in FIG. 2 and the remaining two storage housing units 14 are omitted in FIG. 27. FIG. 27 also shows a smaller number of storage devices 16 placed in the storage housing unit 14A, 14B than those in FIG. 2 for the sake of convenience. From the viewpoint of redundancy, two controllers 20 (20A, 20B) exist and each controller 20A, 20B is connected to the storage housing units 14A, 14B.

Each controller 20A, 20B includes: a channel control unit (host interface controller) 2534 for controlling an interface with the host computer 2702; a cache memory 2532 for temporarily store data; a shared memory 2708 for storing a plurality of pieces of shared information such as configuration information and control tables; a disk control unit (disk interface controller) 2538 for controlling data transfer to/from the HDDs/SSDs; a PCIe control unit 2539 for controlling data transfer to/from the memory units 2722; a data controller 2536 for controlling data transfer between each block; a CPU 2704 for controlling the data controller 2536; and a local memory 2706 for the CPU.

Furthermore, each controller 20A, 20B includes an SAS expander 2750 connected to the disk control unit 2538. The SAS expander 2750 is used to connect the disk control unit 2538 to ports of the SAS expander units 2710 for the storage housing unit 14 and ports of SAS expanders 2804 (not shown in FIG. 27, shown in FIG. 28) existing in an I/O module 2800 for the additional chassis 12.

The PCIe control unit 2539 for the controller 20A, 20B is connected to the storage housing unit 14B equipped with the memory units 2722 and the SAS expander 2750 is connected to the storage housing unit 14A equipped with the HDDs/SSDs. The two controllers 20A, 20B can connect to the storage housing units 14 via the other controller 20 by connecting their data controllers 2536 to each other. The host computer 2702 and the channel control unit 2534 are connected via a network 2700.

The storage housing unit 14A has two SAS expander units 2710 from the viewpoint of redundancy. The SAS expander unit 2710 is connected to a plurality of SAS HDDs 2524. The SAS expander unit 2710 executes switching the connections between the disk control unit 2538 and the SAS HDDs 2524.

The PCIe control unit 2539 for each controller 20A, 20B controls data transfer using PCIe as an interface, is coupled to the PCIe switch units 2711 for the storage housing unit 14B, and executes data transfer to/from a specified memory unit(s) 2722 based on the PCIe interface. The PCIe control unit 2539 is connected to the accelerator unit 2530 before the PCIe switch unit 2711 in order to increase the speed of the data transfer control processing based on the PCIe interface.

The storage housing unit 14B also has two systems, each system including the accelerator unit 2530 and the PCIe switch unit 2711. If the memory units 2722, instead of the HDDs/SSDs, are to be mounted in the storage housing unit 14, the fan unit 15 is replaced with the accelerator unit 2530 and a circuit board for the SAS expander unit 2710 is replaced with a circuit board for the PCIe switch unit 2711.

Configuration information about the memory mapped pool 2500 (FIG. 25) constituted from a plurality of memory units 2722 is set by the controller 20 to the shared memory 2708. Furthermore, a data protection level for the memory mapped pool 2500 is also set by the controller 20.

Figure 28:
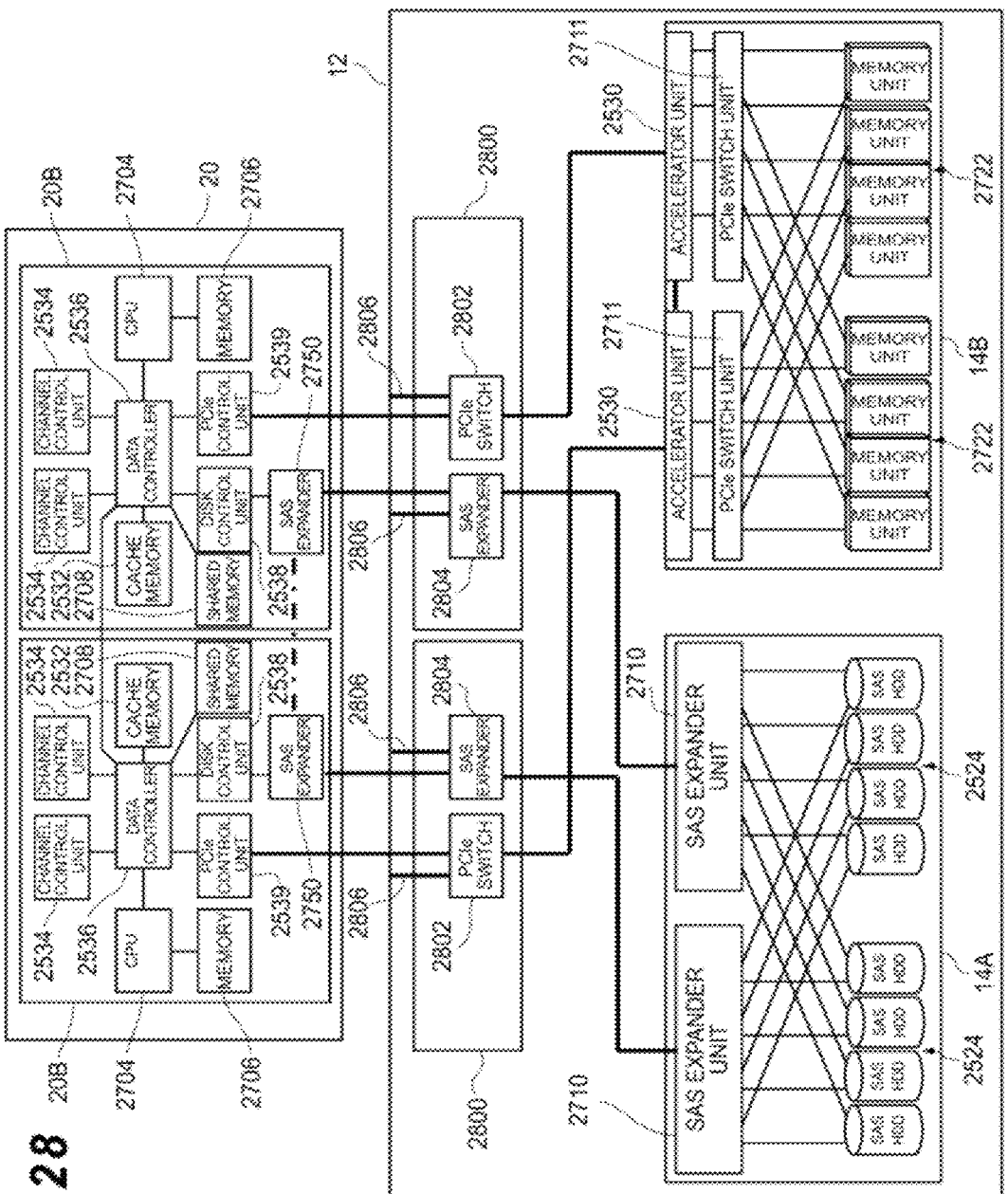
FIG. 28 is a control block of an additional chassis for the storage apparatus.

FIG. 28 is a control block diagram showing a state where the additional chassis 12 is connected to the controller 20 for the basic chassis 10. The additional chassis 12 has two systems of I/O modules 2800, each of which is connected to the controller 20A, 20B for the basic chassis 10. Each I/O module 2800 has a PCIe switch 2802 and an SAS expander 2804.

The SAS expander 2804 is connected to the SAS expander 2750 on the controller 20 and the SAS expander unit 2710 for the storage housing unit 14A. The PCIe switch 2802 is connected to the accelerator unit 2530 for the storage housing unit 14B. The SAS expander 2804 and the PCIe switch 2802 in the I/O module 2800 of each system have external interface connection ports 2806 for connection with other additional chassis 12.

Figure 29:
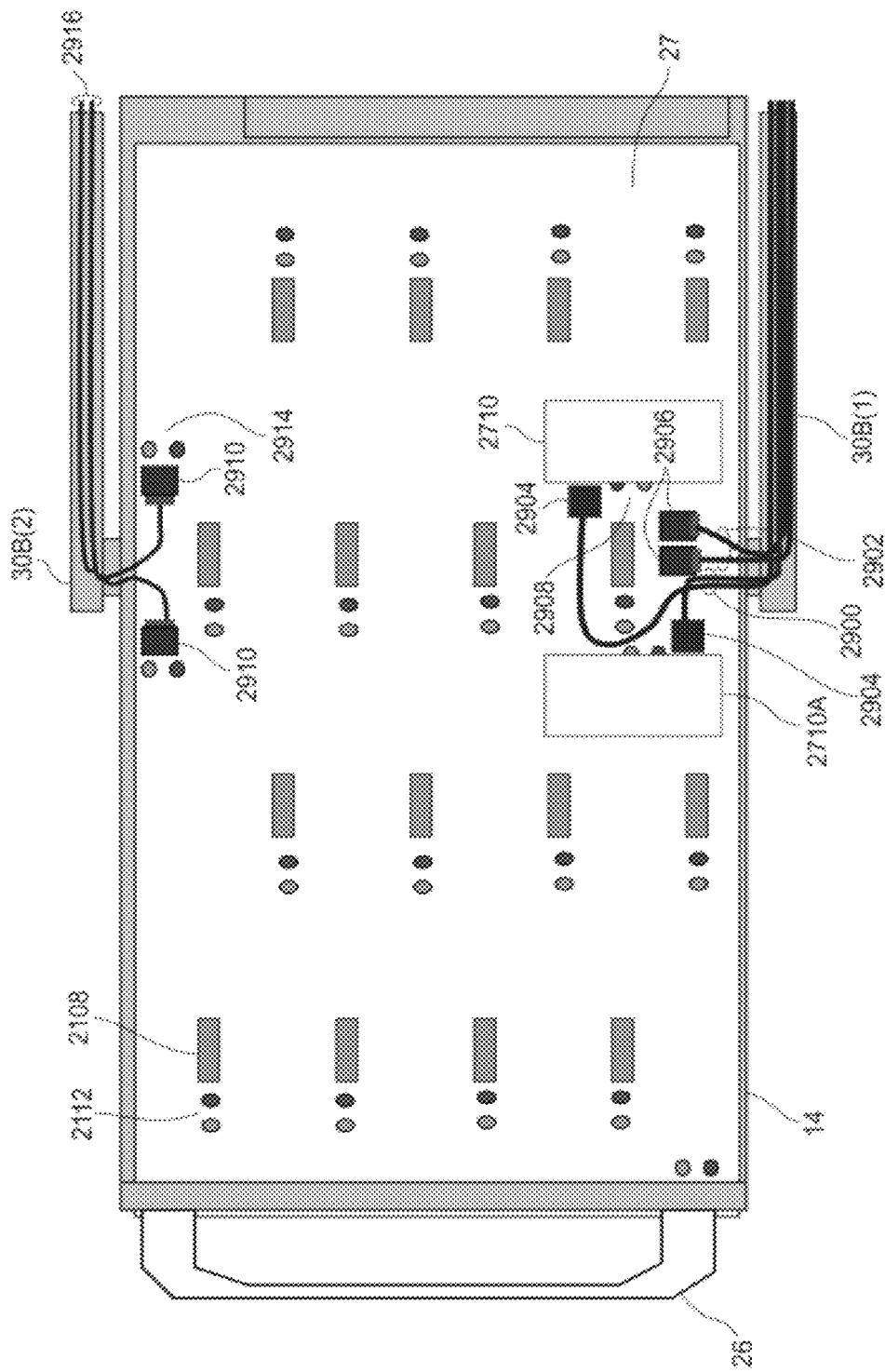
FIG. 29 is a back view of the storage housing unit as viewed from the back board side of the storage housing unit.

FIG. 29 shows a form of the storage housing unit 14 for housing HDDs/SSDs whose interfaces are SAS/SATA, as viewed from the back board 27. Each of a plurality of SAS interface lines 2900 extending from the SAS expander 2750 for the controller 20 and a plurality of PCIe interface lines 2902 extending from the PCIe control unit 2539 passes through the rail 30B(1) below the storage housing unit 14, is exposed from the hollow rotation shaft 30H placed on the rail 30B near the back board 27, and is connected to the relevant component via a connector on the back board 27. A connector is provided at the top end of each interface line. The symbol 2904 represents a connector for the SAS interface line and the symbol 2906 represents a connector for the PCIe interface line. The symbol 2908 represents status indicating LEDs for the SAS expander unit 2710.

The connector 2904 of the SAS interface line 2900 is connected to the SAS expander unit 2710. In this circumstance, the connectors 2906 of the PCIe interface line 2902 which is not involved in data transfer to the storage devices 16 are connected to connectors provided on the back board 27 and the destinations of these interfaces are the connectors 2601 in FIG. 26A, and the connectors 2906 are designed to not function in the state where the fan unit 15 is mounted.

Power cables 2916 pass through the rail 30B(2) above the storage housing unit 14 and the connector 2910 of the top end of each power cable 2916 on the back board side is connected to a power source circuit. The symbol 2914 represents LEDs for indicating the status of the power supply.

Figure 30:
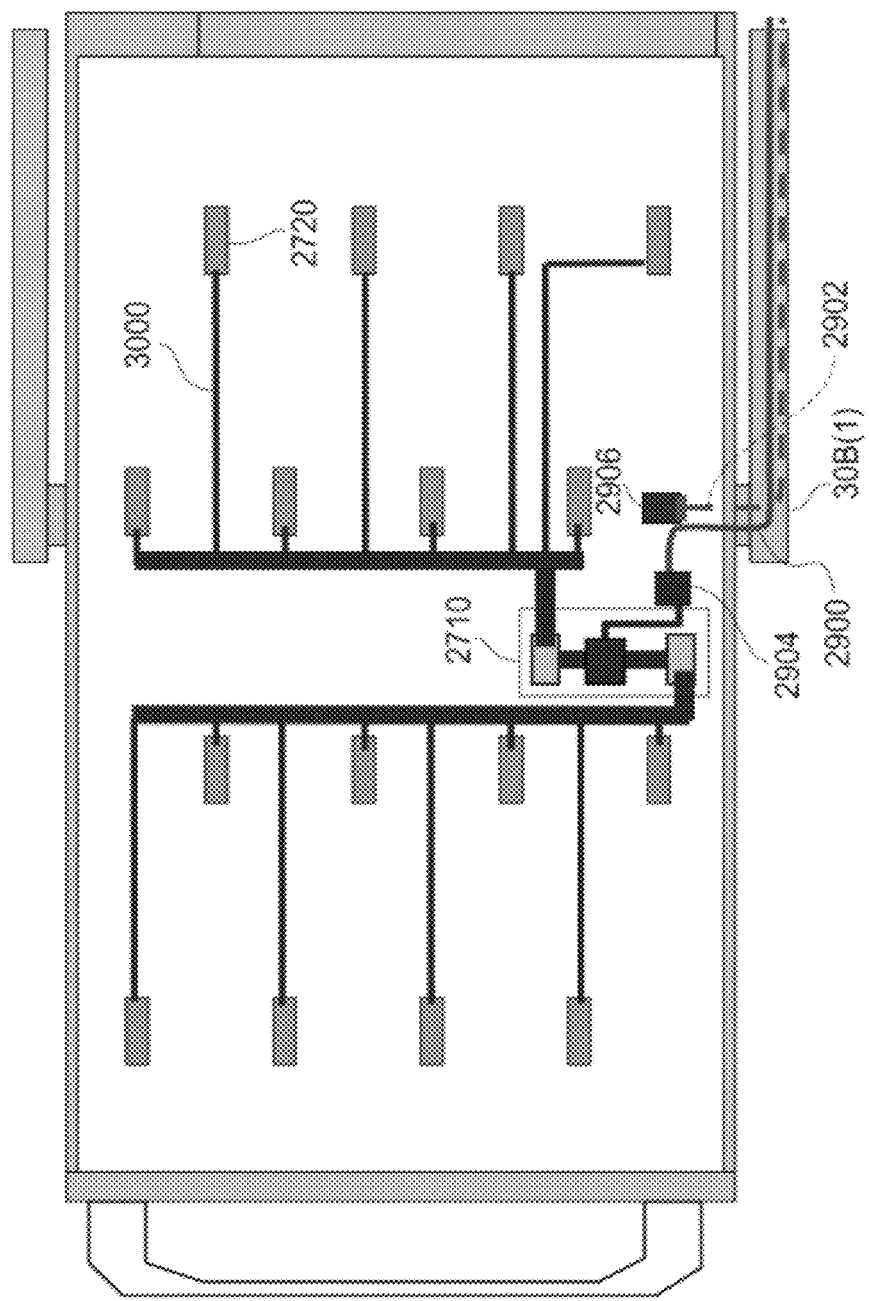
FIG. 30 is a block diagram showing a form of wire connections between an SAS expander unit and HDDs/SSDs on the back board of the storage housing unit.

As shown in FIG. 30, wire connections between the SAS expander unit 2710 and all the HDDs/SSD connectors 2720 are formed to realize point-to-point connections 3000. It should be noted that only a single PCIe interface line 2902 can be used as the interface line by providing the SAS expander unit 2710 with a conversion chip (disk controller LSI) for converting the PCIe protocol to the SAS/SATA protocol, and the SAS interface line 2900 can be thereby omitted. In this, the number of cables may be two, so that the cables can be handled easily, but the cost is expensive. Incidentally, FIG. 30 shows the wire connection diagram of only one system of the SAS expander unit 2710 although there are actually two systems.

Figure 31:
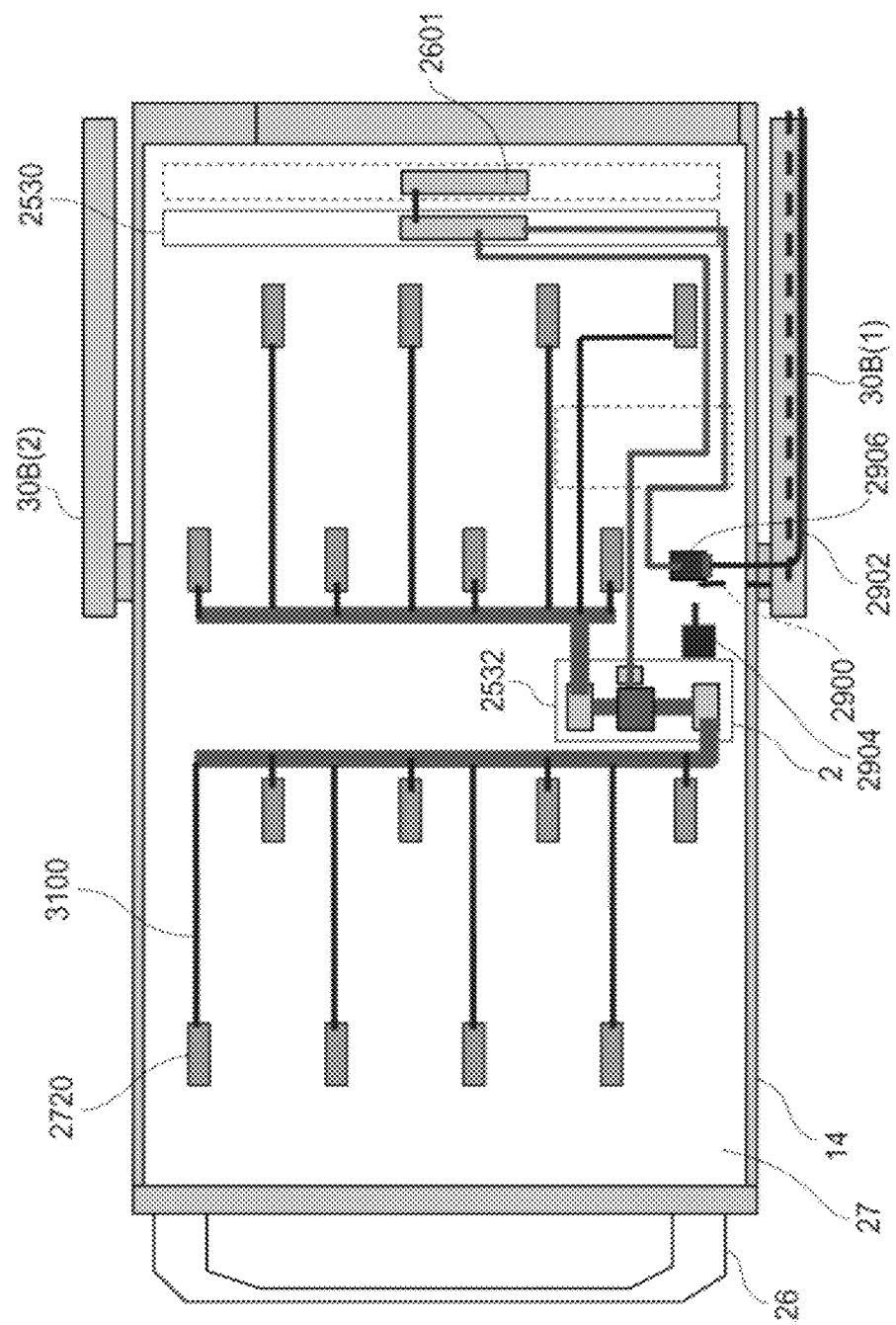
FIG. 31 is a block diagram showing a form of wire connections between a PCIe switch and memory units on the back board of the storage housing unit in which the memory units are mounted.

FIG. 31 is a wire connection diagram on the back board 27 of the storage housing unit 14 where the memory units 2722 are mounted; and the SAS expander unit 2710 (FIG. 30) is replaced with the PCIe switch unit 2711. The connector 2904 of the SAS interface cable 2900 is connected to a dummy connector provided on the PCIe switch unit 2711. The connector 2906 of the PCIe interface cable 2902 is connected to a PCIe connector on the back board 27, routed through the wiring in the back board 27, and then connected via the PCIe connector 2601 to the accelerator unit 2530.

The accelerator unit 2530 is connected to the PCIe switch unit 2711. The PCIe switch unit 2711 relays 8-lane data transfer from the accelerator unit 2530 and 16 lane data transfer to the individual memory units 2722. Each lane is connected to the PCIe switch 3300 and a wire connection 3100 between the PCIe switch 3300 and the memory unit 2722 is established in a point-to-point manner. In this example, the connector for the SAS interface is used without any change as the connector 2720 for connection to the memory unit 2722.

Figure 32A:
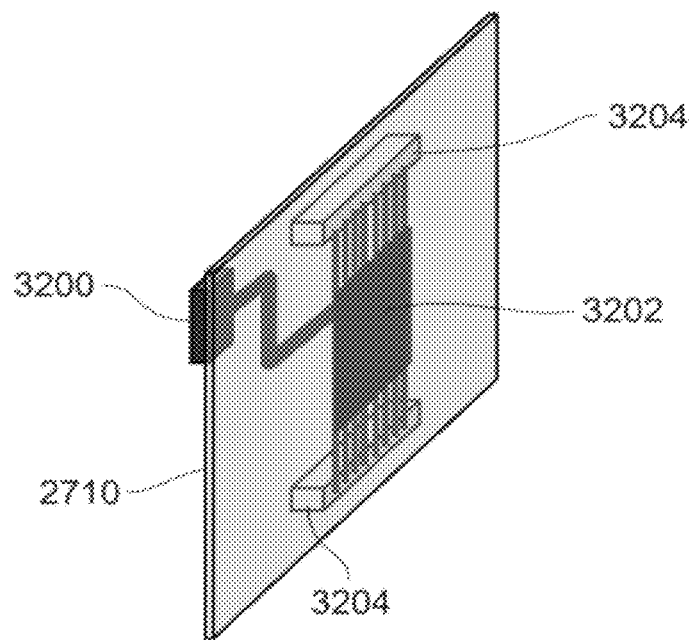
FIG. 32A is a perspective view of an SAS expander unit.

FIG. 32A is a perspective view of the SAS expander unit 2710. The SAS expander unit 2710 includes: an SAS interface connector 3200 for connection with the SAS interface cable 2900 from the controller 20; SAS/PCIe connectors 3204 that can be used for both SAS and PCIe; and an SAS expander LSI 3202 for connection with the SAS interface 3200 and the SAS/PCIe connectors 3204.

Figure 32B:
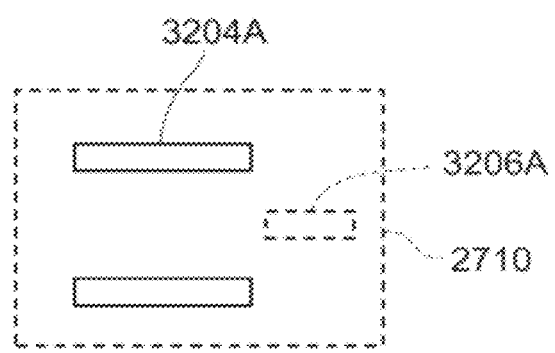
FIG. 32B is a block diagram showing a connection form of a connector for connecting the SAS expander unit and the back board.

The SAS/PCIe connectors 3204 are connected to connectors 3204A to be connected to the wire connection to the HDDs/SSDs, which are formed on the back board as shown in FIG. 32B. Incidentally, as shown in FIG. 32B, a connector 3206A to which the connector 2906 for the PCIe interface line is to be connected exists on the back board 27, but it is not connected to the SAS expander unit 2710.

Figure 33A:
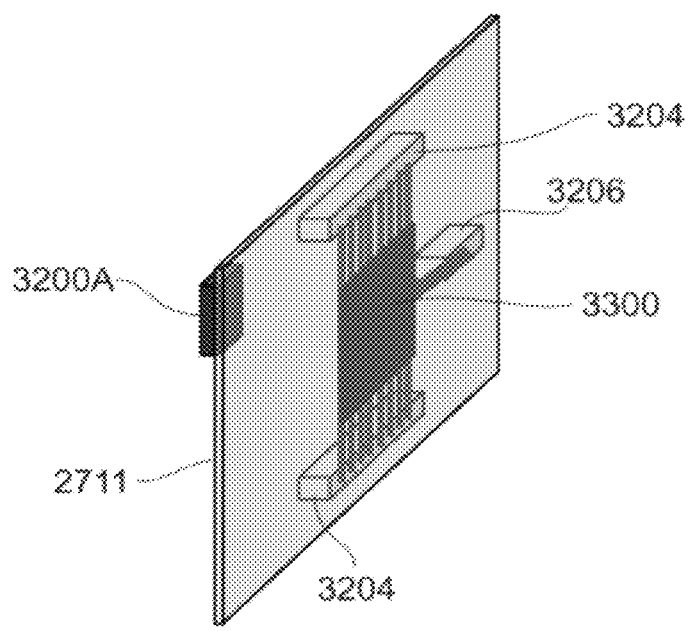
FIG. 33A is a perspective view of a PCIe switch unit.

FIG. 33A is a perspective view of the PCIe switch unit 2711. The PCIe switch unit 2711 includes: a PCIe interface connector 3206 to be connected to the accelerator unit 2530; SAS/PCIe connectors 3204; a PCIe switch LSI 3300; and a dummy connector 3200A used to be connected to, and retain, the SAS interface cable 2900.

Figure 33B:
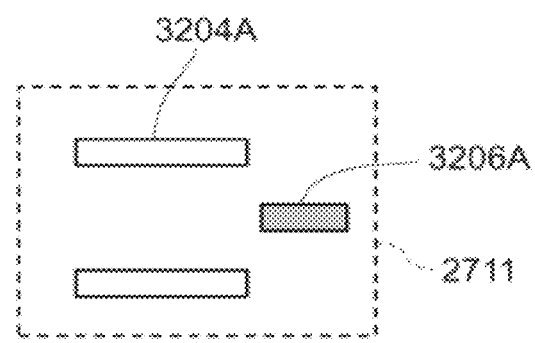
FIG. 33B is a block diagram showing a connection form of the connector for connecting the PCIe switch unit and the back board.

The SAS/PCIe connectors 3204 are connected to the connectors 3204A to be connected to the wire connection to the memory units 2722, which are formed on the back board, as shown in FIG. 33B. Furthermore, the PCIe interface connector 3206 is connected to a connector 3206A for the PCIe interface line extending from the accelerator 2530, which is formed on the back board 27.

Figure 34:
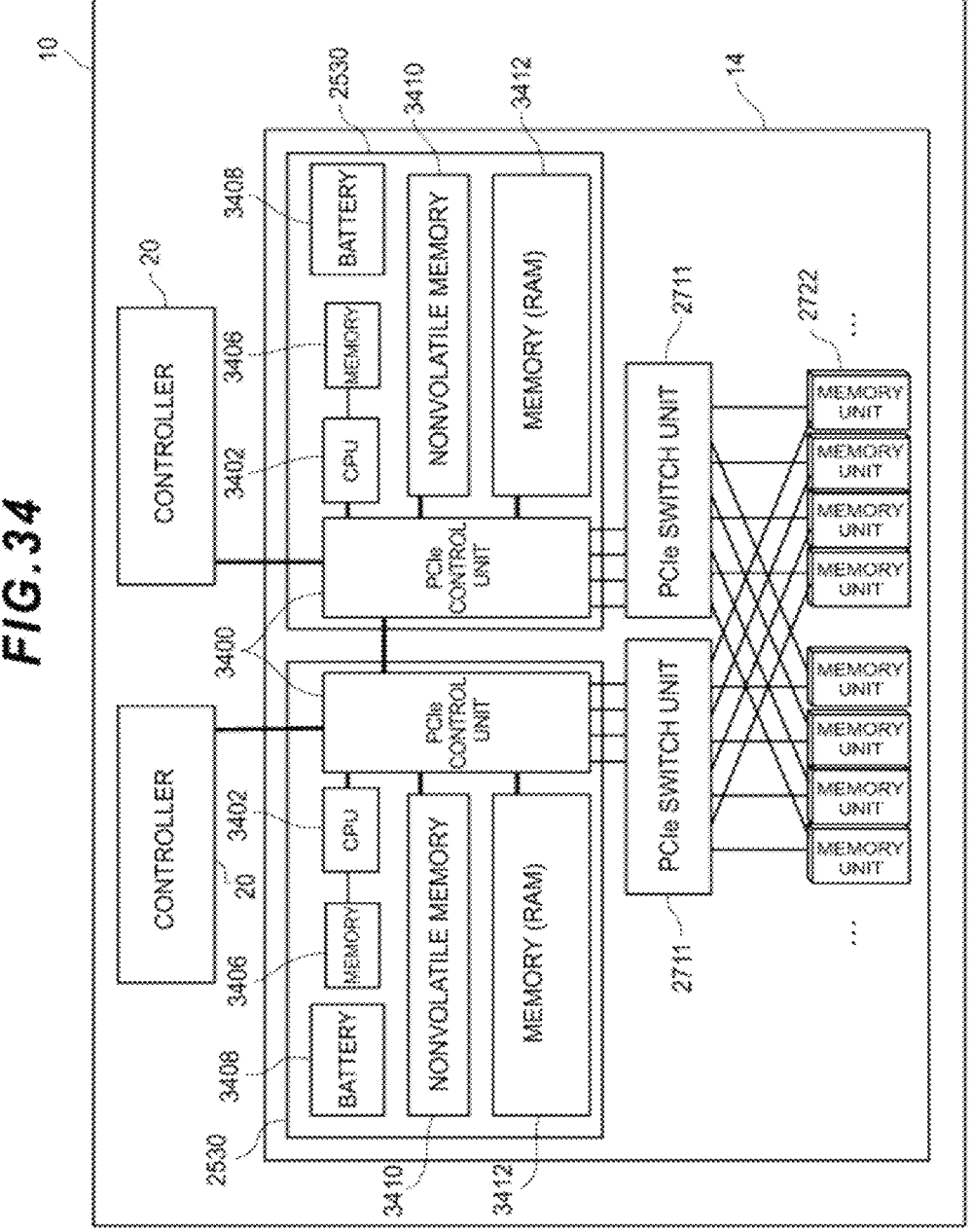
FIG. 34 is a control block diagram of an accelerator unit.

FIG. 34 is a control block diagram of the accelerator unit 2530. The accelerator unit 2530 assists data read/write processing on the memory units 2722 as executed by the controller 20 in the basic chassis 10 and includes: a PCIe control unit 3400; a CPU 3402 for controlling the PCIe control unit 3400; a local memory 3406 to which the CPU 3402 refers; a nonvolatile memory 3410 connected to the PCIe control unit 3400; a volatile memory (RAM) 3412; and a battery 3408 for backing up data in the RAM 3412 to the nonvolatile memory 3410 at the time of a power failure.

The nonvolatile memory 3410 stores firmware for the accelerator unit 2530, hardware configuration information, information about data mapping to the memory units 2722, backup data, and so on. The RAM 3412 stores parity data for user data, highly frequently updated data, data of size smaller than an allocation unit, and metadata. This will be explained later.

The PCIe control unit 3400 for one of the accelerator units 2530 in the two systems is connected to the PCIe switch unit 2711 for one system of the PCIe switch units 2711 for the two systems in the storage housing unit 14. Since the accelerator units 2530 for the two systems are connected to each other via the PCIe control units 3400, the accelerator unit 2530 for one system can connect to the PCIe switch unit 2711 connected to the accelerator unit 2530 for the other system.

Figure 35:
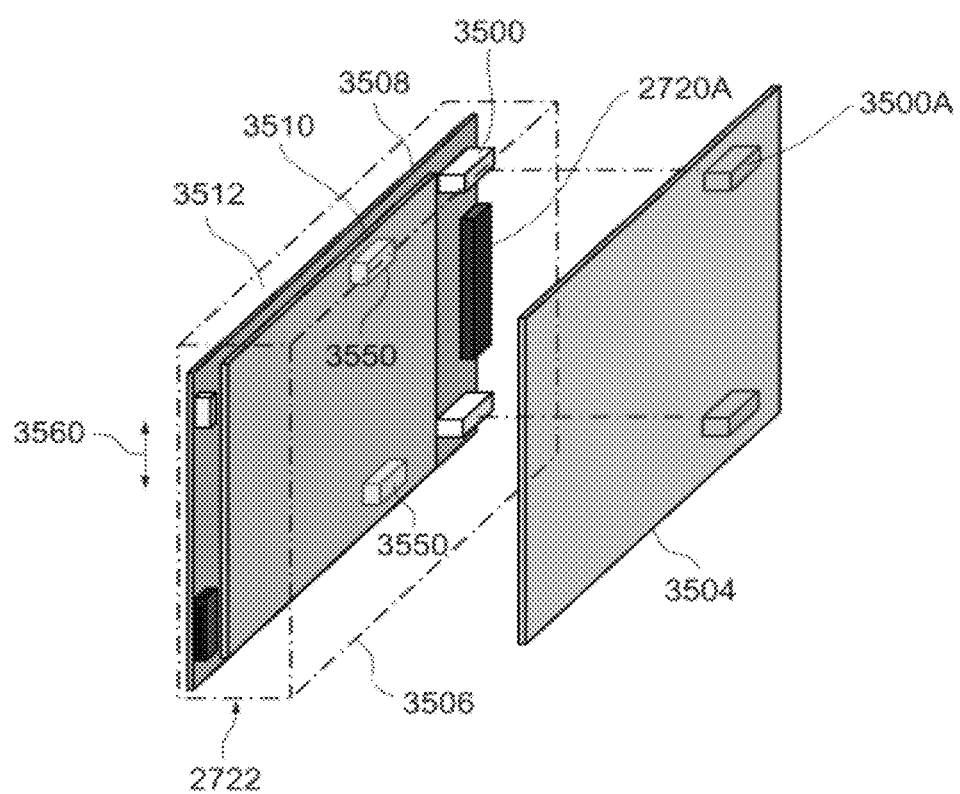
FIG. 35 is a perspective view of the memory unit.

FIG. 35 is a perspective view of the memory unit 2722. The memory unit 2722 includes a base substrate 3508 on which a mezzanine board 3510 for add-on memory can be mounted, and an additional memory substrate 3504 which is additionally mounted on the base substrate 3508. The symbol 2720A represents a connector for the PCIe interface and the power supply, to which the PCIe interface from the PCIe switch unit 2711 is to be connected. Incidentally, the relevant connector is designed to be compatible with the interface connector for SAS HDDs.

Furthermore, the symbols 3500 and 3500A represent connectors for connecting the additional memory substrate 3504 to the base substrate 3508 and the symbol 3550 represents a connector for connecting the add-on memory mezzanine board 3510 to the base substrate 3508. The memory unit 2722 is placed in a case 3506. Since the memory unit 2722 is inserted into the storage housing unit 14 so that the directions indicated with arrow 3560 will become horizontal directions of the storage housing unit 14, vent holes are formed in a side face indicated with the symbol 3512 and another side face opposite to the side face 3512.

Figure 36:
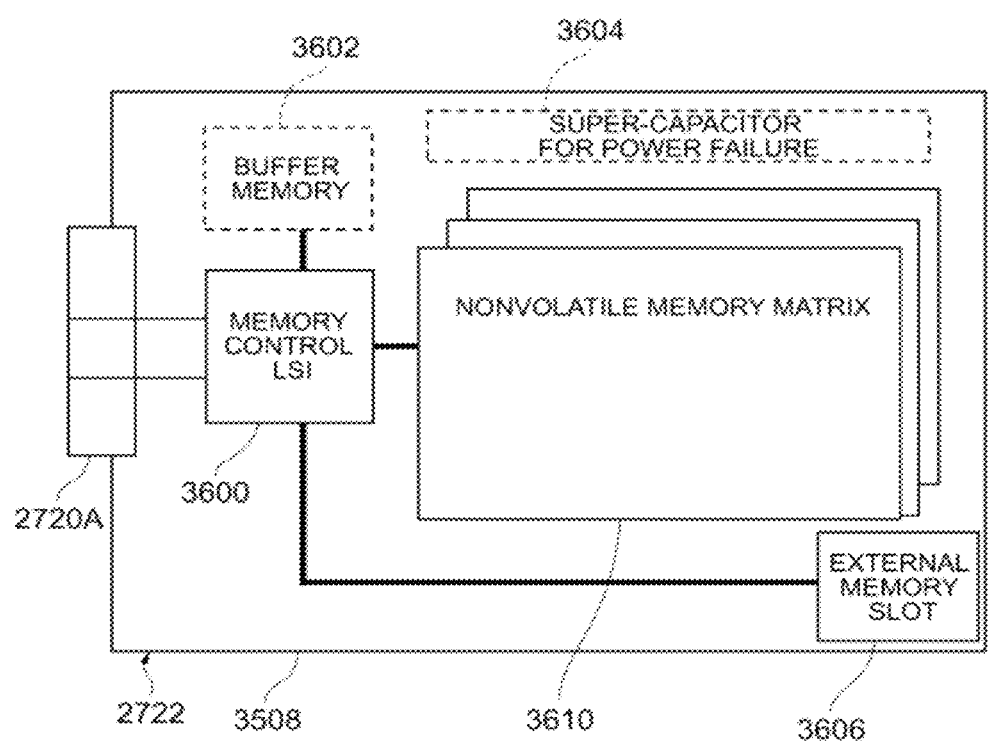
FIG. 36 is a hardware block diagram of the memory unit.

FIG. 36 is a hardware block diagram of the memory unit 2722. The memory unit includes: a memory controller (memory control LSI) 3600; a plurality of nonvolatile memory matrixes 3610 (base substrate 3508 and additional substrates 3504, 3510 in FIG. 35); and an external memory slot 3606.

The nonvolatile memory matrix 3610 is a matrix arrangement of devices such as flash memories. A buffer memory 3602 temporarily buffers data, which is written to the nonvolatile memory matrix 3610 or which is read from the nonvolatile memory matrix 3610, in order to adjust timing. A capacitor 3604 to be used at the time of a power failure is for operating of data flushing-out time of the buffer memory 3602 to the nonvolatile memory matrix 3610. Incidentally, the buffer memory 3602 and the capacitor 3604 are optional components.

Regarding data which are mapped to a memory space of the memory mapped pool 2500 is comprised of a plurality of memory units 2722, a method of not distributing parity such as RAID-5 and RAID-6 has the advantage of achieving a high speed of data processing because the accelerator 2530 can directly transfer data to the cache memory 2532 or the host I/F controller 2534 (channel control unit) (see FIG. 25).

On the other hand, in a case of storage devices like flash memories, for which there is an upper limit to the number of times of data-erase and rewriting on a block basis, it is favorable to provide data guarantee by means of, for example, parity like the case of HDDs, in consideration of a risk of data corruption on a block basis. So, the accelerator 2530 provides data protection for the memory unit 2722 based on the RAID-4 method which does not involve parity distribution. Since the maximum number of the memory units 2722 that can be managed by the accelerator 2530 is set to sixteen in this embodiment, it is not necessary to set so much degree of freedom to the data protection on the user side and, therefore, the data protection equivalent to the RAID-4 which is 3 to 7D+1P would be appropriate. Incidentally, mirroring option may be further used in combination with the above-described data protection.

Figure 37:
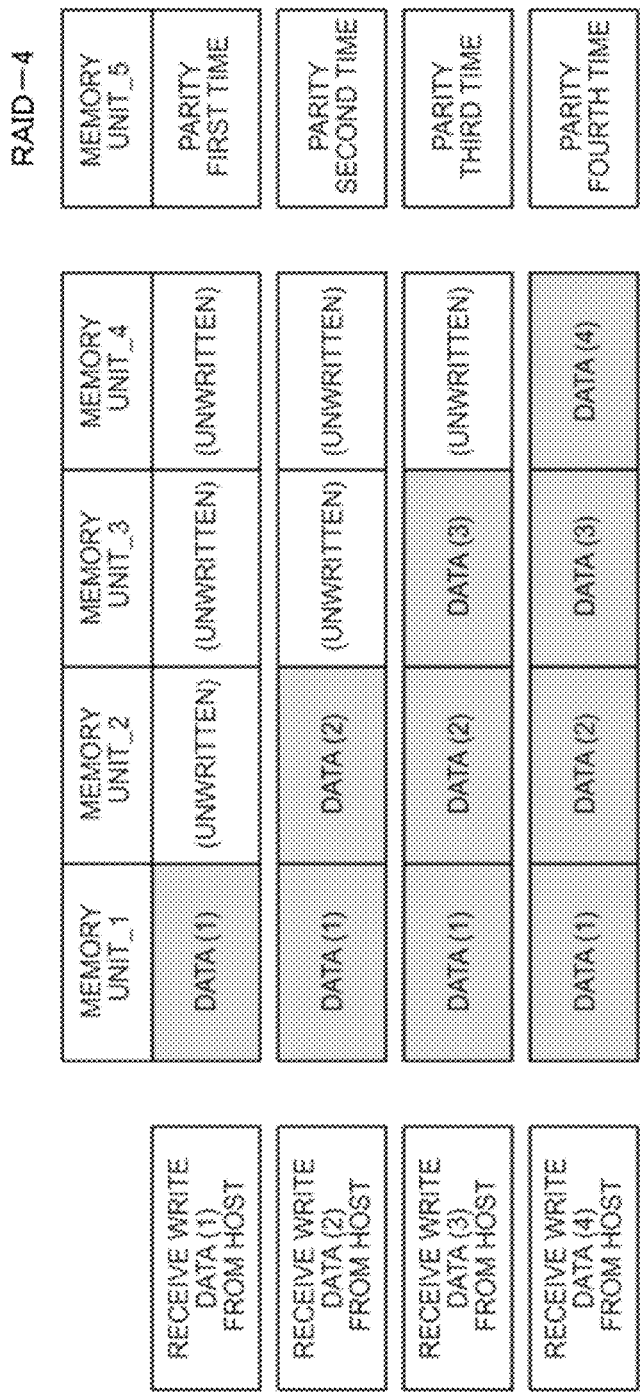
FIG. 37 is a block diagram explaining a case where a RAID-4 method which is a conventional technique is used for a parity-write operation when writing data to the memory units.

Next, the operation to store data in the memory units 2722 according to the conventional RAID-4 method without the intermediary of the accelerator unit 2530 will be explained with reference to FIG. 37. RAID4 groups (4D [memory unit No. 1 to memory unit No. 4]+1P [memory unit No. 5]) are formed as data protection groups of the memory units 2722.

When write data (1) is received from the host computer 2702, the data (1) is stored in the memory unit No. 1 and parity (first time) is stored in the memory unit No. 5; when write data (2) is received from the host computer 2702, the data (2) is stored in the memory unit No. 2 and parity (second time) is stored in the memory unit No. 5; when write data (3) is received from the host computer 2702, the data (3) is stored in the memory unit No. 3 and parity (third time) is stored in the memory unit 5; and when write data (4) is received from the host computer 2702, the data (4) is stored in the memory unit No. 4 and parity (fourth time) is stored in the memory unit No. 5.

Since the parity is stored by the convention RAID-4 method in the manner described above, the number of times the parity is written to the memory unit No. 5 accumulates and become several times more than the number of times data are written to other memory units (No. 1 to No. 4); and this method is not favorable for flash memories, for which the number of times of data-erase and rewriting is limited, because the life of the memories will be shortened. Therefore, the present method is designed as described in FIG. 38 so that the accelerator unit 2530 updates and writes parity data in a storage area of the RAM (3412 in FIG. 34) for the accelerator 2530 sequentially as parity for the first time, parity for the second time, parity for the third time, and so on; and when the accelerator 2530 finishes writing all the pieces of data (data (1)-(4)) to the plurality of memory units 2722, it stores the parity (first time) in the memory unit No. 5 and releases the parity storage area in the RAM 3412. As the RAM 3412 for the accelerator unit 2530 is used to temporarily store the parity, the parity controller (accelerator 2530) can reduce the number of times the parity is written to the nonvolatile memory (the memory unit for the parity: the memory unit No. 5). Unlike the flash memories or similar, the RAM 3412 has no limitation on the number of times of writing. The operation of the accelerator unit 2530 to write the parity data to the memory units 2722 at a specified delayed timing as described above will be hereinafter referred to as the Delayed Parity-Writing Method.

If the data is to be partially updated, when the accelerator 2530 receives, for example, update data of the data (3) from the host computer 2702 as shown in FIG. 39, the accelerator 2530 reads old data (3) and old parity and calculates new parity. Then, the accelerator 2530 updates the data in the memory unit No. 3. The new parity is stored in the RAM 3412 for the accelerator 2530. The data stored in the memory unit No. 5 is still the old parity before the update.

If the parity data is stored in the memory unit No. 5 like the parity for the data (5)-(8), the parity data in the RAM 3412 for the accelerator 2530 is destructed and that area is reused. If new data (9)-(12) are written to the memory units 2722, the CPU 3402 for the accelerator 2530 stores parity data for the data (9)-(12) in the RAM 3412. The parity data is written to the memory unit No. 5 at specified delayed timing. Accordingly, there is no limitation on the number of times of writing to the memory (the RAM 3412) for the accelerator 2530 as described above, the accelerator 2530 can reduce the number of times of writing to the parity memory unit (the memory unit No. 5) by using the RAM 3412 to temporarily store the parity data.

Figure 40:
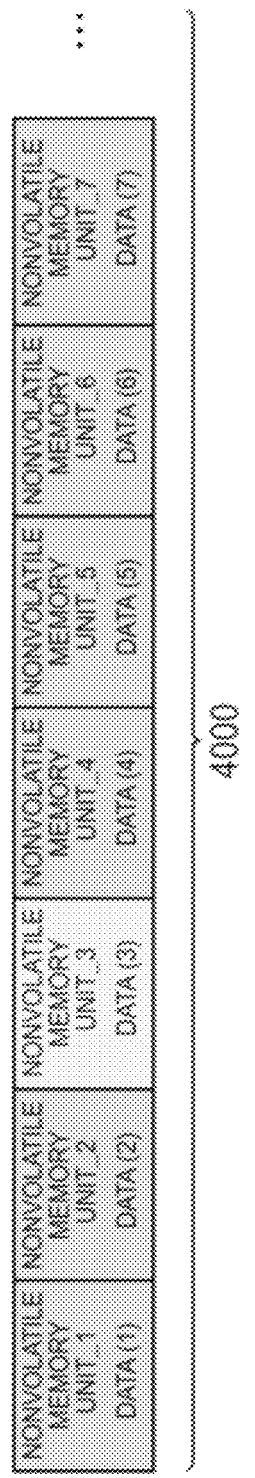
FIG. 40 shows address continuity in data areas of a plurality of memory units as recognized from the controller.

It should be noted that the controller 20 recognizes a data area 4000 of the plurality of memory units 2722 as a continuous address space as shown in FIG. 40. The parity storage area may be set outside the continuous addresses so that reference can be made to the parity storage area, or the parity storage area may be set so that it cannot be recognized by the controller.

The accelerator unit 2530 can set a trigger, as appropriate, to migrate the parity data from the RAM 3412 to the memory unit 2722. An example of the trigger is when the number of updates of the parity data in the RAM exceeds a threshold. Specifically speaking, the trigger is a case where the number of times the parity data is updated becomes equal to or more than a majority (for example, 80%) of the number of memory units 2722 storing data. Another trigger may be a case where the used amount of the RAM 3412 for the accelerator 2530 exceeds a threshold. Furthermore, another trigger may be a case where a certain period of time has elapsed since the update of the parity and the probability of further updates can be considered to be low.

Figure 41:
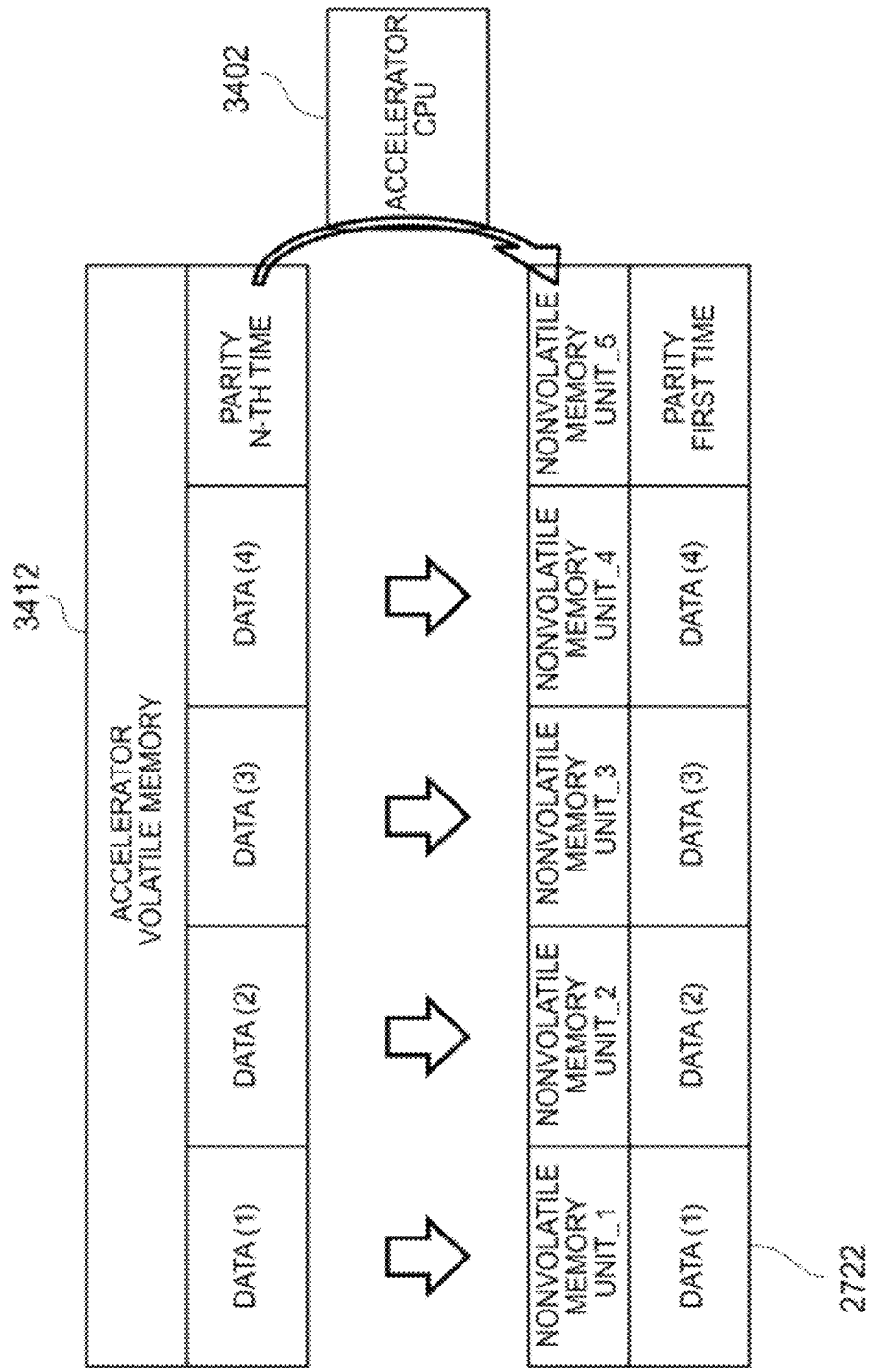
FIG. 41 is a block diagram explaining an operation to store data from a volatile memory for the accelerator to nonvolatile memory units.

As shown in FIG. 41, the CPU 3402 for the accelerator 2530 temporarily stores data, which is to be stored in the memory unit 2722, in the RAM 3412 and then stores it in the memory unit 2722. Meanwhile, the parity in the RAM 3412 is written from the RAM 3412 to the nonvolatile memory unit No. 5 at a delayed timing according to the trigger decided as described above.

In response to a read request from the host computer 2702, the accelerator unit 2530 reads parity of the read request target data from the RAM 3412 for the accelerator 2530 or the nonvolatile memory unit 2722 and compares the calculated parity from read data and the parity; and if it is determined that there is a corruption in the data, the data is corrected on the fly. Then, the accelerator unit 2530 performs DMA transfer of the read data to the host interface controller 2534 (FIG. 25), thereby achieving a high speed.

Incidentally, if a data failure is detected, the accelerator 2530 diagnoses the memory unit 2722; and if it is determined that the failure range of the nonvolatile memory is limited, the accelerator 2530 executes processing for replacing the relevant memory area. Specifically speaking, the accelerator 2530 migrates/recovers data (equivalent to nD+1P) in each memory unit 2722 including data existing in the relevant memory area to other memory areas, respectively, and executes remapping of the memory addresses in a virtual volume—address conversion table (FIG. 44). Subsequently, a disabling flag is set to the faulty area and areas of the pre-migration normal memory units 2722. (For example, the ID of a virtual volume which is reserved to be a disabled area is assigned to the entry of the relevant area in the virtual volume—address conversion table (FIG. 44). Since this reserved virtual volume ID does not become a target of data migration or access, the relevant area is fixed as being already allocated, thereby preventing the use/recycle of that area.)

Data which are updated highly frequently may be sequentially updated and stored in the RAM 3412 for the accelerator 2530 and then copied from the RAM 3412 to the nonvolatile memory units 2722 at determined timing. This is to protect the nonvolatile memory units 2722 for which the number of times of writing is limited. If the capacity of high-frequency update data is large, the accelerator 2530 may use volatile memory units (2722) described later instead of the RAM 3412. Incidentally, whether the relevant data is high-frequency update data or not is judged by the accelerator 2530 based on data update frequency.

Figure 42:
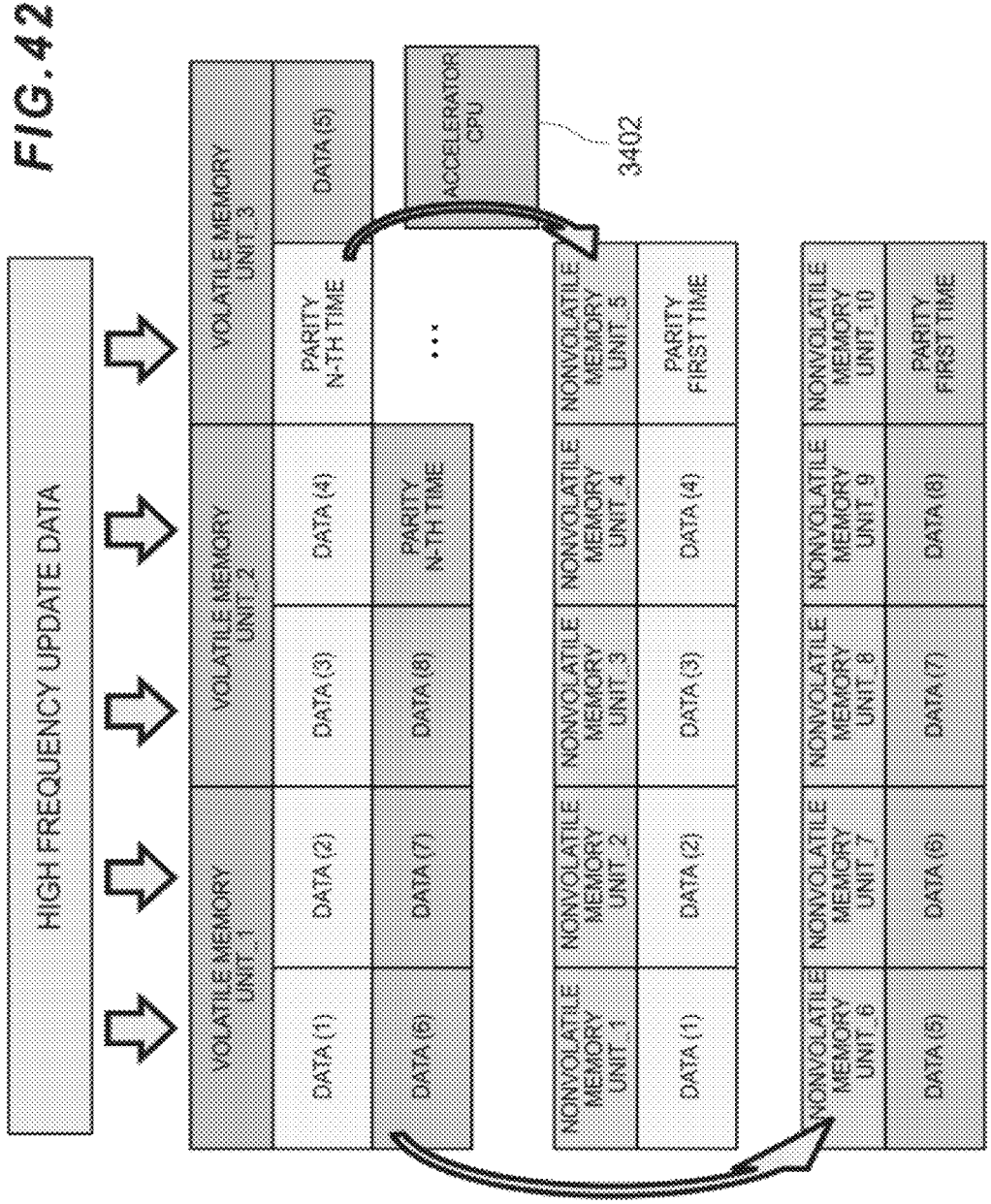
FIG. 42 is a block diagram explaining an operation to store high-frequency-updated data in the nonvolatile memory units by using volatile memory units.

FIG. 42 shows a case in which a data storage group configuration of the volatile memory units is 3D and a data storage group configuration of the nonvolatile memory units 2722 is RAID4 (4D+1P). In order to store data, for the nonvolatile memories of the 4D+1P RAID groups, in the volatile memory units first, the CPU 3402 for the accelerator 2530 stores data (1), (2) in a volatile memory unit No. 1, data (3), (4) in a volatile memory unit No. 2, and data (5) and parity of the data (1) to (4) in a volatile memory unit No. 3. Every time the data (1) to (4) is updated, the parity is updated as the parity for the n-th time. The same applies to data (5) to (8).

The accelerator unit 2530 regularly copies the data from the volatile memory units to the nonvolatile memory units 2722, thereby releasing the areas of the volatile memory units. The accelerator unit 2530 copies the data (1) from the volatile memory unit No. 1 to a nonvolatile memory unit No. 1, the data (2) from the volatile memory unit No. 1 to a nonvolatile memory unit No. 2, the data (3) from the volatile memory unit No. 2 to a nonvolatile memory unit No. 3, the data (4) from the volatile memory unit No. 2 to a nonvolatile memory unit No. 4, and the parity from the volatile memory unit No. 3 to a nonvolatile memory unit No. 5.

The accelerator 2530 may store only the parity data, which is stored in the volatile memory unit, in the RAM 3412 for the accelerator 2530. Furthermore, parity data (such as Q by the RAID-6 method) calculated by a method different from that used to store parity data in the volatile memory unit may be stored in the RAM 3412 for the accelerator 2530. If this is done, even if the data (1), (2) are lost at the time of the occurrence of a failure in the volatile memory unit No. 1, the data can be recovered. In addition, the volatile memory units are protected by a method based on RAID-1E. Alternatively, mirroring and storing data in the RAM 3412 for the accelerator 2530 is effective for fault tolerance.

Next, another embodiment of a usage form of the RAM 3412 for the accelerator 2530 will be explained. A plurality of pieces of data smaller than a data allocation unit in thin provisioning are temporarily stored in the RAM 3412 (or the volatile memory unit) and then migrated from the RAM 3412 to the nonvolatile memory unit 2722. In this way, an increase in the number of times of writing to the nonvolatile memory unit 2722 is prevented.

If the accumulated capacity of data within the data allocation unit in the RAM 3412 becomes equal to or more than a threshold relative to the capacity of the data allocation unit, or if a certain period of time has elapsed since accumulative storage of data smaller than the data allocation unit in the RAM 3412, the accelerator unit 2530 copies the data from the RAM 3412 to the nonvolatile memory unit 2722. When this is done, the accelerator unit 2530 may execute zero reclamation (zero data de-duplication) processing (when data writing) or zero padding processing (when data reading).

Figure 43:
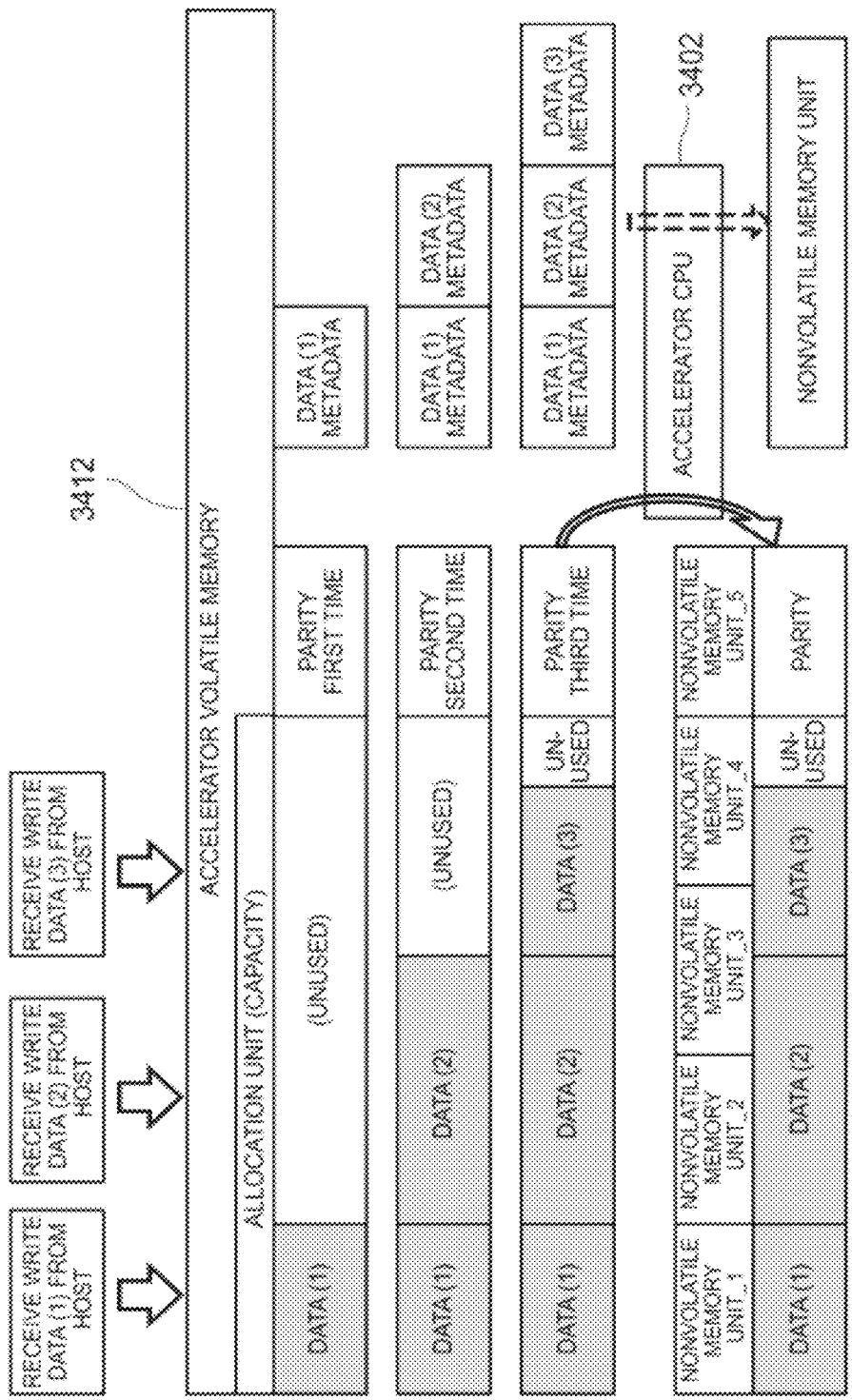
FIG. 43 is a block diagram explaining an operation to store data of size smaller than an allocation unit in the nonvolatile memory units.

FIG. 43 is a block diagram showing the operation of the accelerator unit 2530 in this embodiment. All pieces of write data (1)-(3) from the host computer 2702 are of size smaller than the data allocation unit. After receiving the write data (1), the accelerator unit 2530 stores the write data (1) in the RAM 3412 and stores parity (first time) for the data (1) outside of the area in the RAM 3412 for storing data smaller than the data allocation unit.

Furthermore, the accelerator unit 2530 stores the data (2) in the area in the RAM 3412 for storing data smaller than the data allocation unit and updates the parity (first time) to parity (second time) for the data (1) and the data (2). Furthermore, the accelerator 2530 stores the data (3) in the area in the RAM 3412 for storing data smaller than the data allocation unit and updates the parity (second time) to parity (third time) for the data (1) to (3).

Subsequently, if the accelerator 2530 determines that the total capacity of the data (1) to (3) exceeds a threshold for the capacity of the data allocation unit, the accelerator 2530 reads the data (1) to (3) in the area for storing data smaller than the data allocation unit from the RAM 3412 and distributes and copies them to the nonvolatile memory units No. 1 to 4.

Furthermore, the accelerator 2530 copies the parity (third time) to the nonvolatile memory unit No. 5. It should be noted that every time the accelerator 2530 receives the data (1) to (3), it stores metadata required to refer to the data (1), metadata (2) for the data (2), and metadata for the data (3) in the RAM 3412 outside of the area for storing data smaller than the data allocation unit.

The accelerator unit 2530 regularly migrates the metadata for the data (1) to (3) from the RAM 3412 to the nonvolatile memory units 2722. The capacity required for the RAM 3412 to buffer data smaller than the allocation unit in order to achieve the operation of thin provisioning is generally a capacity obtained by multiplying the capacity of the allocation unit by the number of logical divisions of address spaces (the number of pools) handled by the accelerator unit 2530 or the number of virtual volumes.

FIG. 44 is a mapping table between virtual volumes accessed by the host computer 2702 and storage areas in the thin provisioning storage pools. The controller 20 virtualizes the capacity of the virtual volumes and allocates a storage area from a pool to access from the host computer 2702.

The controller 20 updates this table when allocating a storage area from a pool to write access to a virtual volume. The following pieces of information about writing from the host computer 2702 are registered in this table: a write target virtual volume ID; a starting logical block address (LBA) of a write area; and a block length of the write data. The following pieces of information about the pool are registered in this table: a pool ID; a page number; an entry as link information to an area in each pool; the number of consumed entries; a time-stamp when the relevant page is newly allocated from the pool to the virtual volume (new allocation time); and a time-stamp when the relevant page was updated last time (last update time).

Regarding the pools (2502, 2504) composed of SSDs/HDDs, the entry address (P001: table address) of a pool area in the mapping table is pointed in the address conversion table; however, in the case of the memory mapped pool 2500, the address at which the relevant data is stored is directly pointed.

Figure 45:
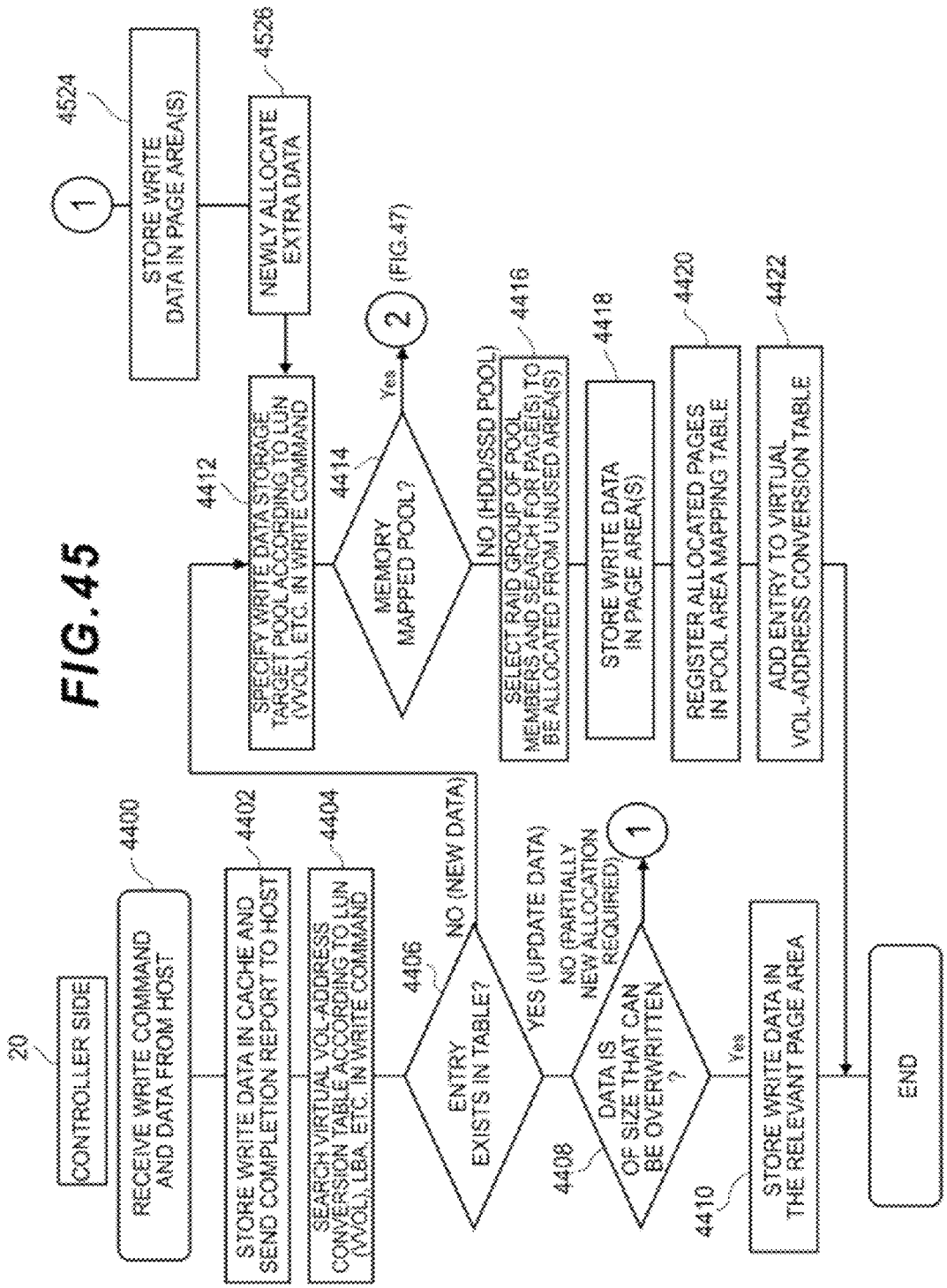
FIG. 45 is a flowchart illustrating an operation executed by the controller and the accelerator when writing data for the virtual volumes from the host computer to the storage devices.

FIG. 45 is a flowchart illustrating the operation of the controller 20 and the accelerator 2530 when writing data from the host computer 2702 for the virtual volumes to the storage devices 16. After the controller 20 receives a write command and write data from the host computer 2702 (step 4400), it stores the write data in the cache memory 2532 and sends a completion report to the host computer 2702 (step 4402).

Next, the controller 20 searches the virtual volume—address conversion table (FIG. 44) according to the LUN (corresponding to the virtual volume ID), LBA, etc. in the write command (step 4404) and judges whether the relevant entry exists in the table or not (step 4406).

If the entry exists (Yes in step 4406), the controller 20 determines that the write data is update data; and if the entry does not exist (No in step 4406), the controller 20 determines that the write data is new data.

If the controller 20 determines that the write data is update data, it judges whether or not the update data in which data to be updated exists is of size that can be overwritten in a page area of the pool (step 4408). If an affirmative judgment is returned (Yes in step 4408), the controller stores the write data in the target page area (step 4410). If the pool is the memory mapped pool (2500 in FIG. 25), the accelerator 2530 executes the aforementioned delayed parity-write processing (FIG. 41) on the RAM (3412 in FIG. 34) and the nonvolatile memory units 2722.

If the controller 20 determines in step 4406 that the write data is new data (No in step 4406), it specifies the target pool to which the virtual data is mapped, according to the LUN (the virtual volume ID) in the write command (step 4412). Subsequently, the controller 20 judges, according to the correspondence relationship between the pool ID and the pool type, whether the target pool is the memory mapped pool or not (step 4414).

If the controller 20 determines that the target pool is any one of the storage pools (2502, 2504) comprised of HDDs and/or SSDs, it selects a RAID group of the determined pool member, searches for a page, to which the write data is to be allocated, from unused areas (step 4416), and stores the write data in the target page (step 4418).

Next, the controller 20 registers a RAID group ID, a storage device ID, a physical LBA, block length, and so on regarding the allocated page in the mapping table for each pool area (step 4420). FIG. 46 shows an example of the mapping table for each pool area. Next, the controller adds an entry (P001 in FIG. 44) to the virtual volume—address conversion table (step 4422).

If the controller 20 determines in step 4410 that the size of the write data exceeds the data size that can be overwritten, it stores the write data in the page area where pre-update data is stored (step 4524) and then proceeds to step 4412 for new allocation of an excess part of the write data which cannot be stored (step 4526).

Figure 47:
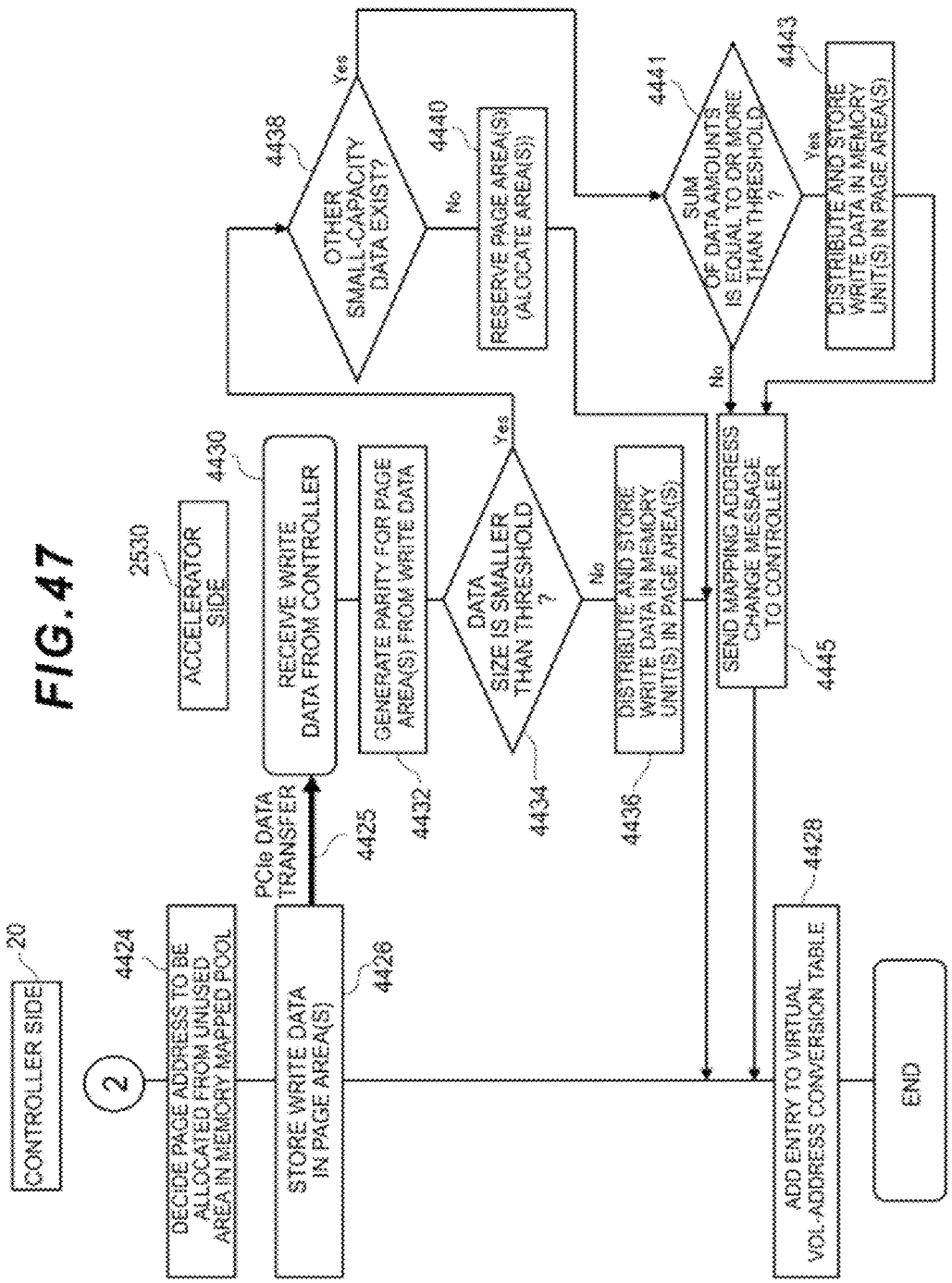
FIG. 47 is a flowchart illustrating the latter half of the processing following the flowchart illustrated in FIG. 45.

If the controller 20 determines in step 4414 that the target pool is the memory mapped pool, it proceeds to a flowchart shown in FIG. 47. Firstly, the controller 20 decides the page address to be allocated from unused areas in the target memory mapped pool to the write data (step 4424).

Next, the controller 20 sends the write data together with information such as the page address to the accelerator 2530 in order to store the write data at the decided page address (step 4426). Then, after receiving a response from the accelerator 2530, the controller 20 adds an entry to the relevant page to the virtual volume—address conversion table (step 4428).

The controller 20 transfers the write data to the accelerator 2530 (step 4425) based on the PCIe interface in step 4426. After receiving the write data from the controller 20, the accelerator 2530 temporarily stores the data in the RAM 3412 for the accelerator 2530 (step 4430).

Next, the accelerator 2530 generates parity for the page area from the write data (step 4432). At this timing, the accelerator 2530 may execute, for example, zero data reclamation or data compression to reduce the number of necessary pages for the data. If the number of consumed pages is changed, the accelerator 2530 notifies the controller 20 to that effect.

The accelerator 2530 compares the size of the write data (or size after compression if the data compression or similar is performed) with a threshold (step 4434); and if the size of the write data is equal to or more than the threshold (No in step 4434), the accelerator 2530 distributes and stores the write data, which is in the RAM 3412, to the memory units 2722 where the target page areas exist (step 4436). In this step, the accelerator 2530 releases the area in the RAM 3412. Incidentally, delayed parity-write processing described later (FIG. 48) is executed on the parity data. Next, the accelerator 2530 sends a message of processing termination to the controller 20.

If the accelerator 2530 determines in step 4434 that the size of the write data is less than threshold (Yes in step 4434), it judges whether or not other data smaller than the allocation size as the write data exists in the RAM 3412 for the accelerator 2530 (step 4438). If a negative judgment is returned (No in step 4438), the accelerator 2530 reserves a page area to store the write data in the memory mapped pool 2500 in order to reserve an area to write small-capacity data when such data has accumulated (step 4440). Next, the accelerator 2530 sends a message of processing termination to the controller 20. After receiving the message from the accelerator 2530, the controller 20 proceeds to step 4428.

If the accelerator 2530 determines that other small-sized data exist in the RAM 3412 (Yes in step 4438), it judges whether or not the sum of the sizes of the plurality of pieces of small-sized data is equal to or more than a threshold (step 4441); and if a negative judgment is returned (No in step 4441), the accelerator 2530 sends a message to the controller 20 to report that the mapping address has been changed (step 4445). If an affirmative judgment is returned (Yes in step 4441), the accelerator 2530 distributes and stores the plurality of pieces of write data in the plurality of memory units 2722 where the target page areas exist (step 4443), and then proceeds to step 4445.

Figure 48:
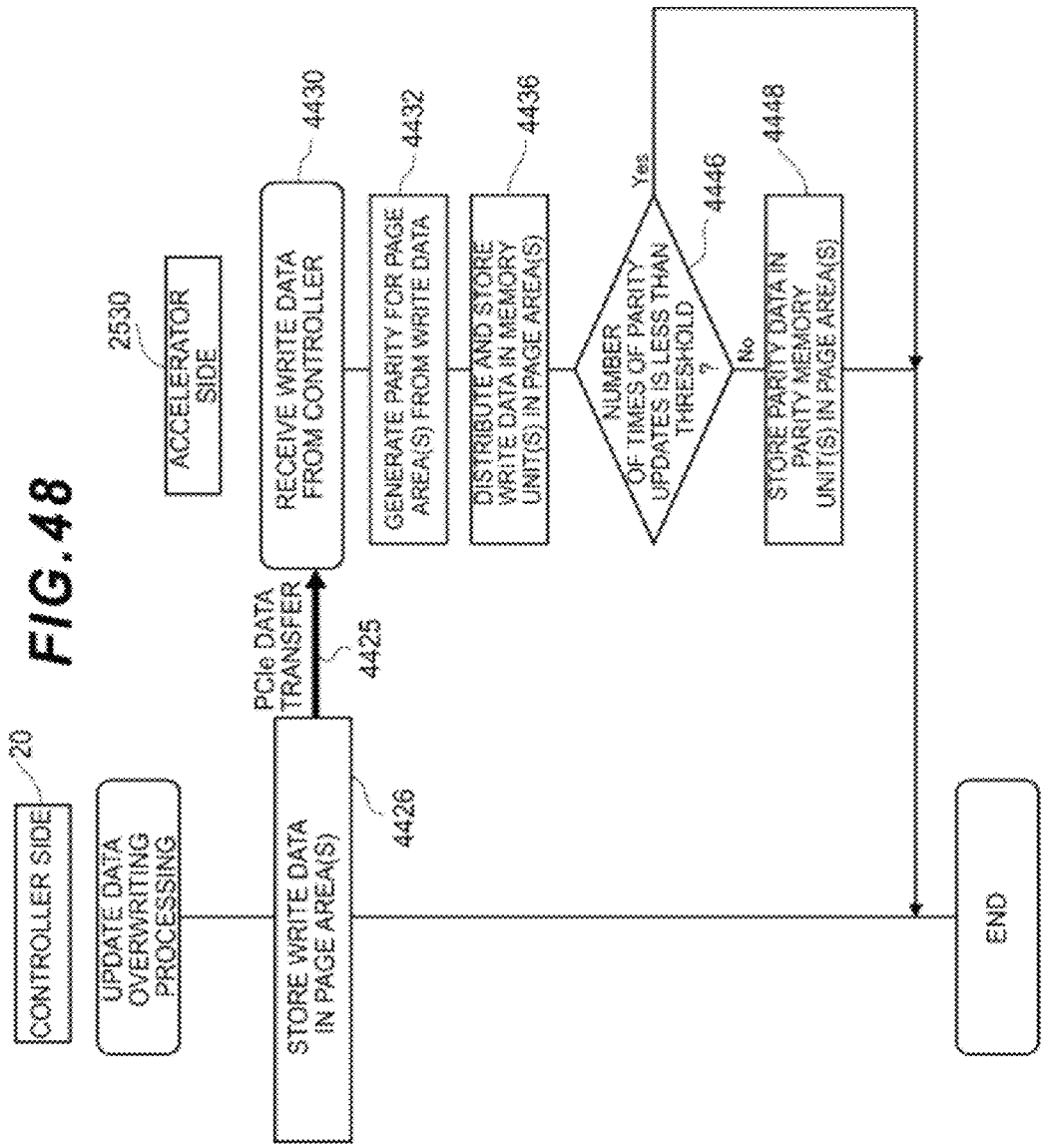
FIG. 48 is a flowchart illustrating a delayed-parity-write operation.

FIG. 48 is a flowchart illustrating the operation of the parity delayed write processing by the accelerator 2530 when the controller 20 executes update data overwriting processing. Regarding the same steps as those in the flowcharts described above, an explanation thereof has been omitted and the same symbols as used in the flowcharts described above are given to such steps.

When the accelerator 2530 distributes and stores the write data in the memory units 2722 (step 4436), it checks the number of times of parity updates; and if the accelerator 2530 determines that the number of times of parity updates is equal to or more than a threshold (No in step 4446), it copies the parity data from the RAM 3412 area to the parity memory unit corresponding to the page areas (step 4448).

Next, forms of forced cooling control by the fans 15 for the storage housing unit 14 will be explained for each interface type of the storage devices 16. FIG. 49 is a table described about such forms of the forced cooling control. This table is stored in the shared memory 2708 in the controller 20 for the basic chassis 10. The aforementioned tables (FIG. 44, FIG. 46) are also stored in the shared memory 2708 in the controller 20 for the basic chassis 10.

The fans 15 of each storage housing unit 14 exist and are arranged one on top of the other in the storage housing unit 14 (15A, 15B in FIG. 15). Access frequency in FIG. 49 means frequency of access from the host computer 2702 to the RAID group (IOPS: every 10 minutes). If the access frequency exceeds a threshold, the controller 20 increases a rotational speed of the fans 15. If the speed of the upper (or lower) fan is increased, the speed of the lower (or upper) fan may be increased in order to sustain cooling performance.

The threshold may be set to each of the following rotational speeds of the fan 15 switched between the maximum speed/high speed/medium speed/low speed/intermittent rotation/stop. If there are a plurality of RAID groups, the frequency may be set for each RAID group. If a failure occurs in the fan(s) 15, the controller 20 controls the rotational speed of the fans 15 for the storage housing units 14 with normality for the sake of general control of cooling for the entire chassis. For example, the controller 20 decreases the rotational speed of the fans for the plurality of storage housing units 14 one level down. The controller 20 controls the rotations of the fans by referring to the table in FIG. 49.

When the storage devices 16 mounted in the storage housing unit 14 are SSDs in FIG. 49, the controller 20 normally keeps the fans 15 in a low speed state. If the storage devices 16 are memory units, the fans 15 are replaced with the accelerator 2530.

In the case of the storage housing unit (No. 3) where a combination of HDDs and SSDs exists, the access frequency for the RAID group (RG5) in the storage housing unit 14 is high, so the rotational speed of the upper fan 15A is changed from the medium speed to the high speed, thereby maintaining a flow of the intake air in the storage housing unit 14. The rotational speed of the lower fan 15B is also changed from the low speed to the medium speed. In the storage housing unit (No. 4), the RAID group (RG9) extends across upper and lower storage devices 16 in the storage housing unit 14, so that the rotational speed of the fans 15 is controlled on the basis of the storage housing unit 14.

Figure 50:
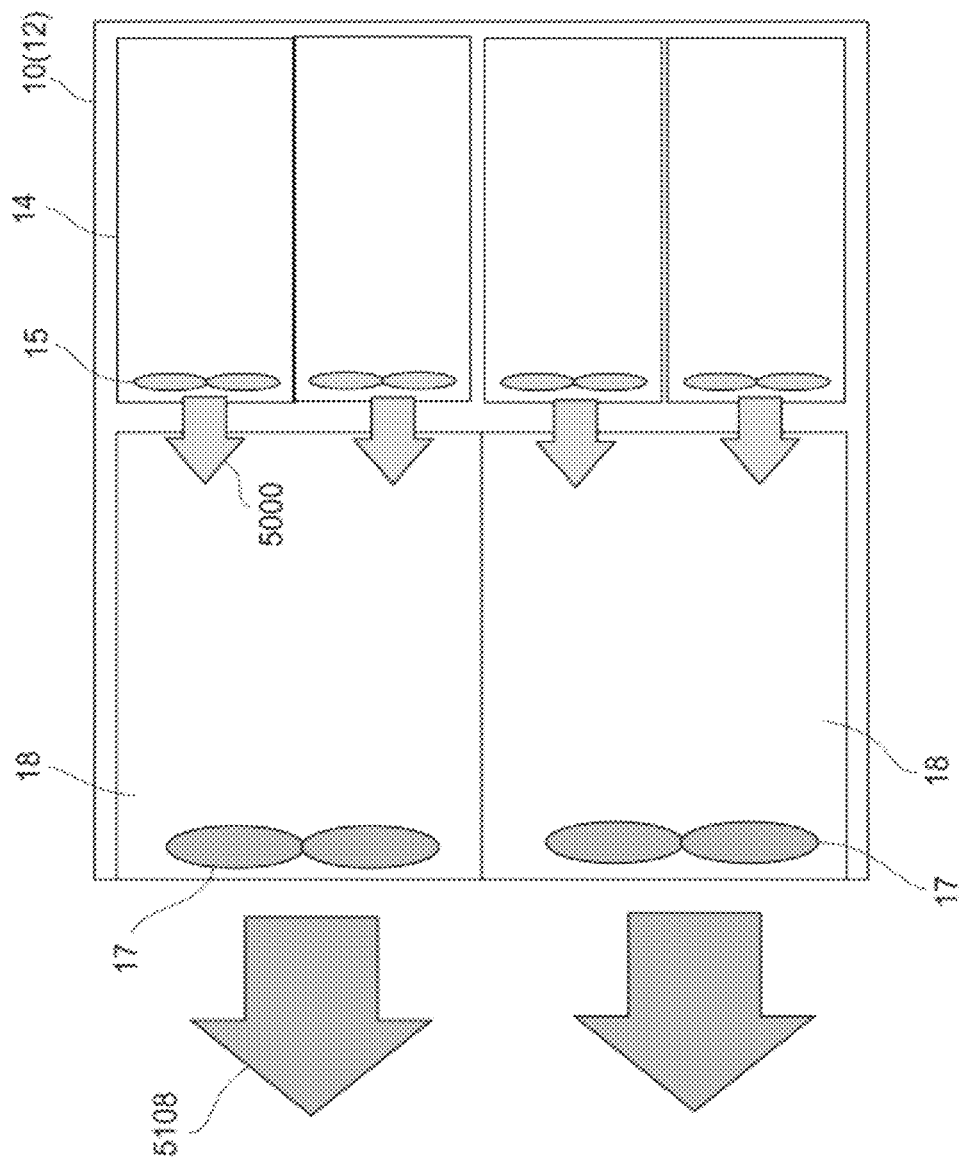
FIG. 50 is a schematic illustration of the first embodiment in which rotations of fans for the storage housing units and power supplies are controlled.

FIG. 50 is a schematic illustration showing a form in which the rotations of the fans (15, 17) for the storage housing units 14 and the power supplies are controlled. This schematic illustration is a diagram as viewed from the top face of the chassis 10(12) and there are four storage housing units 14 in the widthwise direction of the chassis. Two power supply units 18 exist in the widthwise direction of the chassis on the base end side of the chassis and each power supply unit 18 has the fans 17.

Since an even number of the storage housing units 14 exist evenly in the widthwise direction in the form shown in FIG. 50, the rotational speed of the fans 15 for each storage housing unit is set to the same speed. Therefore, a cooling air flow amount 5000 per unit time at the downstream of the fans 15 for each storage housing unit 14 is the same and an exhaust air flow amount 5108 at the downstream of the fans 17 for each power supply unit of the plurality of the power supply units 18 is almost the same.

Figure 51:
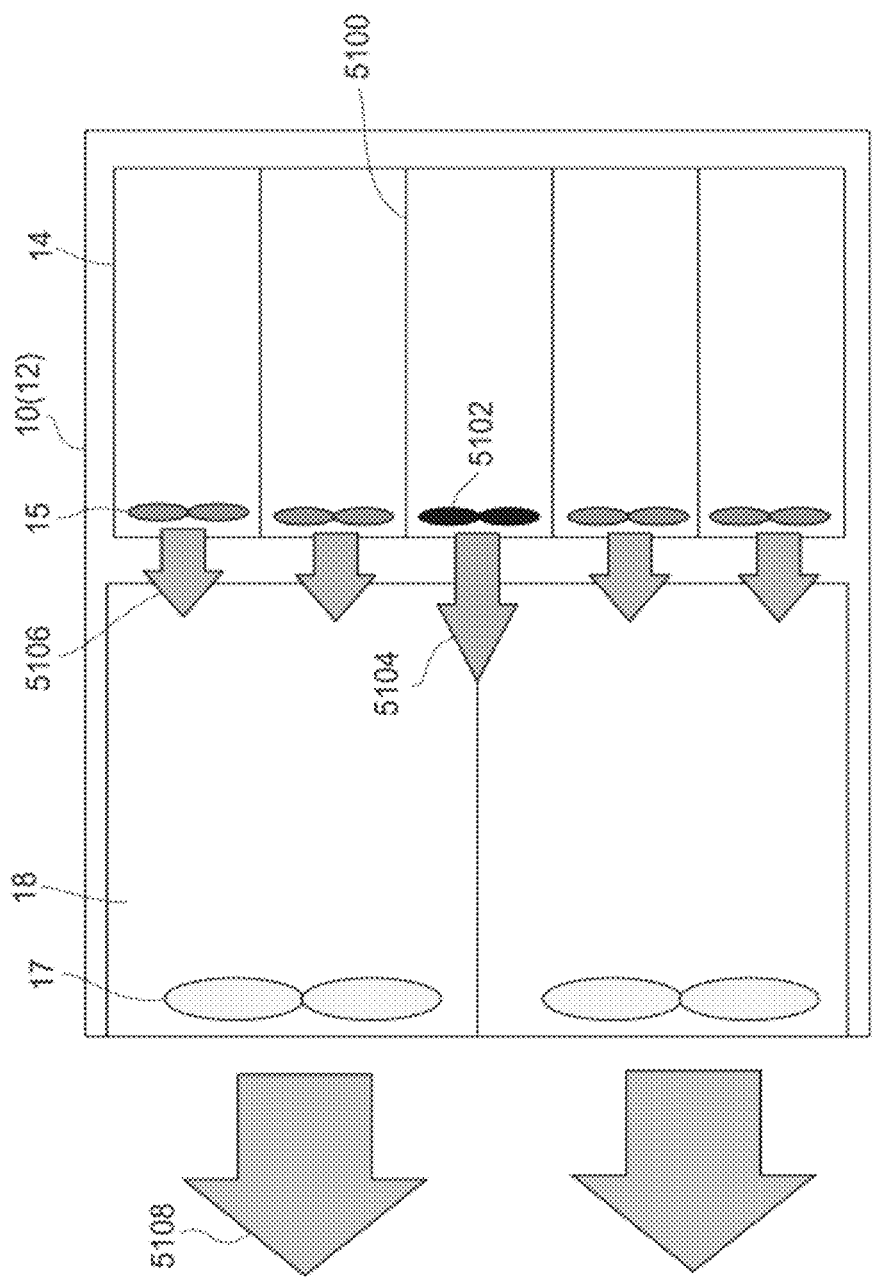
FIG. 51 is a schematic illustration of the second embodiment in which rotations of fans for the storage housing units and power supplies are controlled.

To the contrary, an odd number of storage housing units 14 are installed in a form shown in FIG. 51. Therefore, the controller 20 increases the rotational speed of fans 5102 for a storage housing unit 5100, which is located at the center and tends to have high intake air resistance, to be higher than the rotational speed of other storage housing units 14. As a result, a cooling air flow amount 5104 at the downstream of the center storage housing unit 5100 increases, thereby increasing an exhaust pressure of the storage housing unit 5100 and making the exhaust air smoothly flow into each power supply unit 18. In this way, cooling is controlled so that the cooling effect of the storage housing unit 5100 becomes equal to that of other storage housing units 14.

Figure 52:
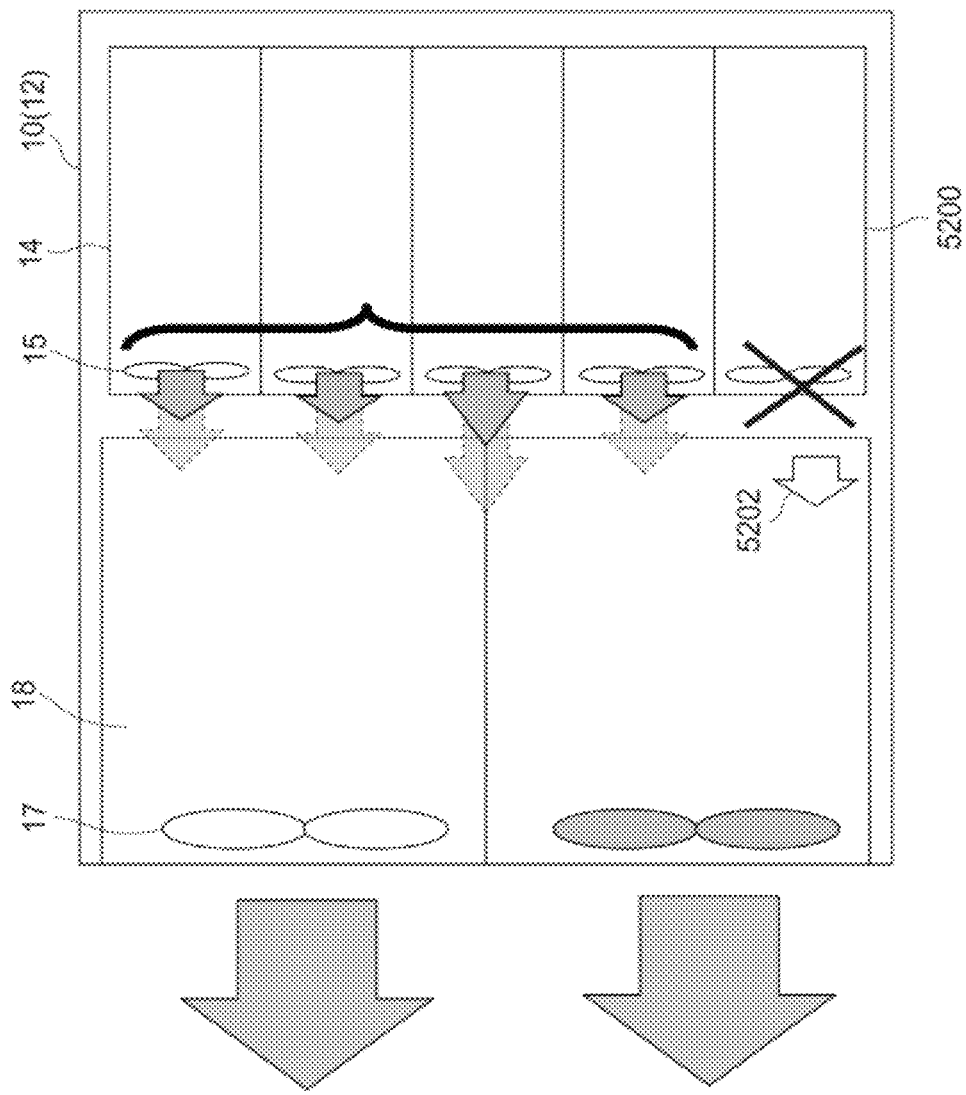
FIG. 52 is a schematic illustration of fan rotational control at the time of the occurrence of a fan failure in the storage housing unit in the second embodiment.

Meanwhile, if the fans 15 for one storage housing unit 5200 from among a plurality of storage housing units 14 stop due to a failure (as shown in FIG. 52), the controller 20 increases, as necessary, the rotational speed of the fans for the power supply unit 18 placed opposite the failed storage housing unit 5200 and decreases the rotational speeds of the fans for the normal storage housing units 14, other than the storage housing unit 5200 with the failed fans 15, so that the flow amounts of the cooling air as indicated with dotted lines will become those indicated with solid lines, or regularly stops the fans 15 for the normal storage housing units 14. This is to make the intake air 5202 sufficiently flow through the storage housing unit 5200 with the failed fans 15. The intake air effect by the fans 17 for the power supply units 18 extend to the storage housing unit 5200 with the failed fans 15.

Figure 53:
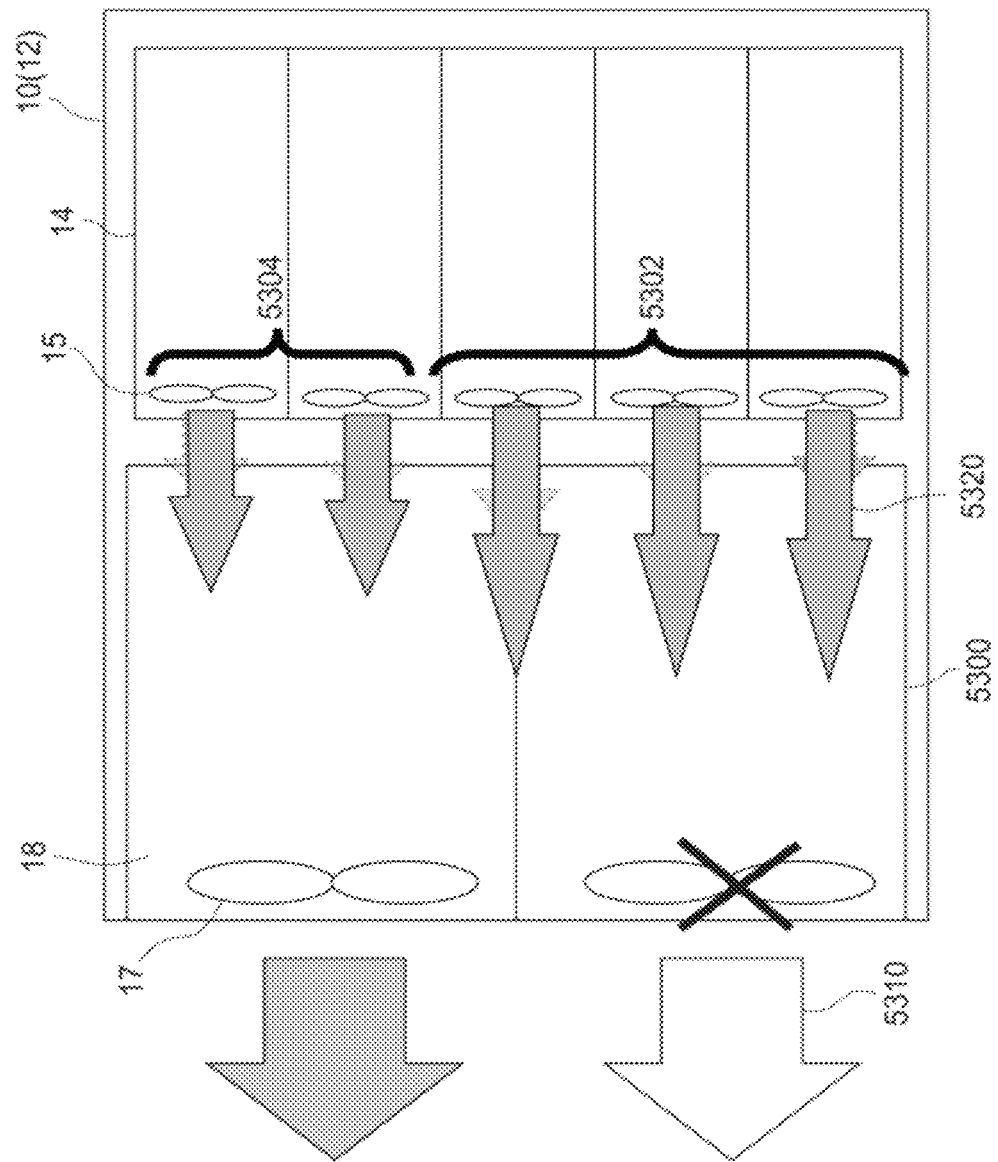
FIG. 53 is a schematic illustration of fan rotational control at the time of the occurrence of a failure in the power supply fans in the second embodiment.

An embodiment in FIG. 53 shows the operation in a case where fans 17 for a power supply unit 5300 from among a plurality of power supply units 18 stop due to a failure. The controller 20 increases the speed of the fans for a plurality of storage housing units 5302 placed opposite the failed power supply unit 18 as compared to other storage housing units 5304 (5320). As a result, an amount of cooling air 5310 almost equal to that in the other power supply unit 18 flows through even in the power supply unit 5300 with the stopped fans 17, so that it is possible to continue operating the power supply unit 5300.

Figure 54:
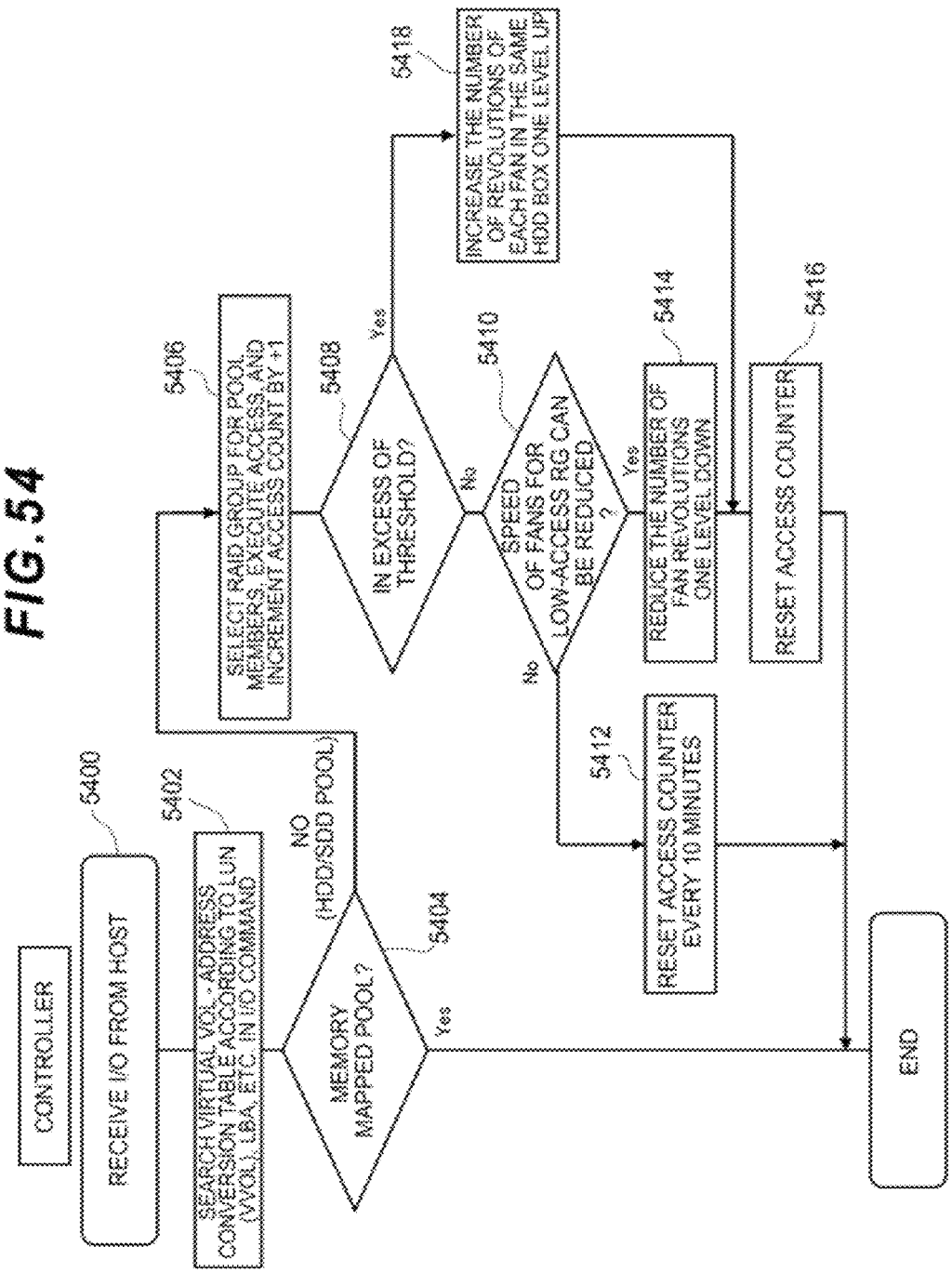
FIG. 54 is a flowchart illustrating an operation of the controller for controlling the fans for the storage housing units.

FIG. 54 is a flowchart illustrating the operation of the controller 20 for controlling the fans 15 for the storage housing units 14. After the controller 20 receives I/O from the host computer 2702 (step 5400), it searches the virtual volume-address conversion table (FIG. 44) according to the LUN and LBA which indicate the target of I/O and judges whether a storage area, which is the target of I/O, belongs to the memory mapped pool 2500 or not (step 5404). If it is the memory mapped pool (Yes in step 5404), cooling is unnecessary and, therefore, the processing is terminated.

On the other hand, if it is determined that the target pool is not the memory mapped pool (No in step 5404), the pool is composed of HDDs/SSDs and needs to be cooled. So, the controller 20 increments an access count value of a RAID group which is the I/O target (step 5406). The access count is set to the shared memory 2708 for the controller 20 and the controller 20 controls the fan 15 corresponding to the RAID group by referring to that count value.

The fan 15 corresponding to the RAID group means the fan 15A placed at a position opposite a plurality of storage devices 16 which form the RAID group 1506 as shown in FIG. 15. As described earlier, RAID groups are set so that each RAID group extends from the front side to the back side of the storage housing unit 14 and is placed opposite the fan 15.

Next, the controller 20 judges whether or not an accumulated count value exceeds a threshold (step 5408). If it is determined that the count value is in excess of the threshold (Yes in step 5408), the controller 20 increments the rotational speed of at least the fan 15 opposite the RAID group, from among the plurality of fans for the storage housing unit 14 to which the RAID group belongs, by one level (step 5418).

On the other hand, if it is determined that the accumulated value of the access count is equal to or less than the threshold (No in step 5408), the controller 20 judges whether or not the rotational speed of the fan 15 corresponding to the RAID group can be reduced (step 5410). For example, the controller 20 returns a negative judgment in this step with regard to the storage housing unit 14 for which the rotational speed of the fans 15 is temporarily increased in order to deal with a failure of a fan 15 for the storage housing unit 14.

Subsequently, the controller 20 resets the access counter at a specified time interval (for example, every 10 minutes) (step 5412) and terminates the processing.

If an affirmative judgment is returned in step 5410, the controller 20 decrements the rotational speed of the fan 15 corresponding to the RAID group by one level (step 5414).

If the rotational speed of the fan 15 is changed on a level basis in step 5418 or step 5414, the controller 20 resets the access counter (step 5416). In this step, the controller 20 may set a new threshold according to the level of the rotational speed of the fans to the shared memory 2708 at the same time as resetting the access counter.

FIG. 55 shows a form in which temperature sensors 5500 are provided in the storage housing unit 14 and the fan unit 15 for the storage housing unit 14 is directly controlled according to a signal from the sensors 5500. For example, when the fan unit 15 rotates in a low speed in this form, if the temperature of the storage devices 16 located on the front side (away from the fan unit) of the storage housing unit 14 where the sensors are not placed becomes high, there is a possibility that the sensors 5500 may not be able to detect the temperature sufficiently. So, there is a possibility that a lot of sensors 5500 may be provided, but that would be economically inefficient. It is also possible for the controller 20 to monitor the temperature of each device by interleaving (for example, sampling) the device positions and using a diagnosis (temperature monitoring) function of the storage devices 16. However, the above-described method is inefficient for the storage housing unit 14 in which a lot of storage devices 16 are mounted.

On the other hand, the method shown in FIG. 54 can ensure that the inside of the storage housing unit 14 will be cooled by controlling the fans for the storage devices 16 by monitoring access load on the devices, without the necessity to provide the temperature sensors 5500 in the storage housing unit 14.

Figure 56:
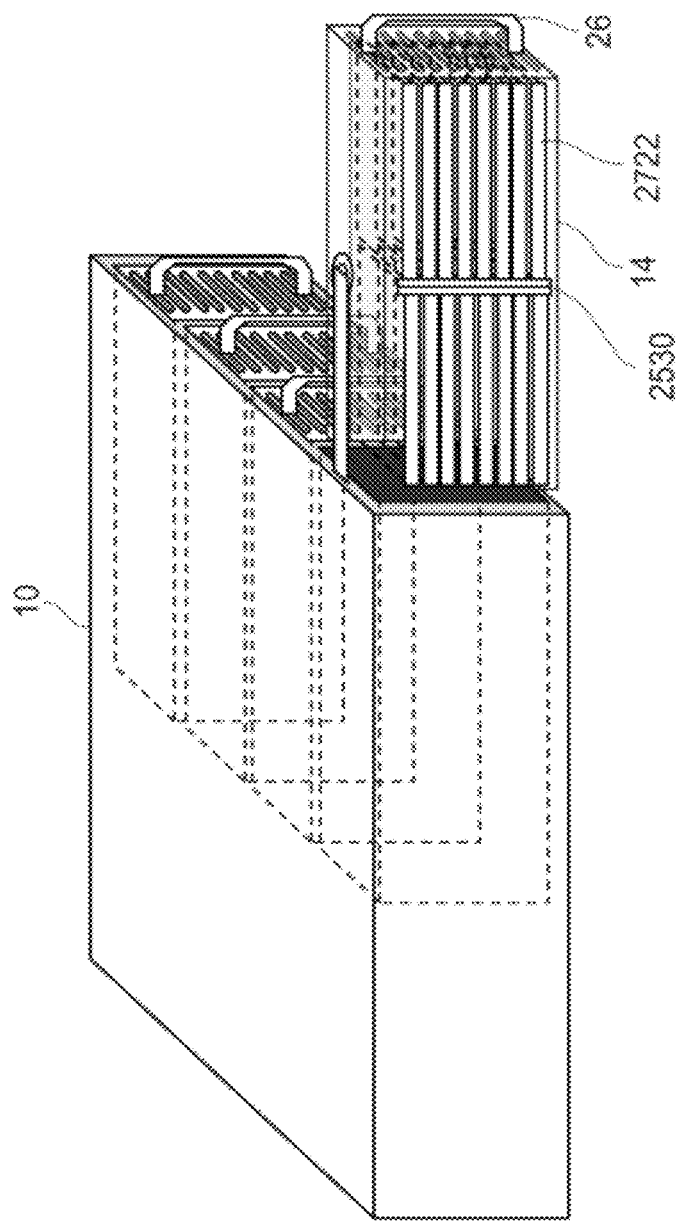
FIG. 56 is a perspective view of the storage housing unit in which the memory units are mounted in high density by using the storage housing unit exclusively for only the memory units.

FIG. 56 is a perspective view of the storage housing unit 14 in which the memory units 2722 are mounted in high density by using the storage housing unit 14 exclusively for only the memory units 2722 (this storage housing unit 14 does not share the HDD connector). Since the area of the memory units 2722 can be extended in a horizontal direction by placing the accelerator unit 2530 at the center of the storage housing unit 14, it is possible to achieve the large capacity by increasing the number of the memory devices to be mounted. Furthermore, the performance can be improved by providing a plurality of PCIe lanes for the memory units 2722 by using a dedicated back bard and connector.

Incidentally, the type of communication protocol for the interface of the memory unit 2722 in the aforementioned embodiments is not limited to PCIe as long as the communication protocol enables memory access.

REFERENCE SIGNS LIST

10 Basic chassis
12 Additional chassis
14 Storage housing unit
16 Storage device
20 Controller
24 Guide mechanism
1700 First elastic supporting unit
1706 Second elastic supporting unit
2530 Accelerator
2710 SAS expander unit
2711 PCI express switch unit

The invention claimed is:

1. A storage device mounting structure comprising:
   a unit for housing at least one RAID group comprising a plurality of storage devices, the unit comprising at least one fan for cooling the at least one RAID group;
   a chassis for housing the unit;
   a guide mechanism for supporting the unit and guiding it into and out of the chassis;
   wherein the unit has an open area through which the plurality of storage devices are configured to be inserted from a front face of the unit into the unit; and the guide mechanism is configured to support the unit to freely move rotationally to make a surface of the unit, where the open area exists, positioned at the front of the chassis; and
   a controller for controlling a rotational speed of the at least one fan, wherein the controller is configured to increase the rotational speed when an access frequency of the at least one RAID group exceeds a predetermined threshold,
   wherein the predetermined threshold is set higher when the at least one RAID group is configured with hard disk drives (HDDs) than when the at least one RAID group is configured with solid state drives (SSDs).

2. The mounting structure according to claim 1, wherein the guide mechanism comprises:
   a first member for supporting the unit; and
   a second member for guiding the first member to be moved out of the chassis;
   wherein the unit is configured to be moved back and forth relative to the chassis by the first member guided by the second member; and
   wherein when the unit reaches out of the chassis, the unit is configured to be rotated around a support part with the first member so that a front face of the unit will be located along a front face of the chassis.

3. The mounting structure according to claim 2, wherein the first member has a guide rail for supporting the unit;
   the second member has a guide groove for guiding the guide rail to be moved out of the chassis; and
   wherein the guide rail is configured to engage with the guide groove and guide the unit so that the unit can be moved back and forth relative to the chassis.

4. The mounting structure according to claim 3, wherein the guide rail comprises
   a first rail;
   a second rail; and
   a junctional part between the first rail and the second rail;
   wherein the first rail is connected to the unit;
   wherein the first rail is configured so that it can rotate around the junctional part relative to the second rail.

5. The mounting structure according to claim 1, wherein the unit is configured to receive and house the storage device which is configured to be inserted into the unit through the open area in a horizontal direction.

6. The mounting structure according to claim 1, wherein the unit has:
   a cooling device for performing forced cooling of the inside of the unit; and
   a shutter mechanism configured so that force is applied in a direction to close the open area;
   wherein the storage device is configured to push the shutter mechanism and is configured to be inserted through the open area into the unit.

7. The mounting c structure according to claim 5, wherein the plurality of storage devices are in a staggered arrangement in the unit.

8. The mounting structure according to claim 1, wherein the unit further comprises a cooling device for performing forced cooling of the inside of the unit, the cooling device comprising the at least one fan;
   wherein the cooling device has a plurality of fans and controls the fans, which are opposite a storage device group comprising the plurality of storage devices, according to an operational status of the storage device group.

9. The mounting structure according to claim 1, wherein the unit comprises:
   a first supporting unit for elastically supporting the plurality of storage devices in the unit in a horizontal direction; and
   a second supporting unit for elastically supporting the plurality of storage devices in the unit in a vertical direction.

10. The mounting structure according to claim 9, wherein each of the first and second supporting units comprises:
    a coil in an arranged direction of the plurality of storage devices; and a branch member that-branches from the coil, comes into contact with the plurality of storage devices, to apply elasticity of the coil to the storage devices;

wherein the branch member presses and thereby elastically supports the storage devices.

11. The mounting structure according to claim 10, wherein a winding direction of the coil for the second supporting unit is in a reversed configuration at every storage device of the plurality of storage devices which are placed adjacent to each other in the vertical direction.

12. The mounting structure according to claim 6,
wherein the plurality of storage devices are each semiconductor memory devices;
wherein the cooling device is an accelerator.

13. The mounting structure according to claim 1, further comprising:
a first interface unit comprises an SAS expander; and
a second interface unit comprises a PCI express interface switch;
wherein the unit is configured so that the PCI express interface switch can be used instead of the SAS expander.

14. The mounting structure according to claim 13, wherein the unit has an SAS connector for both the SAS expander and the PCI express interface switch.

15. The mounting structure according to claim 1, wherein the controller is configured to reduce the rotational speed when an access frequency of the at least one RAID group falls below the predetermined threshold.

\* \* \* \* \*